(12) United States Patent
Jeon et al.

(10) Patent No.: US 12,369,219 B2
(45) Date of Patent: Jul. 22, 2025

(54) RESELECTION OF TRANSMISSION CONFIGURATION

(71) Applicant: Comcast Cable Communications, LLC, Philadelphia, PA (US)

(72) Inventors: Hyoungsuk Jeon, Centreville, VA (US); Kyungmin Park, Vienna, VA (US); Esmael Hejazi Dinan, McLean, VA (US); Taehun Kim, Fairfax, VA (US); Yunjung Yi, Vienna, VA (US); Hua Zhou, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 452 days.

(21) Appl. No.: 17/738,454

(22) Filed: May 6, 2022

(65) Prior Publication Data

US 2022/0361276 A1    Nov. 10, 2022

Related U.S. Application Data

(60) Provisional application No. 63/185,938, filed on May 7, 2021.

(51) Int. Cl.
*H04W 4/00* (2018.01)
*H04W 28/02* (2009.01)
*H04W 72/23* (2023.01)
*H04W 74/0833* (2024.01)
*H04W 76/27* (2018.01)

(52) U.S. Cl.
CPC ....... *H04W 76/27* (2018.02); *H04W 28/0278* (2013.01); *H04W 72/23* (2023.01); *H04W 74/0833* (2013.01)

(58) Field of Classification Search
CPC ............. H04W 76/27; H04W 74/0833; H04W 28/0278
See application file for complete search history.

(56) References Cited

U.S. PATENT DOCUMENTS

| | | |
|---|---|---|
| 2021/0337625 A1 | 10/2021 | Tsai et al. |
| 2022/0007423 A1 | 1/2022 | Agiwal |
| 2022/0046749 A1 | 2/2022 | Lin |
| 2022/0361239 A1* | 11/2022 | Xu ........................ H04W 76/27 |
| 2022/0361276 A1* | 11/2022 | Jeon ...................... H04W 76/27 |
| 2023/0164773 A1* | 5/2023 | Alfarhan ............... H04W 72/52 370/329 |

(Continued)

OTHER PUBLICATIONS

Khlass et al., Efficient Handling of Small Data Transmission for RRC Inactive UEs in 5G Networks, 2021, IEEE, pp. 1-7. (Year: 2021).*

(Continued)

*Primary Examiner* — Elisabeth Benoit Magloire
(74) *Attorney, Agent, or Firm* — Banner & Witcoff, Ltd.

(57) ABSTRACT

A communication procedure (e.g., a small data transmission (SDT) procedure) may be used for data transmission under certain scenarios. The communication procedure may facilitate transmission of small amounts of data, for example, even if a wireless device is in a non-connected state with respect to a network. Data transmission during the communication procedure may be based on a selected transmission type and the transmission type may be changed during the communication procedure.

19 Claims, 30 Drawing Sheets

(56) References Cited

U.S. PATENT DOCUMENTS

| | | | | |
|---|---|---|---|---|
| 2023/0284231 | A1* | 9/2023 | Lin | H04W 76/27 |
| | | | | 370/252 |
| 2023/0319890 | A1* | 10/2023 | Wang | H04W 74/0833 |
| | | | | 370/329 |
| 2023/0379905 | A1* | 11/2023 | Feltrin | H04W 72/21 |
| 2023/0388919 | A1* | 11/2023 | Wu | H04W 48/20 |
| 2023/0397198 | A1* | 12/2023 | Turtinen | H04W 72/1268 |
| 2023/0397215 | A1* | 12/2023 | Shi | H04W 72/23 |

OTHER PUBLICATIONS

3GPP TS 38.214 V16.5.0 (Mar. 2021) 3rd Generation Partnership Project; Technical Specification Group Radio Access Network; NR; Physical layer procedures for data (Release 16).
3GPP TS 38.300 V16.5.0 (Mar. 2021) 3rd Generation Partnership Project; Technical Specification Group Radio Access Network; NR; NR and NG-RAN Overall Description; Stage 2 (Release 16).
3GPP TS 38.304 V16.4.0 (Mar. 2021), Technical Specification, 3rd Generation Partnership Project; Technical Specification Group Radio Access Network; NR; User Equipment (UE) procedures in Idle mode and RRC Inactive state (Release 16).
3GPP TS 38.321 V16.4.0 (Mar. 2021) 3rd Generation Partnership Project; Technical Specification Group Radio Access Network; NR; Medium Access Control (MAC) protocol specification (Release 16).
3GPP TS 38.331 V16.4.1 (Mar. 2021) 3rd Generation Partnership Project; Technical Specification Group Radio Access Network; NR; Radio Resorce Control (RRC) protocol specification (Release 16).
3GPP TSG RAN WG1 #104b-e, e-Meeting, Apr. 12-20, 2021, Title: Chairman's Notes Section 8.2.
R2-2102708 3GPP TSG-RAN2 Meeting #113bis Electronic, Apr. 12-Apr. 20, 2021, Source: Samsung, Title: User Plane Common Aspects of RACH and CG based SDT.
R2-2102750 3GPP TSG-RAN WG2 Meeting #113bis electronic, Online, Apr. 12-Apr. 20, 2021, Source: OPPO, Title: Discussion on user plane issues of SDT.
R2-2102755 3GPP TSG-RAN WG2 Meeting #113-bis-electronic, Online, Apr. 12-Feb. 20, 2021, Source: vivo, Title: Discussion on User Plane Aspect of Small Data Transmission.
R2-2102840 3GPP TSG RAN WG2 Meeting #113bis-e, Electronic meeting, Apr. 12-20, 2021, Source: Intel Corporation, Title: User plane aspects for SDT.
R2-2103018 3GPP TSG-RAN WG2 #113bis-e, eMeeting, Apr. 12-20, 2021, Source: ZTE, Sanechips, Title: The issues on user plane common aspects for SDT.
R2-2103102 3GPP TSG-RAN WG2 Meeting #113bis electronic, Online, Apr. 12-Apr. 20, 2021, Source: CATT, Title: Analysis on UP common aspects of SDT.
R2-2103197 3GPP TSG-RAN WG2 Meeting #113 bis electronic, Online, Apr. 12-Apr. 20, 2021, Source: Fujitsu, Title: Support of CA and PDCP CA duplication.
R2-2103319 3GPP TSG-RAN WG2 Meeting #113bis electronic, E-meeting, Apr. 12-Apr. 20, 2021, Source: Lenovo, Motorola Mobility, Title: The UP common issues for small data transmissions.
R2-2103405 3GPP TSG-RAN WG2 Meeting #113bis electronic, Online, Apr. 12-Apr. 20, 2021, Source: Lenovo, Motorola Mobility, Title: Consideration on CP issues for small data transmission.
R2-2103430 3GPP TSG-RAN WG2 Meeting #113 bis electronic, Online, Apr. 12-Apr. 20, 2021, Source: Qualcomm Incorporated, Title: Discussion on user plane common aspects of NR small data transmission.
R2-2103444 3GPP TSG-RAN WG2 Meeting #113bis electronic, Online, Apr. 12-Apr. 20, 2021, Source: Panasonic, Title: Discussion on data volume threshold for small data transmission.
R2-2103454 3GPP TSG-RAN WG2 Meeting #113bis electronic, Online, Apr. 12-20, 2021, Source: ASUSTeK, Title: Avoid triggering RA during subsequent SDT.
R2-2103521 3GPP TSG-RAN WG2 #113bis-e, Electronic meeting, Apr. 12-Apr. 20, 2021, Source: Ericsson, Title: Common aspects for SDT.
R2-2103528 3GPP TSG-RAN WG2 Meeting #113bis Electronic, Online, Apr. 12-Apr. 20, 2021, Source: Nokia, Nokia Shanghai Bell, Title: User Plane common aspects.
R2-2103531 3GPP TSG-RAN WG2 Meeting #113bis-e, Electronic, Apr. 12-20, 2021, Source: Huawei, HiSilicon, Title: User plane common aspects for SDT.
R2-2103583 3GPP TSG-RAN WG2 Meeting #113bis electronic, Online, Apr. 12-Apr. 20, 2021, Source: Sony, Title: Some aspects of User Plane for SDT in NR.
R2-2103672 3GPP TSG-RAN WG2 Meeting #113bis-e, Online, Apr. 12-20, 2021, Source: Google Inc., Title: Discussion on small data transmission.
R2-2103674 3GPP TSG-RAN WG2 Meeting #113bis-e, Online, Apr. 12-20, 2021, Source: Google Inc., Title: Discussion on beam operations for small data transmission.
R2-2103714 3GPP TSG-WG2 Meeting #113bis electronic, Online, Apr. 12-Apr. 20, 2021, Source: CMCC, Title: Remaining issues on transmission type selection and overall procedure.
R2-2103870 3GPP TSG-RAN WG2 Meeting #113 bis electronic, Online, Apr. 12-Apr. 20, 2021, Source: Apple, Title: User plane aspects on the SDT procedure.
R2-2103990 3GPP TSG-RAN2#113bis-e, Online, Apr. 12-Apr. 20, 2021, Source: LG Electronics Inc., Title: Consideration on overall SDT procedure and criteria.
R2-2104206 3GPP TSG-RAN WG2 Meeting #113bis-e, Online, Apr. 12-20, 2021, Source: China Telecom, Title: Discussion on the overall and detailed procedure of SDT.
R2-2104220 3GPP TSG-RAN WG2 Meeting #113bis electronic, E-Meeting, Apr. 12-Apr. 20, 2021, Source: Xiaomi Communications, Title: Discussion on data volume calculation.
R2-2104263 3GPP TSG-RAN WG2 #113bis-e, Electronic meeting, Apr. 12-20, 2021, Source: TCL Communications Ltd., Title: Discussion on Small Data Transmission.
3GPP TSG RAN WG1 Meeting #104b-e, e-Meeting, Apr. 12-20, 2021, Title: RAN1 Chair's Notes.
R2-2104395 3GPP TSG-RAN2 #113bis-e, Electronic meeting, Apr. 12-Apr. 20, 2021, Source: LG Electronics (Rapporteur), Title: Report of [AT113bis-e][501][SDT] UP SDT open issues.
R1-210xxxx 3GPP TSG-RAN WG1 Meeting #104b-e, e-Meeting, Apr. 12-20, 2021, Source: Moderator (ZTE), Title: Summary on the physical layer aspects of small data transmission.
R2-2104301 3GPP TSG-RAN WG2 Meeting #113 bis electronic, Online, Apr. 12-Apr. 20, 2021, Source: Vice Chairman (Nokia), Title: Report on LTE legacy, Mobility, DCCA, Multi-SIM and RAN slicing.
Sep. 23, 2022—EP Search Report—EP App. No. 22172038.6.
Interdigital: transmission, Subsequent small data 3GPP Draft; R2-2103796, 3rd Generation Partnership Project (3GPP), Mobile Competence Centre; 650, Route Des Lucioles; F-06921 Sophia-Antipolis Cedex; France vol. RAN WG2, No. Apr. 12, 2021-Apr. 20, 2021 Apr. 1, 2021 (Apr. 1, 2021), XP051992260, Retrieved from the Internet: URL:https://ftp.3gpp.org/tsg_ran/WG2_RL2/T SGR2_113bis-e/Docs/R2-2103796.zip R2-2103796 (RI7 SDATA WI AI 8.6.3 Subsequent small data) .doc [retrieved on Apr. 1, 2021].
Ericsson: "CP aspects for SDT", 3GPP Draft; R2-2101177, 3rd Generation Partnership Project (3GPP), Mobile Competence Centre; 650, Route Des Lucioles; F-06921 Sophia-Antipolis Cedex; France vol. RAN WG2, No. Electronic meeting; Jan. 25, 2021-Feb. 5, 2021 Jan. 14, 2021 (Jan. 14, 2021), XP051972840, Retrieved from the Internet: URL:https://ftp.3gpp.org/tsg_ran/WG2_RL2/T SGR2_113-e/Docs/R2-2101177.zip R2-2101177 CP aspects for SDT. docx [retrieved on Jan. 14, 2021] *the whole document*.
Asustek: "Handling non-SDT data arrival during subsequent SDT",3GPP Draft; R2-2101750, 3rd Generation Partnership Project (3GPP), Mobile Competence Centre; 650, Route Des Lucioles; F-06921 Sophia-Antipolis Cedex ; France vol. RAN WG2, No. electronic; Jan. 25, 2021-Feb. 5, 2021 Jan. 15, 2021 (Jan. 15, 2021), XP051974615, Retrieved from the Internet: URL:https://ftp.3gpp. org/tsg_ran/WG2_RL2/T SGR2_113-e/Docs/R2-2101750.zip R2-2101750 Handling non-SDT data arrival during subsequent SOT.doc.
3GPP TS 36.321 V16.4.0 (Mar. 2021), Technical Specification, 3rd Generation Partnership Project; Technical Specification Group Radio

(56) References Cited

OTHER PUBLICATIONS

Access Network; Evolved Universal Terrestrial Radio Access (E-UTRA); Medium Access Control (MAC) protocol specification (Release 16).

3GPP TS 36.331 V16.4.0 (Mar. 2021), Technical Specification, 3rd Generation Partnership Project; Technical Specification Group Radio Access Network; Evolved Universal Terrestrial Radio Access (E-UTRA); Radio Resource Control (RRC); Protocol specification (Release 16).

3GPP TS 38.211 V16.5.0 (Mar. 2021), Technical Specification, 3rd Generation Partnership Project; Technical Specification Group Radio Access Network; NR; Physical channels and modulation (Release 16).

3GPP TS 38.212 V16.5.0 (Mar. 2021) 3rd Generation Partnership Project; Technical Specification Group Radio Access Network; NR; Multiplexing and channel coding (Release 16).

3GPP TS 38.213 V16.5.0 (Mar. 2021) 3rd Generation Partnership Project; Technical Specification Group Radio Access Network; NR; Physical layer procedures for control (Release 16).

* cited by examiner

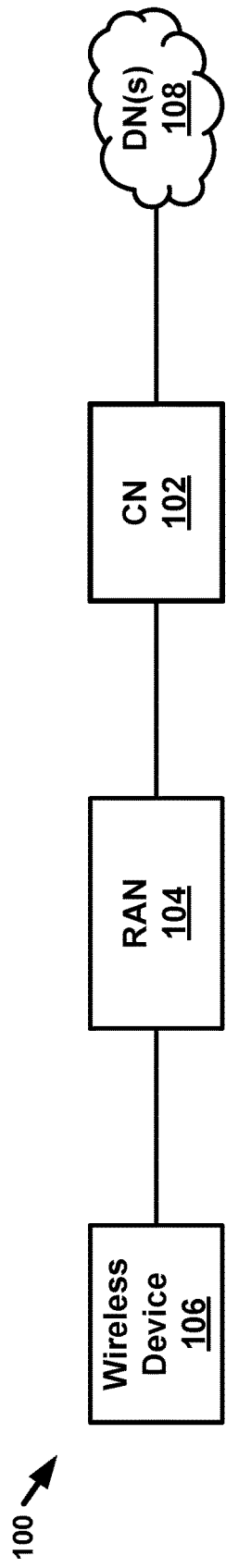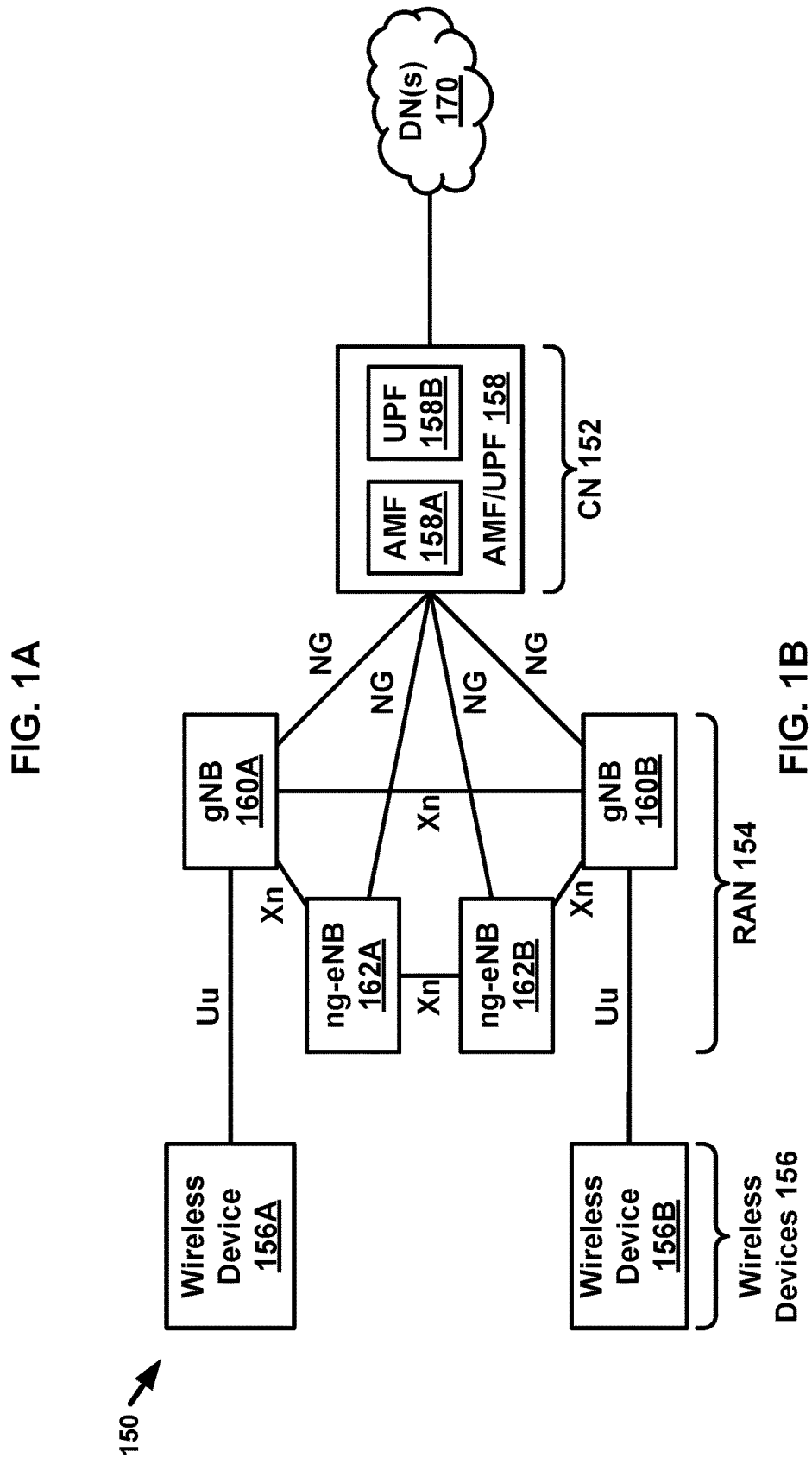

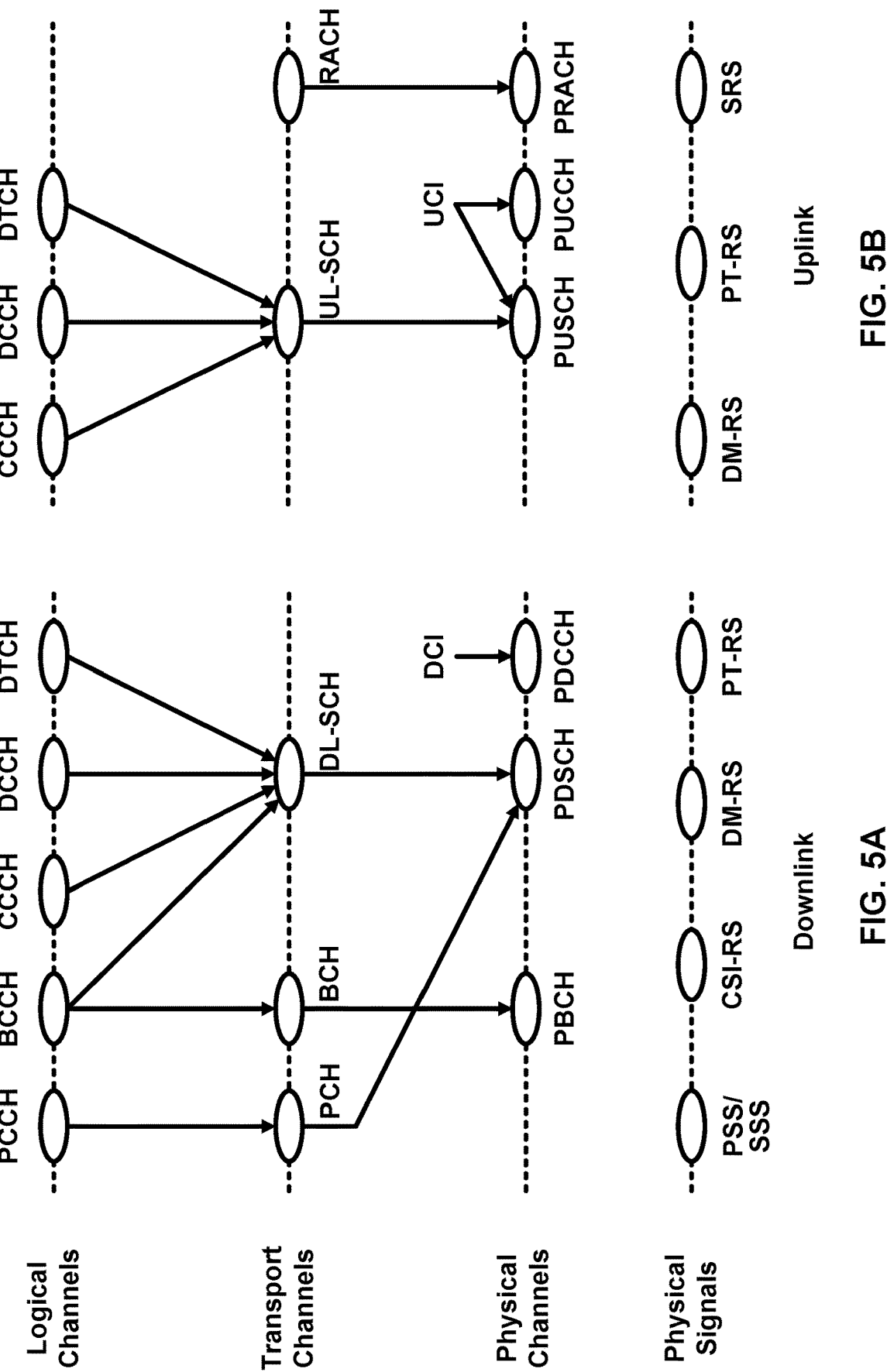

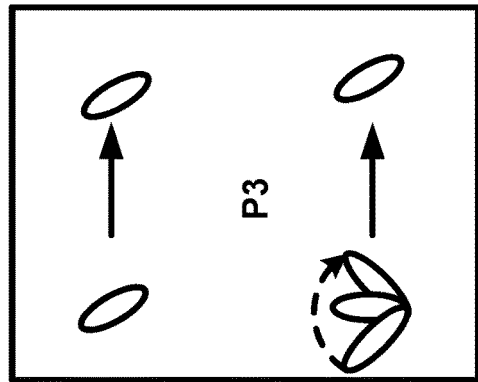
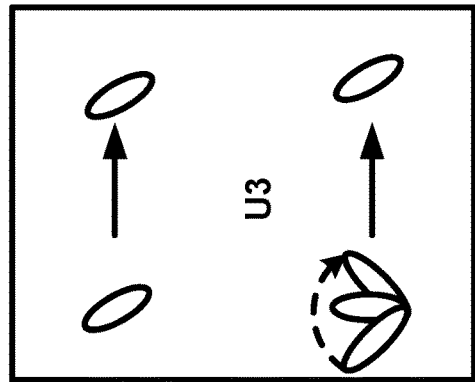
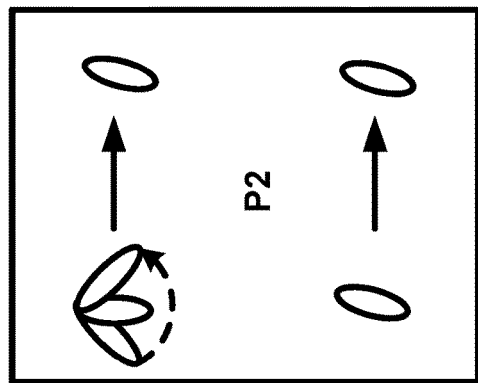
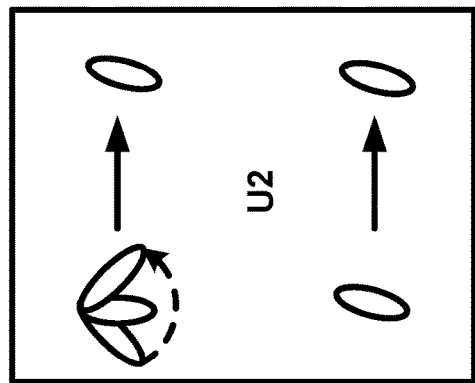
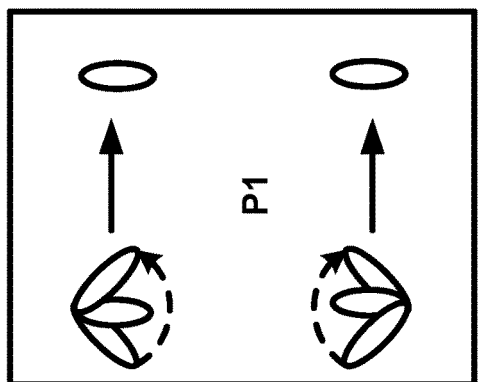
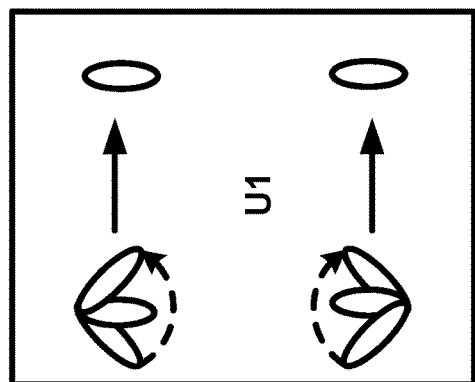
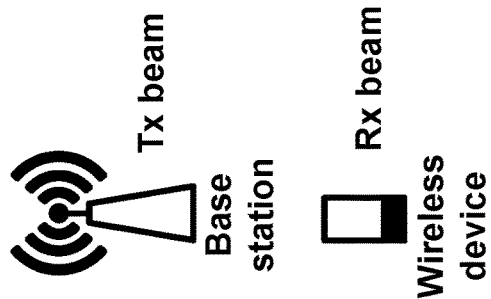
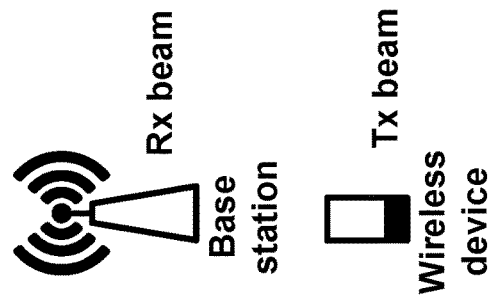
FIG. 12A
FIG. 12B

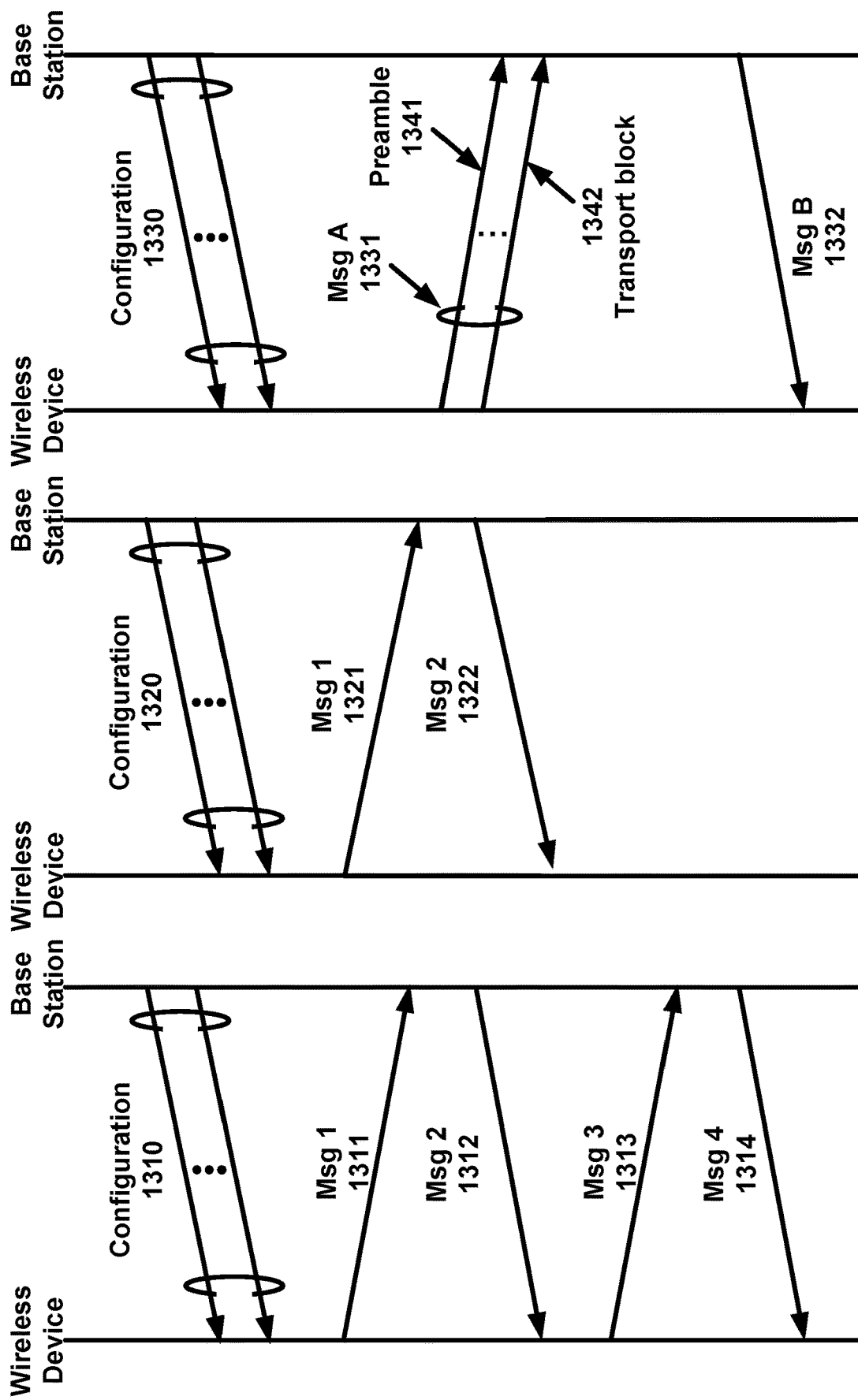

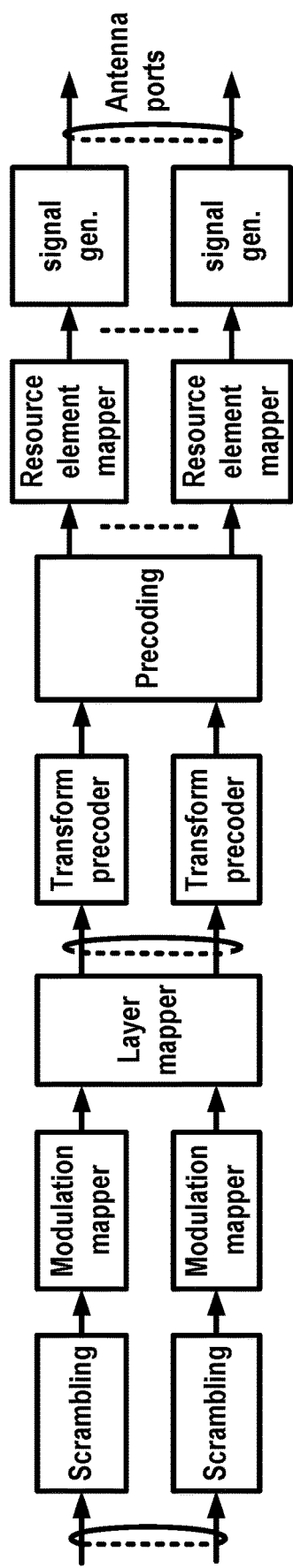
FIG. 16A
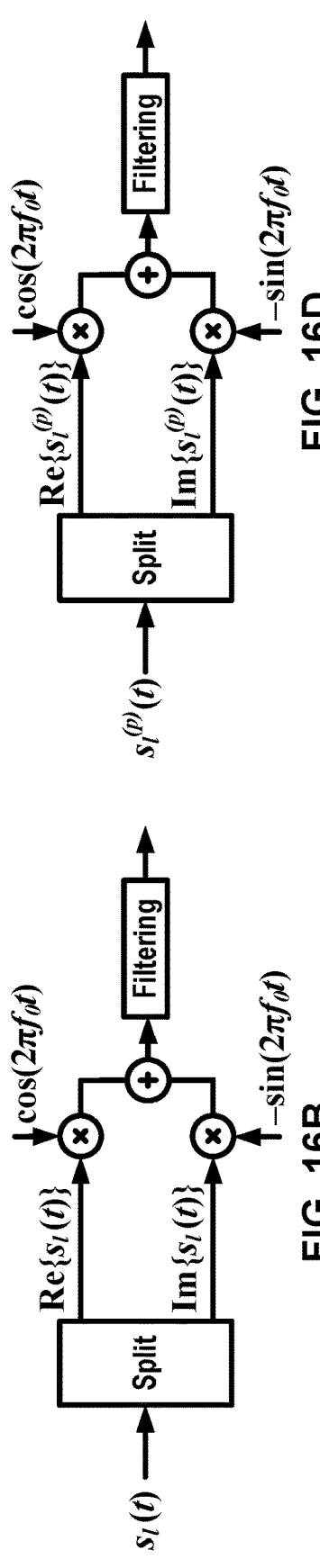
FIG. 16B
FIG. 16D
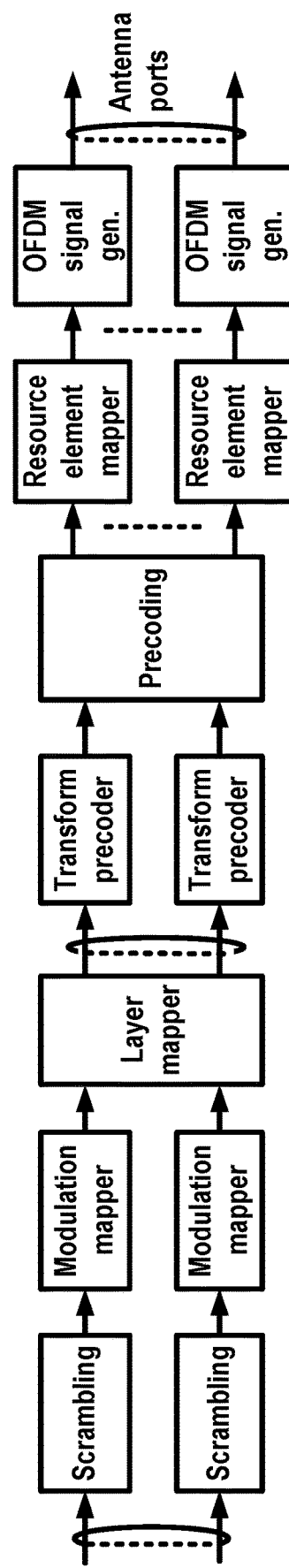
FIG. 16C

RESELECTION OF TRANSMISSION CONFIGURATION

CROSS-REFERENCE TO RELATED APPLICATIONS

This application claims the benefit of U.S. Provisional Application No. 63/185,938, filed on May 7, 2021. The above referenced application is hereby incorporated by reference in its entirety.

BACKGROUND

A wireless device operates in a connected state or a non-connected state with respect to a wireless network. A wireless device communicates with a base station, even if the wireless device is operating in a non-connected state. For example, the wireless device sends small amounts of data in short bursts during a non-connected state.

SUMMARY

The following summary presents a simplified summary of certain features. The summary is not an extensive overview and is not intended to identify key or critical elements.

Wireless communications may comprise transmission/reception between a wireless device and a base station. The wireless communication may be performed even if the wireless device is not connected to the network (e.g., the wireless device is in a non-connected state). For example, a communication procedure (e.g., a small data transmission (SDT) procedure) may be performed whereby small amounts of data, in short bursts, may be transmitted and/or received. A transmission type may be selected and used for data transmission during the communication procedure. A transmission type for data transmission during an ongoing communication procedure may be changed to accommodate one or more variables such as changing channel conditions, data volume, traffic load, wireless device location, etc. For example, the transmission type may be changed between a transmission type that uses a configured grant and a transmission type that uses a random access procedure, and/or may be changed such that a wireless device transitions to a connected state for further data transmission. Changing a transmission type during an ongoing procedure may provide advantages such as reduced retransmissions, reduced power consumption, improved data throughput, and/or enabled selection of various functions/procedures that may provide improved quality of service (QoS).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

DETAILED DESCRIPTION

Figure 2A:
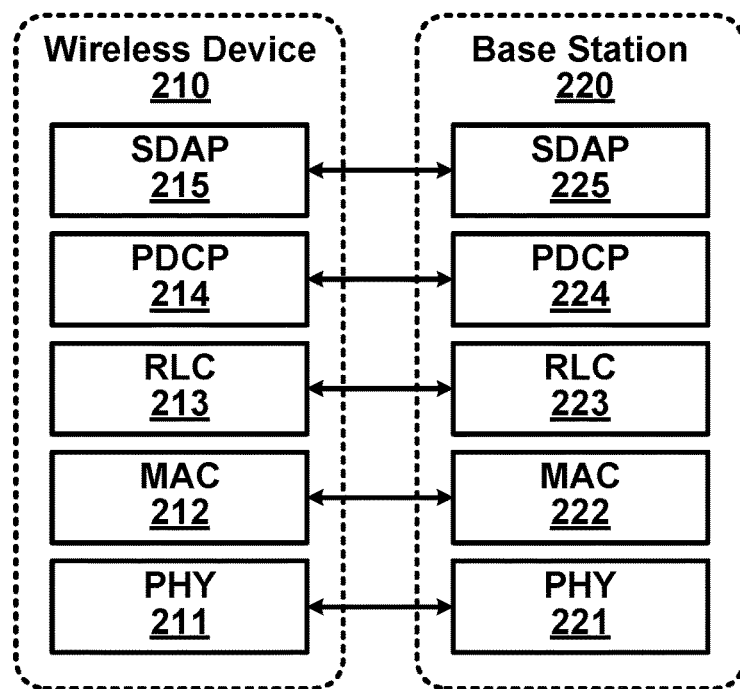
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to a small data transmission (SDT) procedure for wireless communication.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
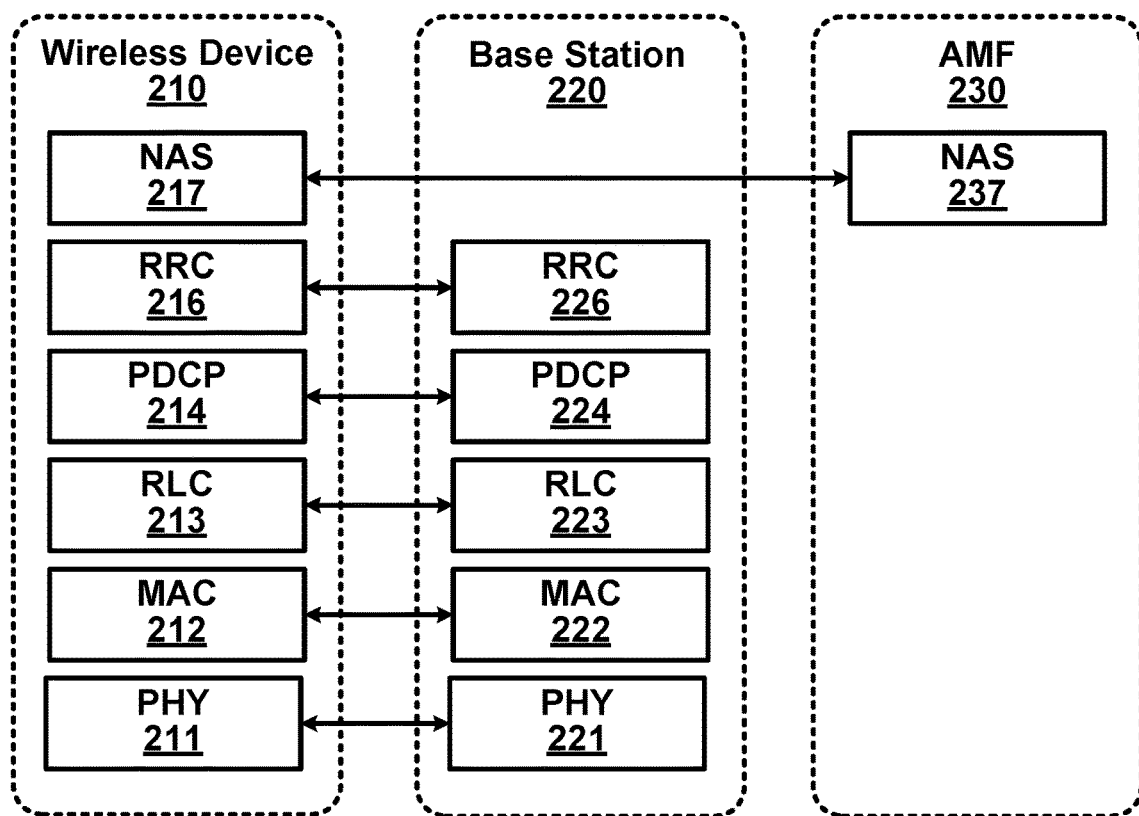
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
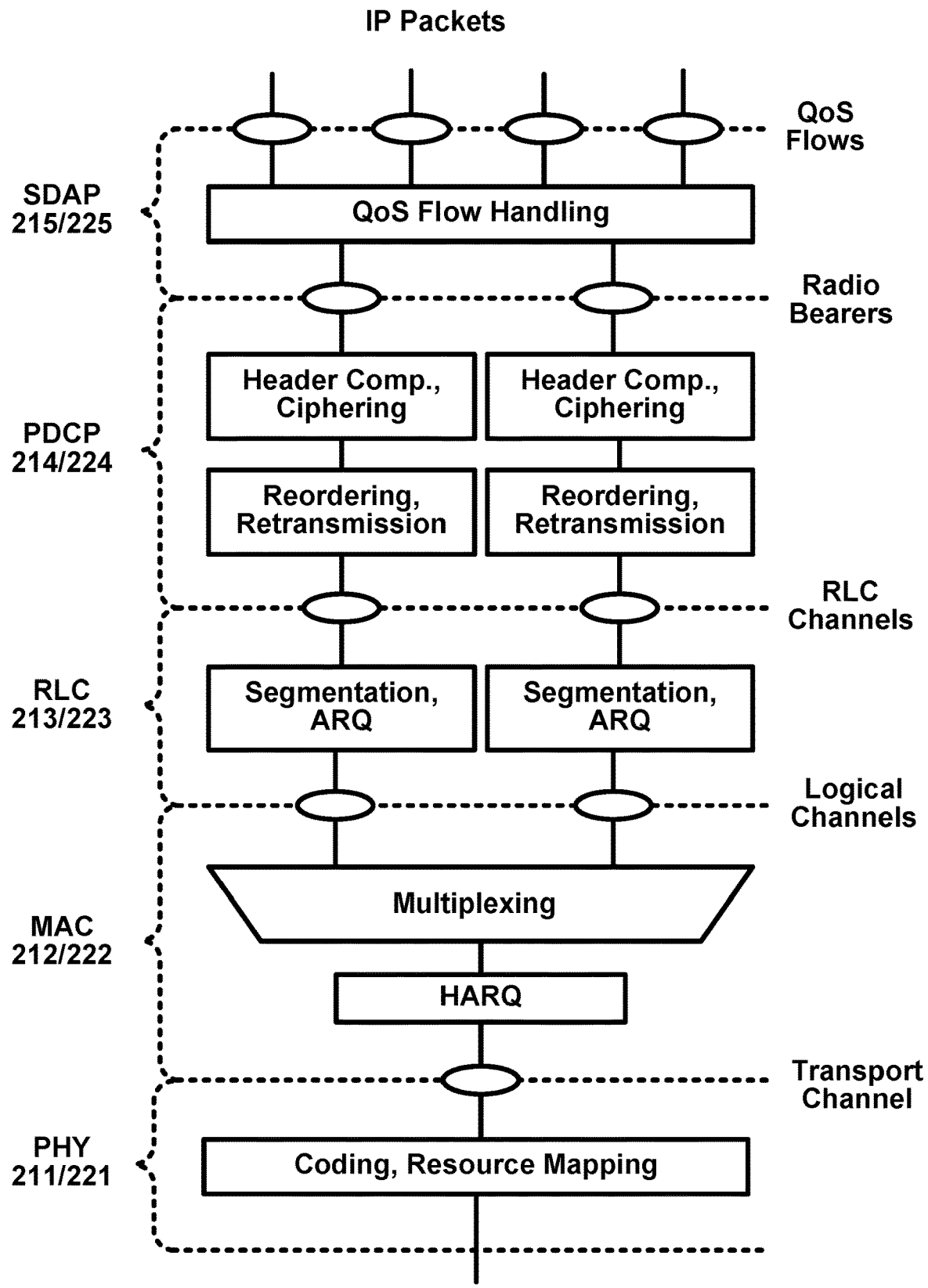
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources).

The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222)

may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figure 4A:
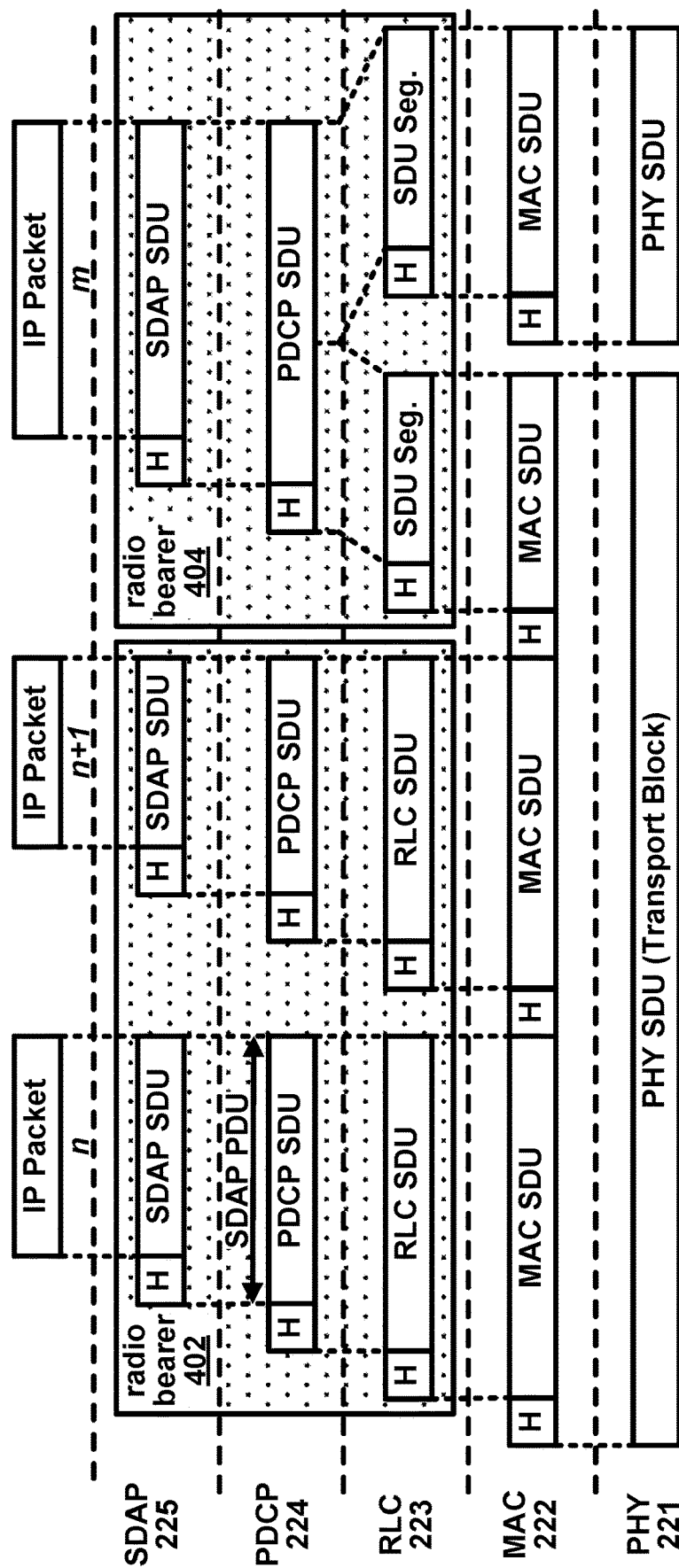
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
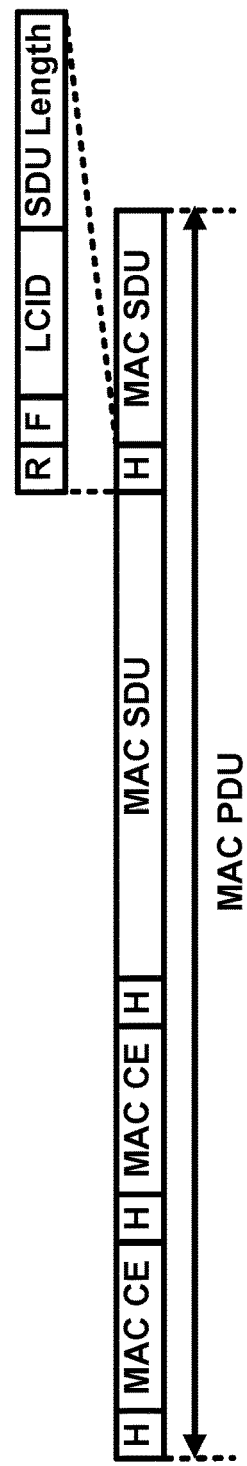
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIB s). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
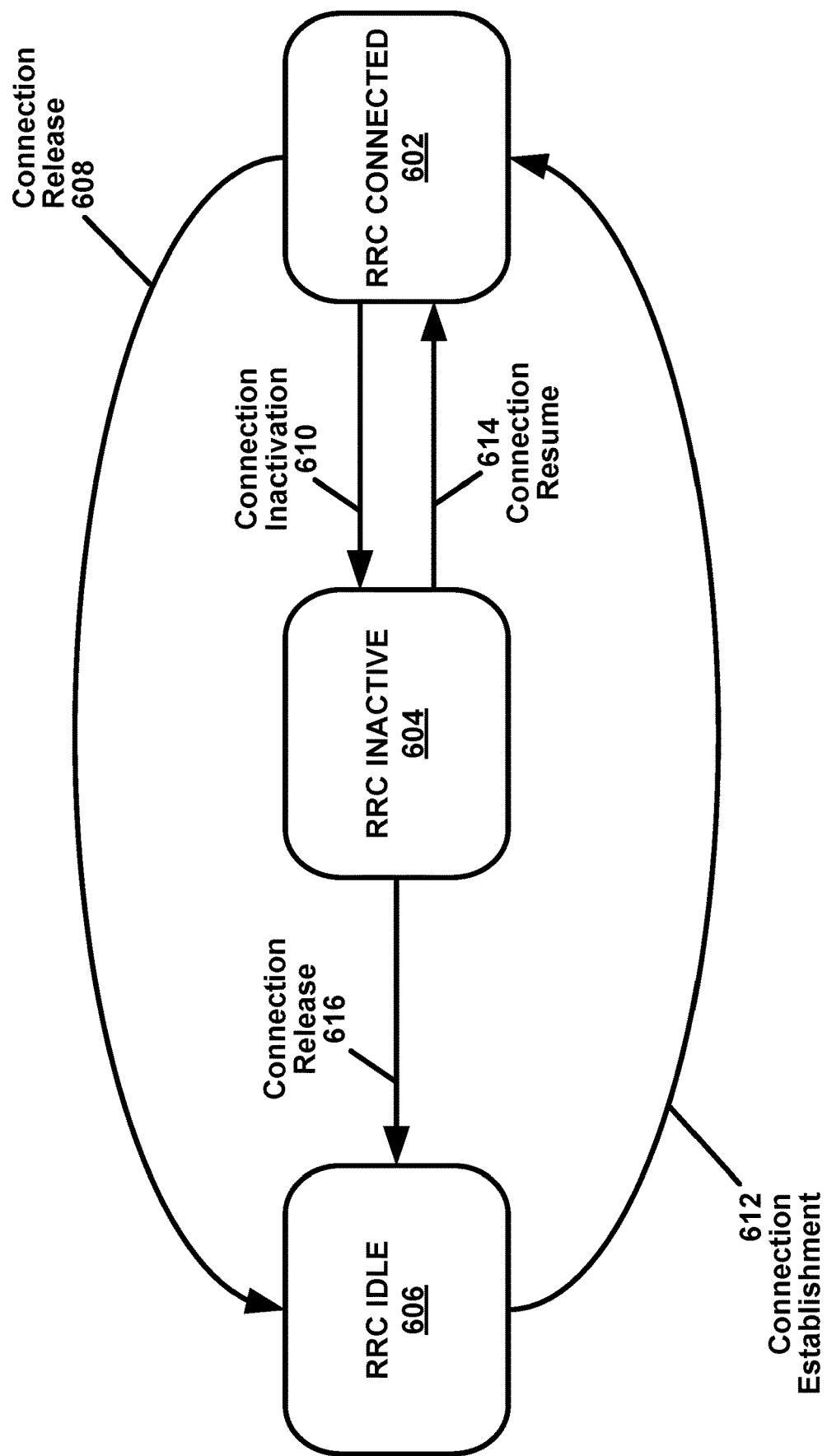
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/ configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/ provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/ output by the II-NT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
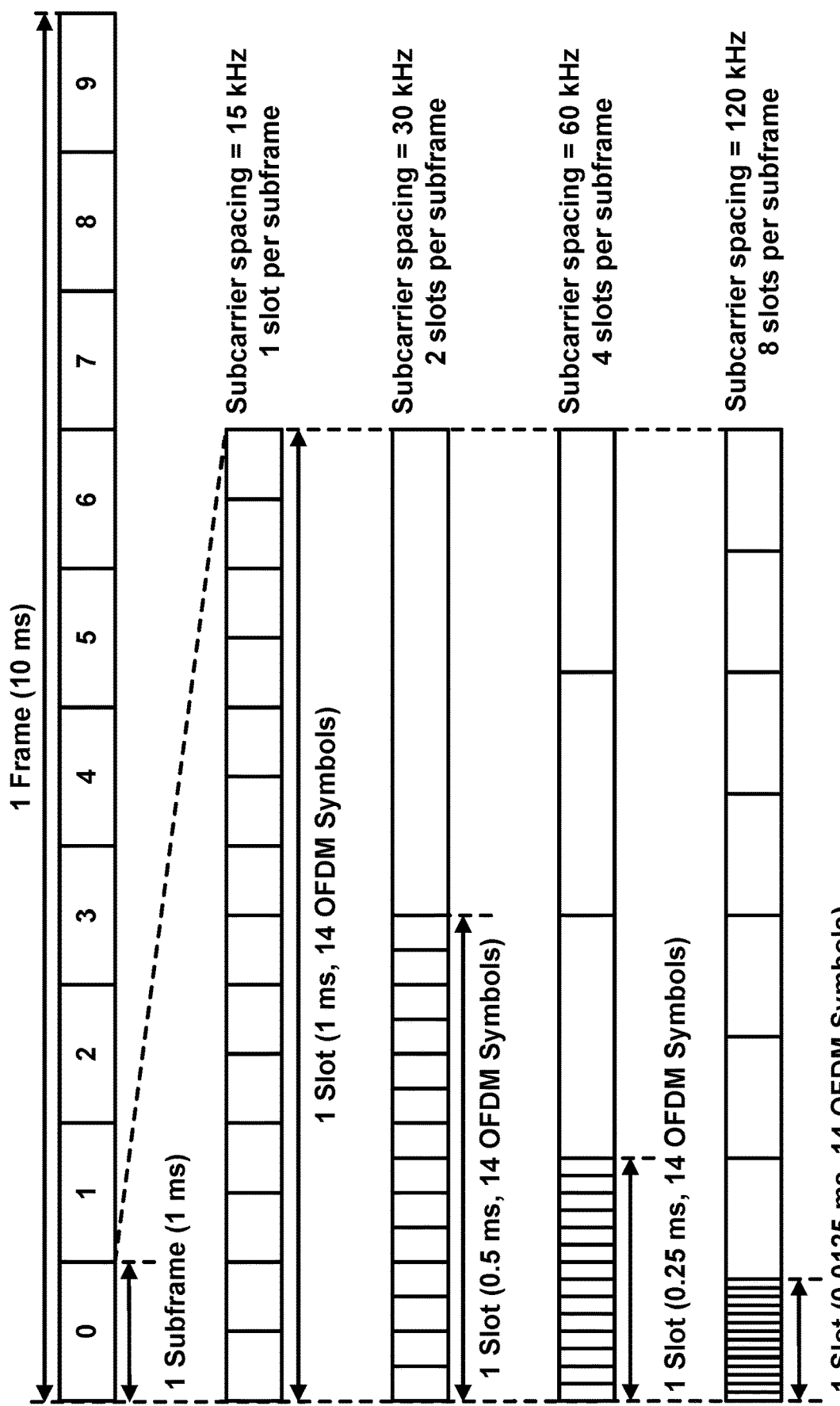
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/ cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
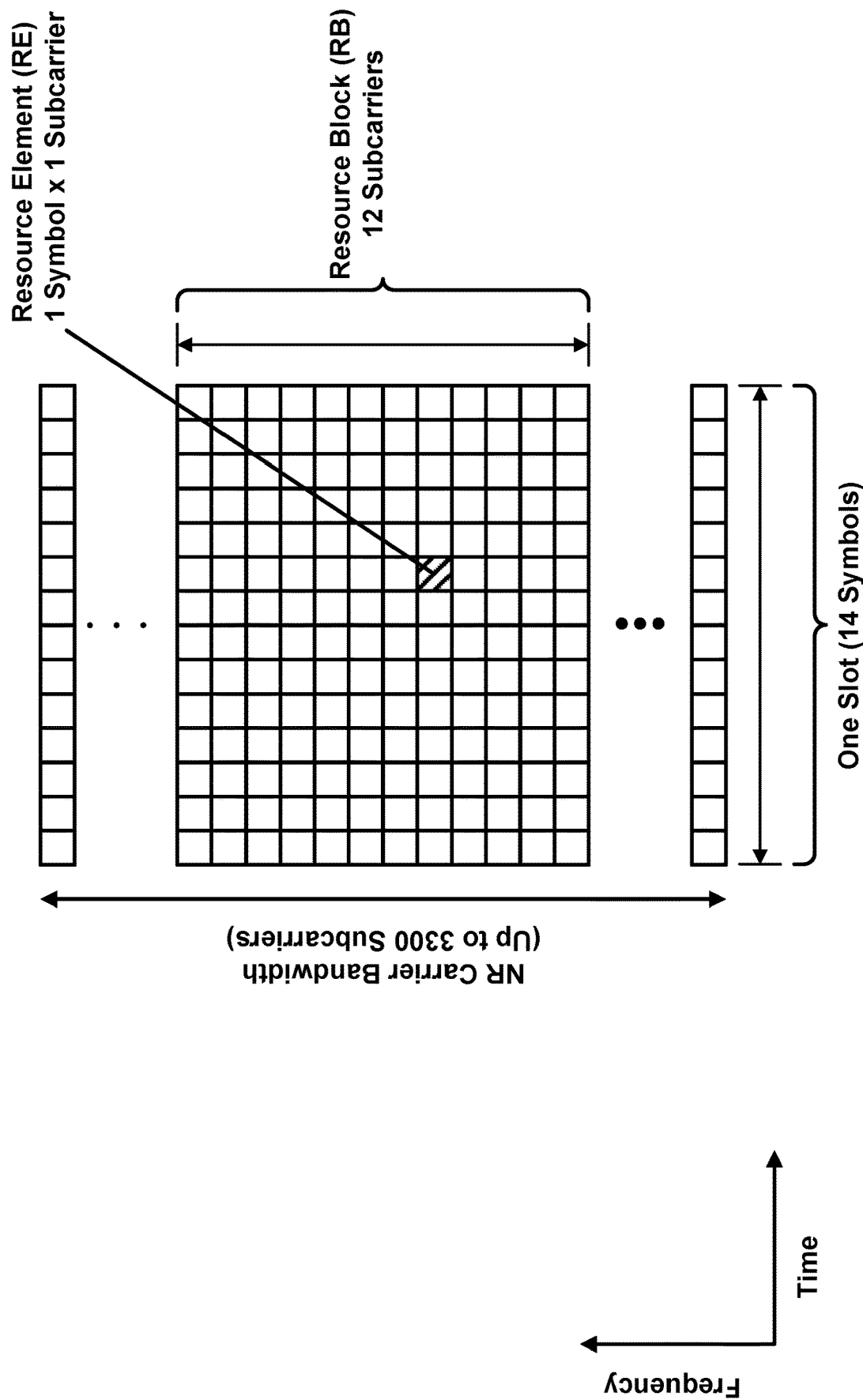
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
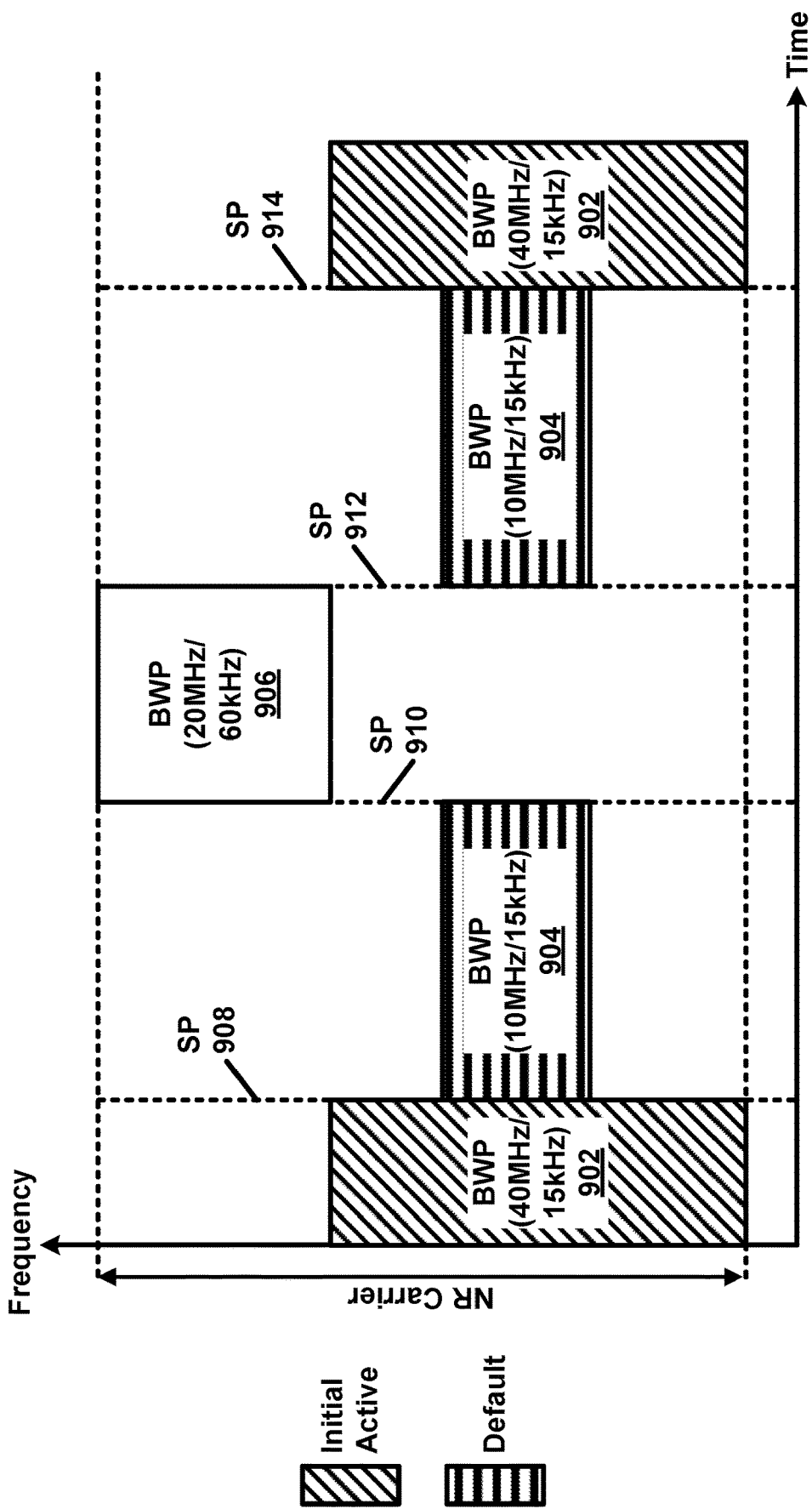
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
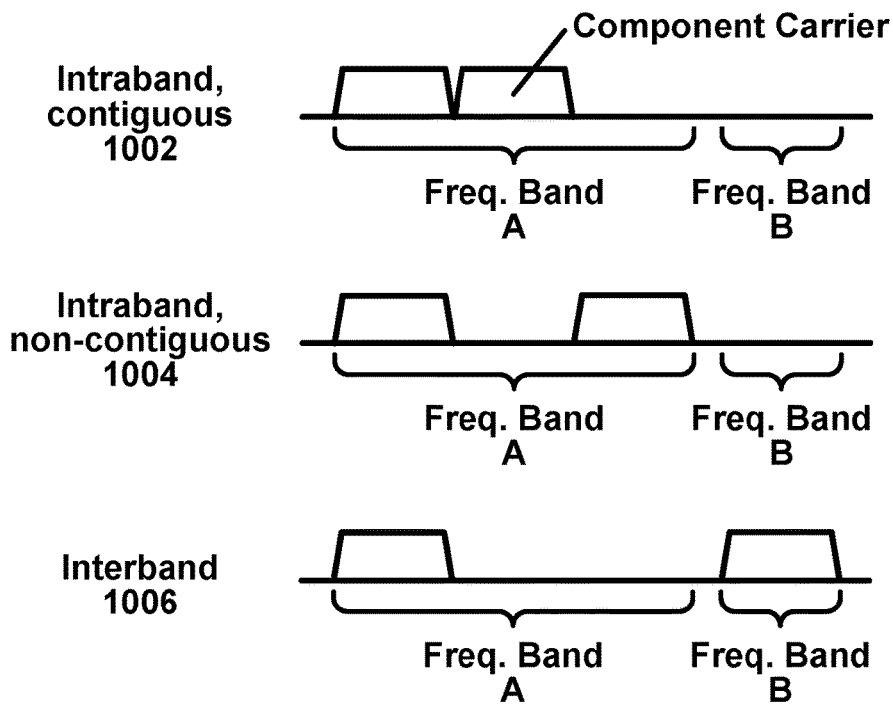
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
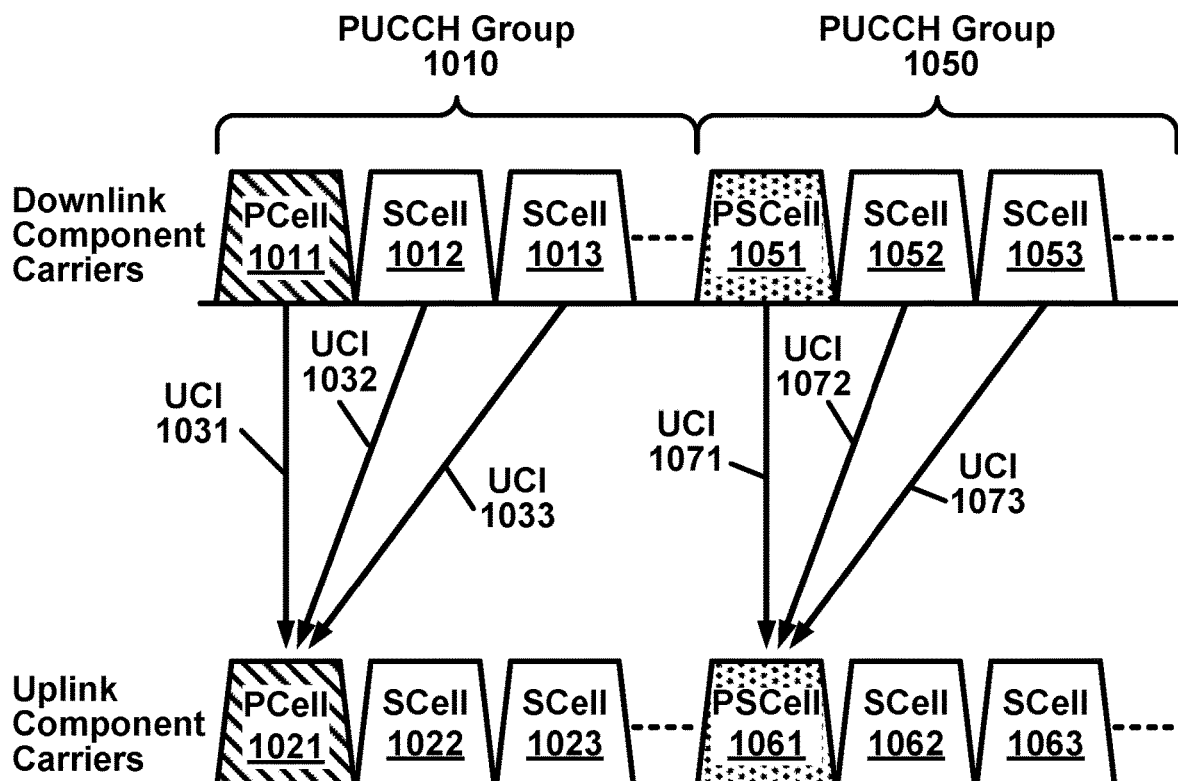
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
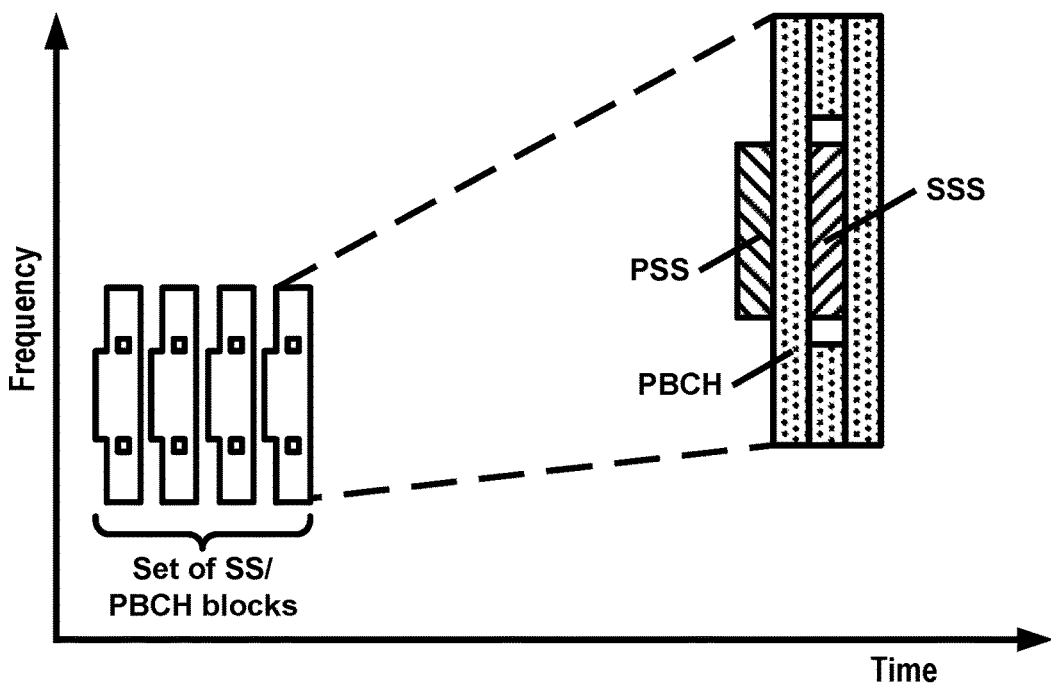
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
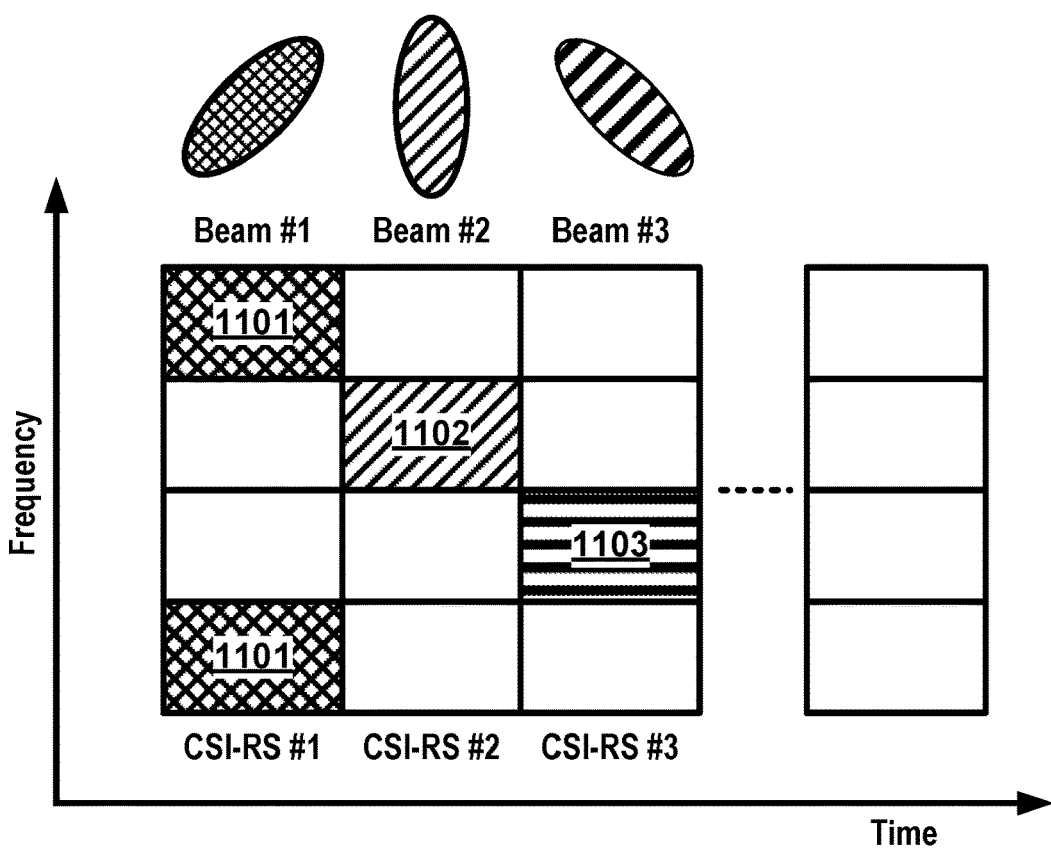
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device.

The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI), fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1331 may be sent/transmitted in an uplink transmission by the wireless device. Msg A 1331 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCI messages may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCI messages with one or more DCI formats, for example, depending on the purpose and/or content of the DCI messages. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
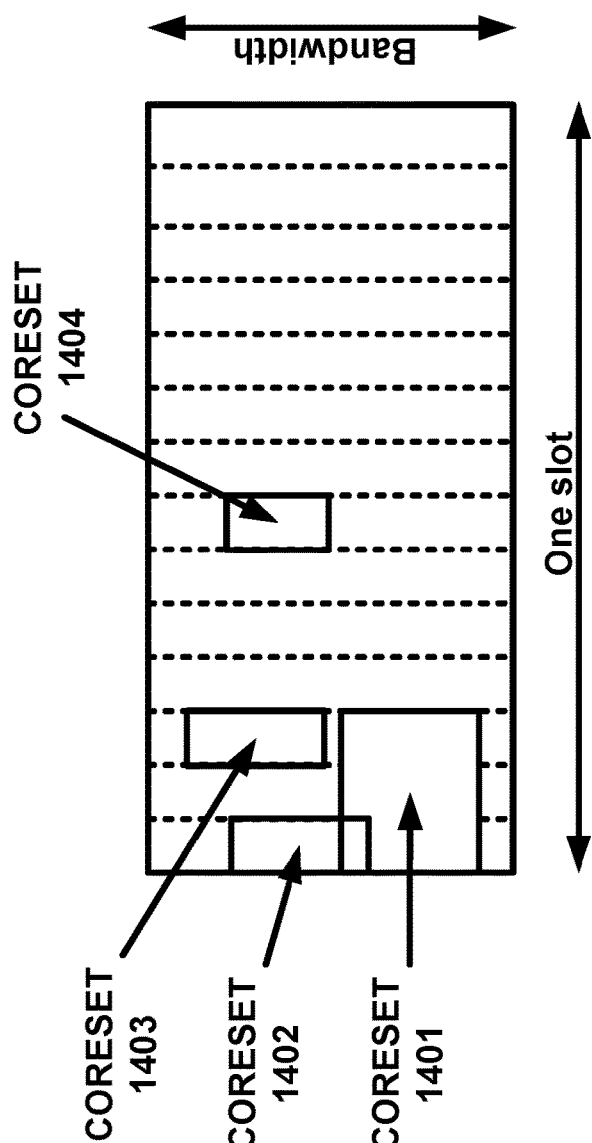
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
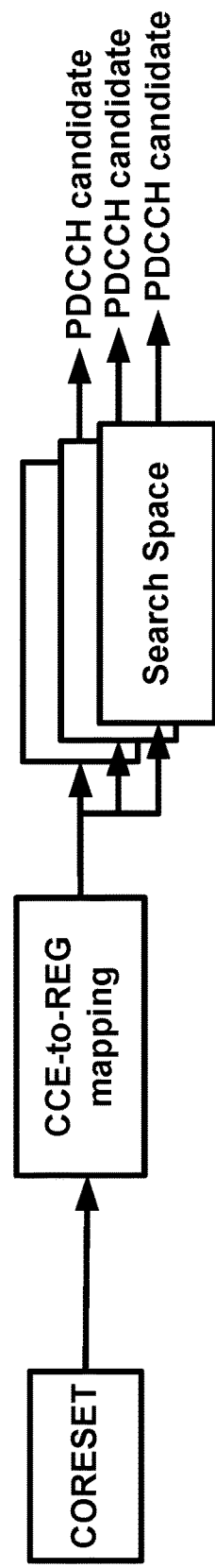
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCI messages. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station.

The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit)

PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
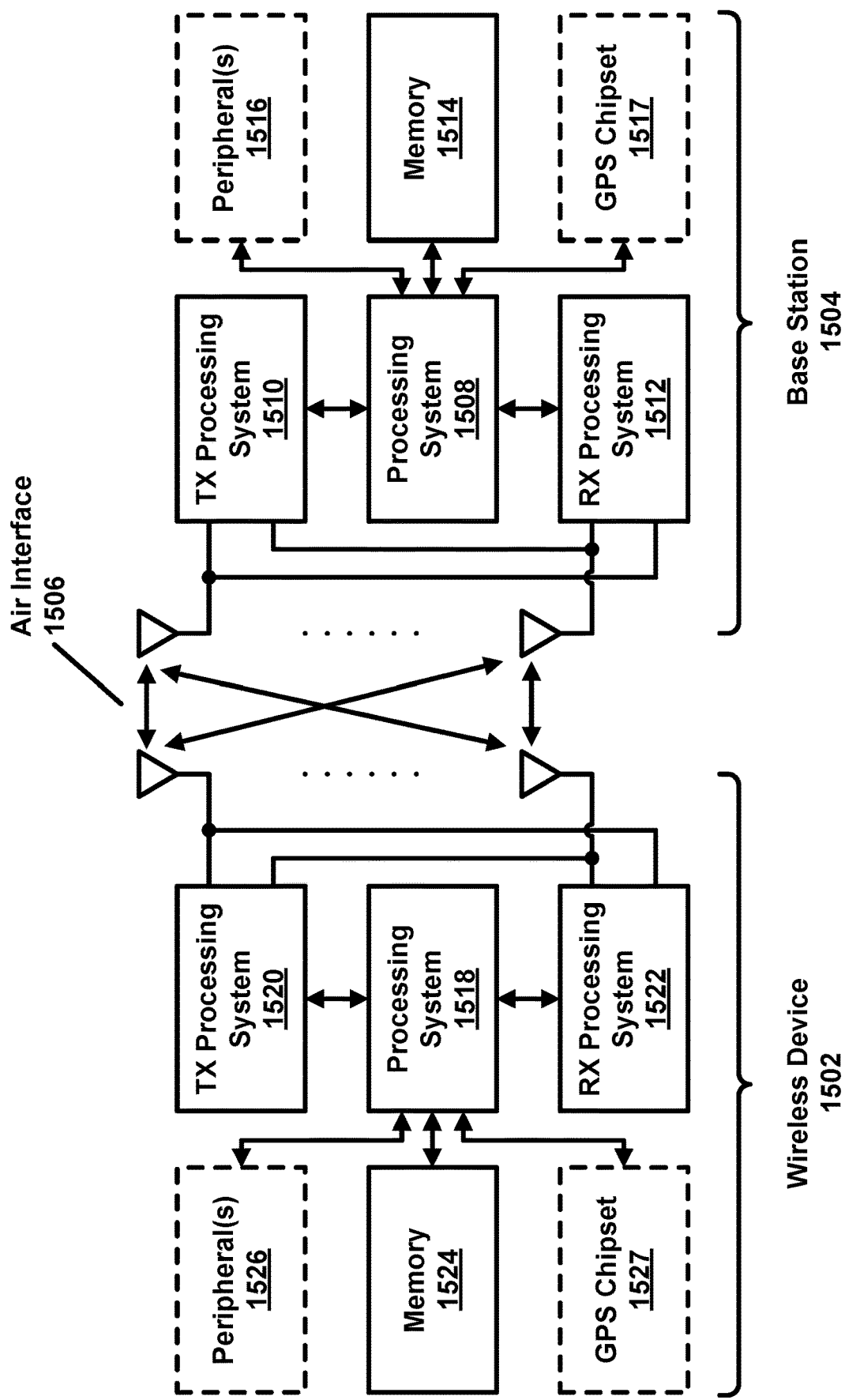
FIG. 15A shows an example of communications between a wireless device and a base station.

FIG. 15A shows example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
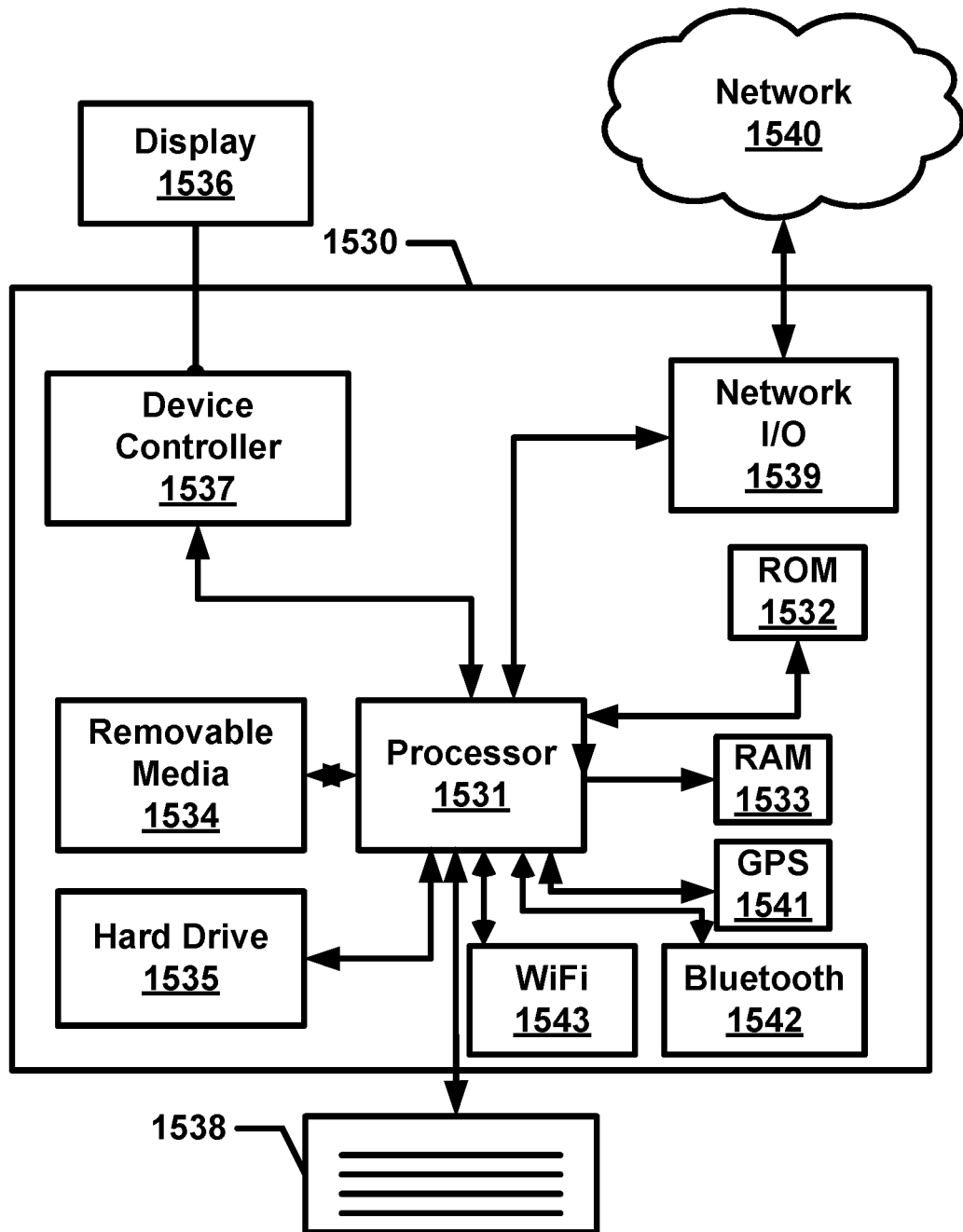
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may connect to a network for transmission and/or reception of data. Connecting to a network may comprise setting up (e.g., (re)-establishing and/or resuming) a connection (e.g., an RRC connection) to the network. For example, an RRC state of the wireless device may be an RRC connected state (e.g., RRC_CONNECTED state) for sending/transmitting (or receiving) data (e.g., data corresponding to DTCH). The wireless device may not perform (e.g., may not be allowed to perform or may be prohibited to perform) an uplink transmission (or receive a downlink transmission) in a non-RRC connected state (e.g., a non-RRC_CONNECTED state, an RRC_INACTIVE state, and/or an RRC_IDLE state). Non-RRC connected state is used herein to refer to a state other than an RRC-connected state. Such non-RRC connected states may comprise, for example, an RRC inactive state and/or an RRC idle state. The data may be downlink (DL) (e.g., mobile terminated (MT)) data and/or uplink (UL) (e.g., mobile originated (MO)) data.

A wireless device may perform one or more procedures to connect to the network in the non-RRC connected state (e.g., RRC inactive state (RRC_INACTIVE state), or RRC idle state (RRC_IDLE state)). The one or more procedures may comprise a connection setup procedure, a connection (re-)establish procedure, and/or a connection resume procedure. The wireless device may perform the one or more procedures, for example, if downlink (e.g., mobile terminated (MT)) and/or uplink (e.g., mobile originated (MO)) data are available in a buffer (e.g., at a base station or at a wireless device). The RRC state of the wireless device may transition to an RRC connected state (e.g., RRC_CONNECTED state) from a non-RRC connected state (e.g., an RRC_INACTIVE state and/or an RRC_IDLE state), for example, based on the one or more procedures. The RRC state of the wireless device may transition to an RRC connected state from a non-RRC connected state, for example, based on/in response to successfully completing a connection setup procedure, a connection (re-)establish procedure, or a connection resume procedure. The wireless device may receive downlink data and/or downlink signal(s) via downlink transmission(s) and/or may transmit uplink data and/or uplink signal(s) via uplink transmission(s) in the RRC connected state. The wireless device may transition to the non-RRC connected state from the RRC connected state, for example, based on (e.g., after or in response to) determining that no more downlink data (e.g., to be received) and/or no more uplink data (e.g., to be transmitted) is present in buffer(s). The wireless device may perform a connection release procedure, for example, to transition to the non-RRC connected state from the RRC connected state. The connection release procedure (e.g., an RRC release procedure) may result in transitioning the RRC state to the non-RRC connected state.

Frequent RRC state transitions between RRC states (e.g., between a non-RRC connected state and an RRC connected state) may require a wireless device to send and/or receive a plurality of control signals (e.g., RRC message(s), MAC CE(s), and/or DCI messages) in one or more layers (e.g., RRC layer, MAC layer, and/or PHY layer). For example, for an RRC connection setup procedure, a wireless device may send/transmit, to a base station, an RRC connection setup request and receive an RRC connection setup message as a response to the RRC connection setup request. For an RRC connection resume procedure, the wireless device may send/transmit, to a base station, an RRC connection resume request and receive an RRC connection resume message as a response to the RRC connection resume request. For an RRC connection release procedure, the wireless device may receive, from a base station, an RRC connection release request.

The wireless device may often need to perform small and/or infrequent data transmissions (e.g., small data transmissions). Examples of small and/or infrequent data transmissions may comprise traffic generated by smartphone applications, instant messaging (IM) services, heart-beat/keep-alive traffic from IM/email clients and other apps, push notifications from various applications, non-smartphone applications, wearables (e.g., positioning information), sensors (e.g., for transmitting temperature, pressure readings periodically or in an event triggered manner), smart meters and smart meter networks sending meter readings, etc.

It may be inefficient for a wireless device to connect to a network (e.g., transition to an RRC connected state) to perform small data transmissions and/or to disconnect from the network (e.g., transition to a non-RRC connected state) following completion of the small data transmissions. For example, it may be inefficient for a wireless device, in a non-RRC connected state, to connect (or resume a connection) to a network (e.g., transition to an RRC connected state from the non-RRC connected state) for downlink transmission and/or uplink transmission of available small data, and release the connection (e.g., transition to the non-RRC connected state from the RRC connected state) based on (e.g., after or in response to) receiving the downlink transmission and/or performing the uplink transmission of the small data in the RRC connected state. Transitioning between different RRC states may result in increased power consumption and/or signaling overhead. The signaling overhead (e.g., control signaling overhead for an RRC connection setup/resume procedure and/or an RRC connection release procedure) required to transmit a payload may be larger than the payload. Frequent RRC state transitions for the small and infrequent downlink and/or uplink data packet(s) may cause excessive power consumption and signaling overhead for the wireless device.

Transmission(s) (e.g., downlink and/or uplink transmission(s)) in a non-RRC connected state may be beneficial. A wireless device may send/transmit and/or receive one or more data packets in a non-RRC connected state. A wireless device may send/transmit and/or receive one or more data packets without making a connection (e.g., an RRC connection) while maintaining a non-RRC connected state.

A wireless device may receive scheduling information (e.g., RRC message and/or SIB) indicating one or more uplink (or downlink) radio resources in the non-RRC connected state for the wireless device. The wireless device may receive the scheduling information from a base station (e.g., a base station may transmit the scheduling information to the wireless device). The one or more uplink (or downlink) radio resources may be for infrequent data transmission. The one or more uplink (or downlink) radio resources may be for non-periodic data transmission. The one or more uplink (or downlink) radio resources may be for periodic data transmission. The wireless device may send/transmit (or receive) the one or more data packets via the one or more radio resources while keeping (e.g., maintaining) its RRC state as the non-RRC connected state. The wireless device may not transition its RRC state to the RRC connected state to send/transmit (or receive) the one or more data packets. The uplink (or downlink) transmission(s) via the one or more radio resources in a non-RRC connected state may be efficient and flexible (e.g., for low throughput short data bursts). The uplink (or downlink) transmission(s) via the one or more radio resources in a non-RRC connected state may provide efficient signaling mechanisms (e.g., signaling overhead may be less than a payload/data packets to be sent/received). The uplink (or downlink) transmission(s) via the one or more radio resources in a non-RRC connected state may reduce signaling overhead. The uplink (or downlink) transmission(s) via the one or more radio resources in a non-RRC connected state may improve the battery performance of the wireless device. A wireless device that has to send (or receive) intermittent small data packets in the non-RRC connected state may benefit from such uplink (or downlink) transmission(s) in the non-RRC connected state.

Uplink transmission(s) in a non-RRC connected state may be based on a random access (RA) procedure. The wireless device may send/transmit at least one preamble of the RA procedure to perform the uplink transmission(s). A wireless device may send/transmit uplink data (e.g., data of DTCH and/or SDU of DTCH) via a Msg A PUSCH and/or a Msg 3 PUSCH during the RA procedure. The wireless device may keep (or maintain) an RRC state as the non-RRC connected state during and/or after the RA procedure. The wireless device may keep (or maintain) an RRC state as the non-RRC connected state, for example, based on (e.g., after or in response to) completing the transmission of the uplink data and/or completing the RA procedure.

Uplink transmission(s) in a non-RRC connected state may be based on pre-configured PUSCH resource(s). A wireless device may receive resource configuration parameters indicating uplink grant(s) and/or the (pre-)configured uplink resource(s) of the uplink grant(s). The uplink grant(s) and/or the (pre-)configured uplink resource(s) may be configured for uplink data transmission via PUSCH in the non-RRC connected state. The wireless device may send/transmit uplink data (e.g., associated with DTCH) using the uplink grant(s) and/or via the (pre-)configured uplink resource(s) of the uplink grant(s) in the non-RRC connected state.

Transmissions (e.g., uplink/downlink transmission(s), data transmissions) in a non-RRC connected state may be referred to as small data transmission (SDT), early data transmission (EDT), and/or data transmission via (pre-)configured uplink resource(s) (PURs). As described herein, an SDT and/or an EDT may comprise (or correspond to) uplink data transmission(s) in a non-RRC connected state. Radio resource(s) used for an SDT in a non-RRC connected state may be referred to as PUR(s). Uplink data transmission(s) based on an RA procedure in a non-RRC connected state may be referred to as an RA-based SDT, an RA-based EDT, an EDT, etc. An uplink data transmission based on (pre-)configured grant(s) in a non-RRC connected state may be referred to as (pre-)configured grant based SDT (CG-based SDT). One or more radio resources of the (pre)configured grant(s) may be referred to as PURs, SDT resources, resources of SDT, etc.

While various examples herein may generally refer to uplink transmissions in a non-RRC connected state, the described procedures may be applied to any type of transmissions (e.g., uplink transmissions, downlink transmissions, sidelink transmissions, unicast transmissions, broadcast transmissions, multicast transmissions, etc.) in any state (e.g., RRC connected state or non-RRC connected state). While various examples herein may generally refer to SDT, the communication procedures described herein with respect to SDT may apply to any communication procedure involving any quantity of data (e.g., a small quantity, a quantity of data less than a threshold, a quantity of data greater than a first threshold and/or less than a second threshold, etc.).

Figure 17:
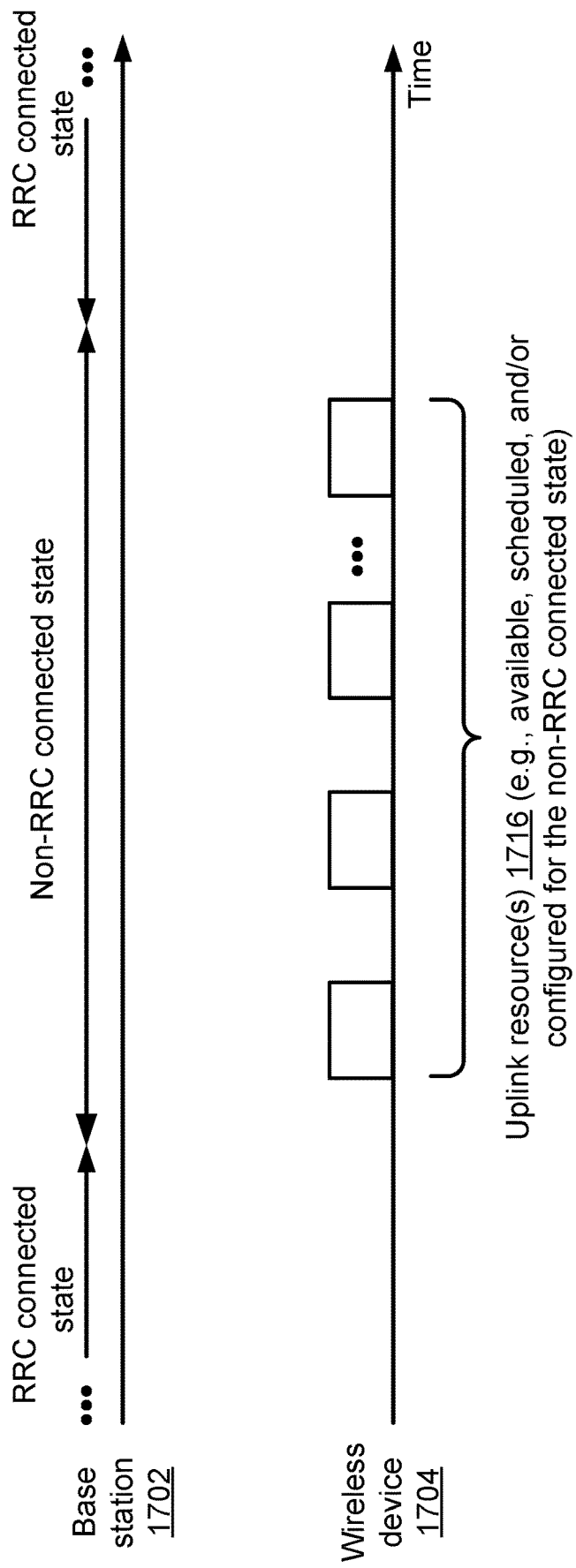
FIG. 17 shows example uplink data transmission in a non-RRC connected state.

FIG. 17 shows uplink data transmission in a non-RRC connected state. A wireless device 1704 may receive one or more messages comprising configuration parameters for the uplink data transmission. The wireless device 1704 may receive the one or more messages in an RRC connected state. The wireless device 1704 may receive the one or more messages in a non-RRC connected state. The one or more messages may comprise a broadcast message (e.g., an SIB message, such as SIB1). The one or more messages may be wireless device-specific (e.g., an RRC message, MAC CE, and/or DCI dedicated to the wireless device 1704). The one or more messages may comprise an RRC release message. The wireless device 1704 may receive the RRC release message in the RRC connected state. The configuration parameters may indicate uplink grant(s) and/or radio resource(s) available, scheduled, and/or configured for SDT(s) in the non-RRC connected state. The wireless device 1704 may keep the RRC state as the non-RRC connected state, for example, after and/or while performing the SDT(s).

The wireless device 1704 may determine to transition an RRC state of the wireless device 1704 to a non-RRC connected state from an RRC connected state. The wireless device 1704 may determine to transition an RRC state to the non-RRC connected state, for example, based on (e.g., after or in response to) receiving an RRC message (e.g., RRC release message).

The wireless device 1704 may receive, from the base station, an RRC message (e.g., RRC release message). The RRC message (e.g., an RRC release message) may indicate a release of an RRC connection from a network. The wireless device 1704 may perform an RRC release procedure, for example, based on (e.g., in response to) receiving the RRC message. The RRC release procedure may comprise a release and/or a suspension of established radio bearers and/or configured radio resources. The RRC release procedure may comprise a suspension of the RRC connection (e.g., if a signaling radio bearer (SRB) (e.g., SRB2) and/or at least one dedicated radio bearer (DRB) are setup) and/or a suspension of the established radio bearer(s). The wireless device may determine to transition an RRC state of the wireless devices to a non-RRC connected state from an RRC connected state, for example, based on (e.g., after and/or in response to) receiving the RRC message (or performing the RRC release procedure).

The wireless device 1704 may determine to transition an RRC state of the wireless device 1704 from a non-RRC connected state to an RRC connected state. The wireless device 1704 may perform an RA procedure to transition to the RRC connected state. The wireless device 1704 may transition to the RRC connected state without an RA procedure.

The wireless device 1704 may transition to the RRC connected state via an RA procedure. The wireless device 1704 may perform (and/or initiate) the RA procedure for an SDT. The wireless device 1704 may perform the RA procedure as an RA-based SDT. The wireless device 1704 may perform (and/or initiate) the RA procedure for an initial access. The initial access may be initiated based on receiving, by the wireless device 1704, a paging message. The initial access may be initiated based on a cell (re)selection procedure performed by the wireless device 1704. The wireless device 1704 may receive a message (e.g., Msg B, Msg 4, an RRC setup message, and/or an RRC resume messages) comprising an indication of transitioning to the RRC connected state (e.g., indicating a transition to the RRC connected state). The wireless device 1704 may transition to the RRC connected state, for example, based on (e.g., after and/or in response to) receiving the message. Transitions from the RRC connected state to the non-RRC connected state, and vice versa, are further described with respect to FIG. 6.

The wireless device 1704 may perform (and/or initiate) a CG-based SDT for uplink transmission of uplink data in the non-RRC connected state. The wireless device 1704 may monitor, based on the CG-based SDT, a PDCCH in the non-RRC connected state. The CG-based SDT may require the wireless device to monitor the PDCCH, for example, to receive a response to the uplink transmission, to receive uplink grant(s), and/or downlink assignment(s). The wireless device 1704 may monitor the PDCCH based on (e.g., in response to) transmitting the uplink data via the CG-based SDT. The wireless device 1704 may monitor the PDCCH during a period of time (e.g., in a time window, in a time interval, and/or while a timer is running) The period of time may be predefined and/or configured by a base station to the wireless device. The wireless device 1704 may receive, via the PDCCH during the period of time, downlink control message(s) (e.g., DCI) comprising a downlink assignment (e.g., that schedules a downlink transmission). The wireless device 1704 may receive based on the downlink assignment, a message (e.g., an RRC setup message and/or an RRC resume message) comprising an indication of transitioning to the RRC connected state. The wireless device 1704 may transition to the RRC connected state, for example, based on (e.g., after and/or in response to) receiving the message. The wireless device 1704 may make an RRC connection (e.g., based on transitioning to the RRC connected state) to a network (and/or a base station) via the CG-based SDT. The wireless device 1704 may make an RRC connection to a network (and/or a base station) without an RA procedure.

A wireless device may receive (e.g., from a base station) one or more configuration parameters. The one or more configuration parameters may indicate and/or comprise a quantity (e.g., number) of occasions of one or more uplink radio resources (e.g., indicated by a higher layer parameter NumOccasions). The one or more configuration parameters (e.g., quantity of occasions) may indicate that the one or more uplink radio resources are one time use resources (or grant) for a single uplink transmission. The one or more configuration parameters (e.g., quantity of occasions) may indicate that the one or more uplink radio resources are a plurality of uplink radio resources. The one or more configuration parameters (e.g., quantity of occasions) may indicate that the one or more uplink radio resources are one or more periodic radio resources. For example, the wireless device 1704 may receive one or more configuration parameters, from the base station 1702, indicating uplink resources 1716. The uplink resources 1716 may be available, scheduled, and/or configured for the non-RRC connected state of the wireless device 1704.

The one or more uplink radio resources may be for CG-based SDT and/or RA-based SDT. The wireless device may receive one or more RRC messages (e.g., a broadcast, multicast, and/or wireless device specific messages) comprising the one or more configuration parameters. The wireless device may receive at least one of the one or more RRC messages in an RRC connected state. The wireless device may receive at least one of the one or more RRC messages in a non-RRC connected state.

A wireless device may initiate an RA procedure (e.g., RA-based SDT and/or EDT) on a cell to transmit, via the cell, uplink data in a non-RRC connected state. The uplink data may be associated with a particular logical channel. The uplink data may comprise a service data unit (SDU) from a particular logical channel (e.g., DTCH). The wireless device may keep its RRC state as the non-RRC connected state while performing the RA procedure and/or while transmitting the uplink data during the RA procedure. The wireless device may keep the non-RRC connected state based on (e.g., in response to and/or after) completing the RA procedure and/or completing the transmission of the uplink data.

A network and/or a base station may indicate a cell that is available for transmission (e.g., SDT and/or EDT) of uplink data (e.g., associated with DTCH) in a non-RRC connected state. The wireless device may receive, from the base station via a cell, a message (e.g., broadcast, multicast, and/or unicast message) indicating whether the transmission of the uplink data on the cell may be performed in the non-RRC connected state. A message (e.g., broadcast, multicast, and/or unicast message) may indicate whether an RA-based SDT (e.g., EDT) on the cell may be performed in the non-RRC connected state. A message (e.g., broadcast, multicast, and/or unicast message) may indicate whether a CG-based SDT (e.g., PUR) on the cell may be performed in the non-RRC connected state. A message (e.g., broadcast, multicast, and/or unicast message) may indicate whether an SDT (e.g., RA-based SDT and/or CG-based SDT) on the cell may be performed in the non-RRC connected state. The message may be broadcast (or multicast) system information block(s) of a cell and/or an RRC message dedicated to the wireless device.

A wireless device may receive an RRC message (e.g., system information block(s)) via a cell. The RRC message may comprise one or more parameters indicating whether the wireless device is allowed to perform, via the cell, the transmission of uplink data in a non-RRC connected state. The one or more parameters may be a field indicating the wireless device is allowed to initiate an RA-based SDT on the cell. The indication may be true (e.g., indicating that initiating the RA-based SDT is allowed) or false (e.g., indicating that initiating the RA-based SDT is not allowed). The indication may be a presence of the field (e.g., indicating that initiating the RA-based SDT is allowed) or an absence of the field (e.g., indicating that initiating the RA-based SDT is not allowed).

The field may indicate that the wireless device is allowed to initiate RA-based SDT on the cell for transmission of a particular type of data. For example, the particular type of data may comprise control plane (CP) data, user plane (UP) data, mobile originating (MO) data (or call), mobile terminating (MT) data (or call), etc. Example formats of the field for CP and UP data may be:

| | | |
|---|---|---|
| cp-SDT | ENUMERATED {true} | OPTIONAL, -- Need OR |
| up-SDT | ENUMERATED {true} | OPTIONAL, -- Need OR. | cp-SDT (=true) and up-SDT (=true) may respectively indicate that the wireless device is allowed to initiate SDT for transmission of CP data and UP data.

The field may indicate that the wireless device is allowed to initiate RA-based SDT on the cell if/when the wireless device is connected to a particular type of network. The particular type of network may comprise an evolved packet core (EPC) network, a 5G core (5GC) network, and/or the like. The field may indicate that the wireless device is allowed to initiate an RA-based SDT on the cell for transmission of a particular type of data if/when the wireless device is connected to the particular type of network. Example formats of the field for transmission of CP data via EPC or 5GC may be:

| | | |
|---|---|---|
| cp-SDT-EPC | ENUMERATED {true} | OPTIONAL, -- Need OR |
| cp-SDT-5GC | ENUMERATED {true} | OPTIONAL, -- Need OR. | cp-SDT-EPC (=true) and cp-SDT-5GC (=true) may respectively indicate that the wireless device is allowed to initiate the RA-based SDT for transmission of CP data via the EPC and 5GC.

The wireless device may initiate an RA-based SDT on a cell based on one or more conditions being fulfilled/satisfied. For example, the one or more conditions may be whether upper layer(s) request an establishment or resumption of an RRC connection, whether the wireless device supports the SDT for a particular type of data, whether one or more parameters (e.g., broadcast via system information block(s)) indicate that the wireless device may initiate the RA-based SDT for the particular type of data if/when the wireless device is connected to a particular type of network. For example, for cp-SDT, if the wireless device is connected to 5GC, the wireless device may initiate the RA-based SDT for the CP data based on at least one of upper layer(s) requesting an establishment or resumption of an RRC connection, CP-SDT being allowed by the wireless device, and/or system information block(s) indicating that cp-SDT-5GC is equal to true.

For an SDT (e.g., RA-based SDT and/or CG-based SDT), the wireless device may determine a size of a transport block (e.g., a size of message comprising uplink data and/or a data volume size of the message comprising uplink data). The transport block may comprise uplink data (e.g., associated with DTCH) that the wireless device may transmit via the SDT. The transport block may comprise (e.g., further comprise) one or more MAC headers (e.g., if required) and/or one or more MAC CEs (e.g., if triggered). The transport block that the wireless device transmits via the RA-based the SDT may be a MAC PDU that comprises the uplink data, the one or more MAC headers, and/or the one or more MAC CEs.

A network and/or a base station may send/transmit (e.g., broadcast, multicast, and/or unicast) one or more messages (e.g., system information block(s), RRC message(s), MAC CE(s), DCI(s) and/or any combination thereof). The one or more messages may comprise one or more indications (e.g., one or more SDT transport block size (sdt-TBS) values) of a cell. The one or more sdt-TBS values may indicate an amount/quantity of uplink data (e.g., associated with DTCH) that a wireless device may transmit via an SDT (e.g., RA-based SDT and/or CG-based SDT) on the cell. The wireless device that receives the one or more messages may determine, based on the one or more sdt-TBS values, whether the wireless device may initiate an SDT (e.g., RA-based SDT and/or CG-based SDT) on the cell. The wireless device may determine a size of transport block comprising uplink data (e.g., data volume size of the message comprising uplink data). The wireless device may determine to send/transmit the uplink data via the SDT (or initiate the SDT for transmission of the uplink data), for example, if the size of the transport block is smaller than or equal to at least one of the one or more sdt-TBS values. The wireless device may be allowed to initiate the SDT on the cell for transmission of the uplink data, for example, if the size of the transport block is smaller than or equal to at least one of the one or more sdt-TBS values. The wireless device may determine not to transmit the uplink data via the SDT, for example, if the size is larger than at least one of the one or more sdt-TBS values (e.g., larger than all of the one or more sdt-TBS values). The wireless device may not be allowed to initiate the RA-based SDT on the cell for transmission of the uplink data, for example, if the size is larger than at least one of the one or more sdt-TBS values (e.g., larger than all of the one or more sdt-TBS values).

The one or more sdt-TBS values may indicate whether the wireless device may initiate the SDT (e.g., RA-based SDT and/or CG-based SDT) for transmission of uplink data (e.g., associated with DTCH) or may initiate an RA procedure to make a connection to the network or the base station. The wireless device may determine to send/transmit the uplink data via the SDT (or initiate the SDT for transmission of the uplink data), for example, if the size is smaller than or equal to at least one of the one or more sdt-TBS values. The wireless device may keep (e.g., maintain) its RRC state as a non-RRC connected state while performing the RA-based SDT and/or after completing the RA-based SDT. The wireless device may determine not to perform (or initiate) the uplink data transmission via the SDT, for example, if the size is larger than at least one of the one or more sdt-TBS values (e.g., larger than all of the one or more sdt-TBS values). The wireless device may initiate the RA procedure to make the connection. The wireless device may send/transmit the uplink data, for example, based on (e.g., after and/or in response to) determining that the RA procedure is successfully completed. The wireless device may transition its RRC state from a non-RRC connected state to an RRC connected state, for example, based on (e.g., after and/or in response to) determining that the RA procedure is successfully completed. The wireless device may then transmit the uplink data in the RRC connected state.

A base station (and/or a network) may send/transmit (broadcast, multicast, and/or unicast) one or more messages (e.g., system information block(s), RRC message(s), MAC CE(s), DCI(s) and/or any combination thereof) comprising an sdt-TBS value of a cell. The one or more messages may comprise a corresponding sdt-TBS value for each RA type of an RA procedure of the cell. One or more RA types of the RA procedure may be available on the cell. The one or more RA types may comprise a four-step contention-based RA procedure (e.g., FIG. 13A), a two-step contention-free RA procedure (e.g., FIG. 13A and/or FIG. 13B), and/or a tow-step RA procedure (e.g., FIG. 13C). The sdt-TBS value may be a common parameter applied to one or more RA types of the RA procedure configured on the cell. A wireless device that receives the one or more messages may determine a particular RA type of RA procedure. The wireless device may determine (e.g., select) a particular sdt-TBS value of the particular RA type of RA procedure. The wireless device may determine, based on the particular sdt-TBS value, whether the wireless device may send/transmit uplink data (e.g., associated with DTCH) via an SDT (e.g., RA-based SDT and/or CG-based SDT). The SDT may use one or more parameters (and/or procedures) of the RA procedure. The wireless device may initiate, using the RA procedure, the SDT on the cell, for example, if a size of transport block comprising the uplink data (e.g., a size of message comprising the uplink data) is smaller than or equal to the particular sdt-TBS value. The wireless device may not initiate, using the RA procedure, the RA-based SDT, for example, if the size of transport block is larger than the particular sdt-TBS value. The wireless device may select a different RA type of RA procedure of the cell and/or may initiate, using the different RA type of RA procedure, the RA-based SDT, for example, if the size of transport block is larger than the particular sdt-TBS value. For example, an sdt-TBS value of the different RA type may be larger than the size of transport block.

An example configuration parameter of an sdt-TBS (e.g., or edt-TBS) value may be a value in bits. For example, an example format of the sdt-TBS value may be sdt-TBS-r15 ENUMERATED {b328, b408, b504, b600, b712, b808, b936, b1000or456}, where, for example, a value b328 may correspond to an sdt-TBS value of 328 bits, b408 may correspond to an sdt-TBS value of 408 bits, etc. For example, a value b1000or456 may correspond to an sdt-TBS value of 1000 bits for one or more first RA types of RA procedure, and an sdt-TBS value of 456 bits for one or more second RA types of RA procedure.

A base station (and/or a network) may send/transmit (e.g., broadcast, multicast, and/or unicast) one or more messages (e.g., system information block(s), RRC message(s), MAC CE(s), DCI(s), and/or any combination thereof). The one or more messages may comprise one or more sdt-TBS values of a cell. The one or more sdt-TBS values may be for respective RA types of an RA procedure of the cell. One or more RA types of the RA procedure may be available on the cell. The one or more RA types may comprise a four-step contention-based RA procedure (e.g., FIG. 13A), a two-step contention-free RA procedure (e.g., FIG. 13A and/or FIG. 13B), and/or a two-step RA procedure (e.g., FIG. 13C). The one or more sdt-TBS values may be a common parameter applied to one or more RA types of the RA procedure configured on the cell. A wireless device, that receives the one or more messages, may determine a particular RA type of RA procedure. The wireless device may select a particular sdt-TBS value, among the one or more sdt-TBS values, for the particular RA type of RA procedure. The one or more messages may indicate that the one or more sdt-TBS values are configured for the particular RA type of RA procedure. The wireless device may determine, based on the particular sdt-TBS value, whether the wireless device may send/transmit uplink data (e.g., associated with DTCH) via an SDT (e.g., RA-based SDT and/or CG-based SDT). The wireless device may use one or more parameters (and/or procedures) of the RA procedure. The wireless device may initiate, using the RA procedure, the RA-based SDT on the cell, for example, if a size of transport block comprising the uplink data (e.g., a size of message comprising the uplink data) is smaller than or equal to the particular sdt-TBS value. The wireless device may not initiate, using the RA procedure, the RA-based SDT, for example, if the size of transport block is larger than the particular sdt-TBS value. The wireless device may select a different RA type of RA procedure of the cell and/or may initiate, using the different RA type of RA procedure, the RA-based SDT, for example, if the size of transport block is larger than the particular sdt-TBS value. For example, an sdt-TBS value of the different RA type may be larger than the size of transport block.

Figure 18A:
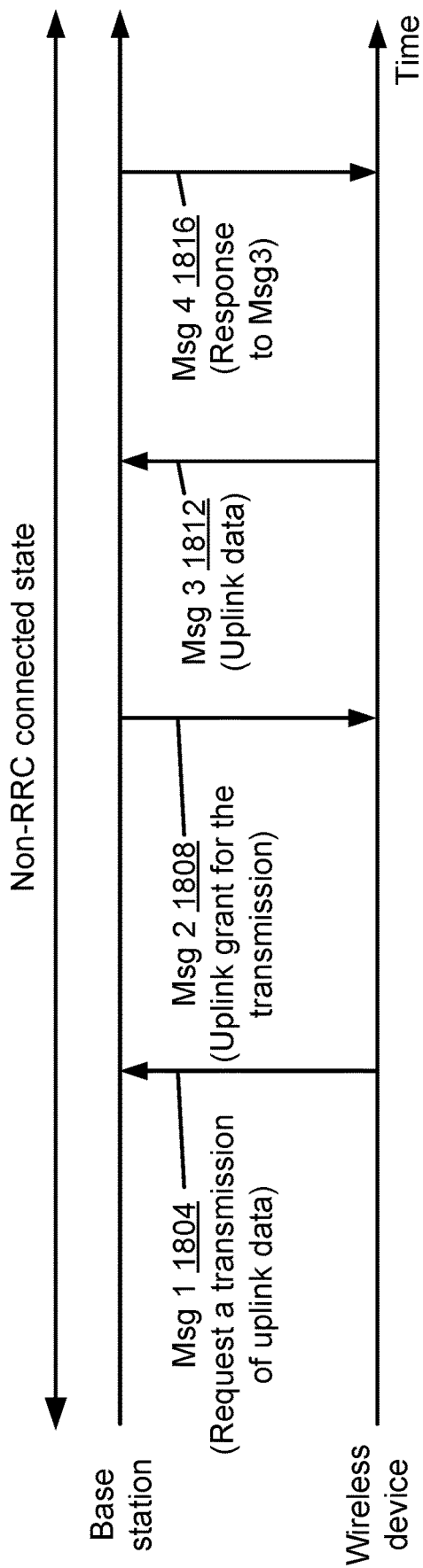
FIG. 18A shows an example random access-based small data transmission (SDT) based on a four-step random access procedure.

FIG. 18A shows an example RA-based SDT based on a four-step RA procedure. A wireless device may receive configuration parameters for the RA-based SDT. The wireless device may initiate the four-step RA procedure for the RA-based SDT. The wireless device may determine to send/transmit a preamble (e.g., Msg 1 1804, Msg 1 1311 in FIG. 13A) via PRACH resource(s). The wireless device may determine the preamble and/or the PRACH resource(s) to indicate, to a base station, a request for a transmission of uplink data (e.g., associated with DTCH). The request may be an indication of triggering and/or initiating the RA-based SDT.

The request may indicate a size (e.g., expected, measured, determined size) of a TB comprising the uplink data. The wireless device may receive a response (e.g., Msg 2 1808, Msg 2 1312 in FIG. 13A) to the preamble. The response may indicate whether the wireless device is allowed to transmit the uplink data (e.g., via Msg 3 1812, Msg 3 1313 in FIG. 13B). The wireless device may cancel the RA-based SDT, for example, if the response indicates that the wireless device is not allowed to transmit the uplink data. The wireless device may send/transmit the Msg 3 without the uplink data, for example, based on (e.g., after or in response to) canceling the RA-based SDT. The wireless device may send/transmit the TB comprising the uplink data via Msg 3 1812, for example, if the response indicates that the wireless device is allowed to transmit the uplink data The wireless device may receive a response (e.g., Msg 4, 1816, Msg 4 1314 in FIG. 13A) to the Msg 3 1812. The wireless device may be in a non-RRC connected state for the RA-based SDT based on a four-step RA procedure.

Figure 18B:
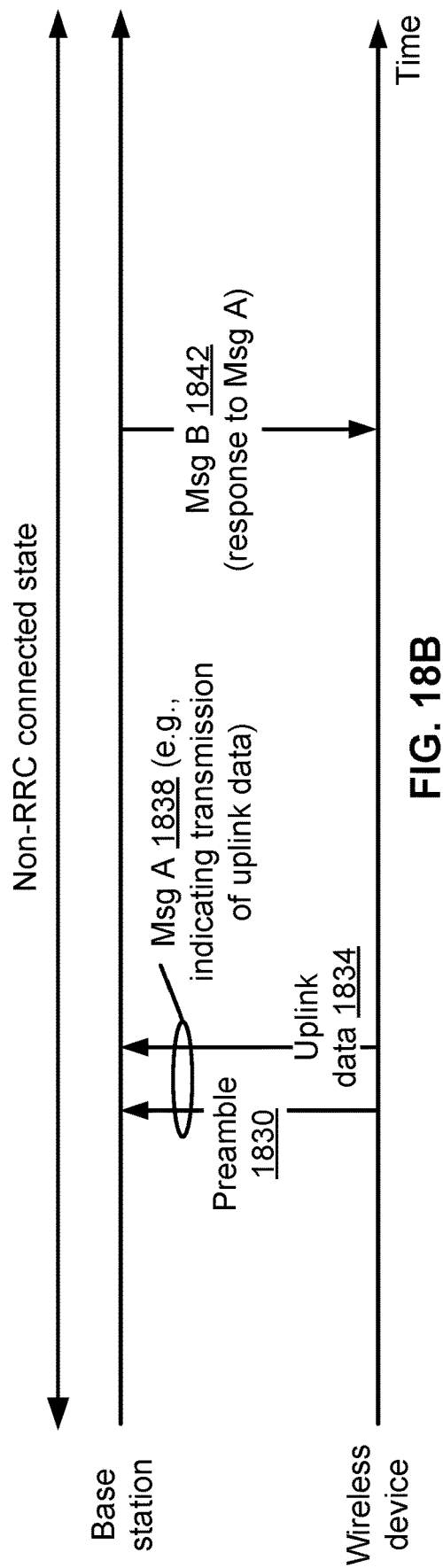
FIG. 18B shows an example random access-based SDT based on a two-step random access procedure.

FIG. 18B shows an example RA-based SDT based on a two-step RA procedure. A wireless device may receive configuration parameters for the RA-based SDT. The wireless device may initiate the two-step RA procedure for the RA-based SDT. The wireless device may determine to send/transmit a preamble 1830 (e.g., preamble 1341 in FIG. 13C) via PRACH resource(s). The wireless device may determine to send/transmit a TB (e.g., transport block 1342 in FIG. 13C) comprising uplink data 1834 (e.g., associated with DTCH) via PUSCH resource(s). The wireless device may determine the preamble 1830, the PRACH resource(s), and/or PUSCH resource(s) to indicate, to a base station, a request for a transmission of the uplink data 1834. The request may be an indication of triggering and/or initiating the RA-based SDT. The request may indicate a size (e.g., expected, measured, determined size) of the TB comprising the uplink data 1834. The wireless device may send/transmit the preamble 1830 and the uplink data 1834 via a first message (e.g., Msg A 1838).

The wireless device may receive a response (e.g., second message, Msg B 1842, Msg B 1332 in FIG. 13C) to the Msg A 1838. The response may indicate a success (e.g., via a parameter successRAR) of the Msg A 1838 transmission. The response may indicate a fallback (e.g., via a parameter fallbackRAR) to a contention resolution of the four-step RA procedure. The wireless device may (re)transmit the TB via a Msg 3 transmission of the contention resolution. The response may indicate that the wireless device is not allowed to perform the RA-based SDT. The wireless device may cancel the RA-based SDT, for example, if the response indicates that the wireless device is not allowed to perform the RA-based SDT. The wireless device may be in a non-RRC connected state for the RA-based SDT based on a two-step RA procedure.

A wireless device may initiate an RA procedure on a cell for transmission of uplink data (e.g., associated with DTCH) via an RA-based SDT. The wireless device may select an RA type of the RA procedure. The RA type may be a four-step RA type or a two-step RA type. The RA type may be associated with at least one sdt-TBS value. The wireless device may determine a TBS of a TB based on the at least one sdt-TBS value. The TB may comprise a MAC PDU. The MAC PDU may comprise uplink data and/or one or more padding bits. The wireless device may append the one or more padding bits to the MAC PDU, for example, if a size of the uplink data (e.g., expected message comprising the uplink data) is smaller than the TBS.

A wireless device may receive a message (e.g., an RRC release message) comprising one or more configurations. A configuration, of the one or more configurations, may correspond to an indicator (e.g., an identifier, or an index) of the configuration. Each of the one or more configurations may comprise radio resource configuration parameters of one or more uplink radio resources that the wireless device may use in a non-RRC connected state. The wireless device may perform a CG-based SDT via the one or more uplink radio resources.

A wireless device may receive an RRC message (e.g., an RRC release message). The RRC message may indicate one or more uplink radio resources that a wireless device may use in a non-RRC connected state. The wireless device may perform a CG-based SDT via the one or more uplink radio resources. The one or more uplink radio resources in the non-RRC connected state may be one time use resource(s) (e.g., for a single uplink transmission). The one or more uplink radio resources in the non-RRC connected state may be periodic resource(s) (e.g., for one or more uplink transmission(s)). The one or more uplink radio resources in the non-RRC connected state may be referred to using variety of names in different systems and/or implementations. The one or more uplink radio resources in the non-RRC connected state may be referred to as preconfigured uplink resources (PURs). Uplink grants indicating the one or more uplink radio resources in the non-RRC connected state may be referred to as (pre-) configured grant(s). The (pre-)configured grant(s) may comprise a plurality of types. For example, the (pre-)configured grant(s) may comprise a (pre-)configured grant type 1 and/or a (pre-)configured grant type 2.

One or more uplink radio resources determined (and/or indicated) as the (pre-)configured grant type 1 may not require an indication of (re-)initiating (and/or (re-)activating) the one or more uplink radio resources. The one or more uplink radio resources determined (and/or indicated) as the (pre-)configured grant type 1 may not require an indication of (re-)initiating (and/or (re-) activating) the one or more uplink radio resources, for example, based on (e.g., after or in response to) receiving the RRC message (e.g., an RRC release message) indicating the one or more uplink radio resources in the non-RRC connected state.

A wireless device may (re-)initiate (and/or (re-)activate) (pre-)configured grant type 1 and/or one or more uplink radio resources indicated by the (pre-)configured grant type 1, for example, based on (e.g., after or in response to) receiving the RRC message (e.g., RRC release message) comprising/indicating the (pre-)configured grant type 1. For example, a wireless device may receive configuration parameters of the (pre)configured grant type 1 for a non-RRC connected state. The wireless device may (re-)initiate (and/or (re-)activate) (pre-)configured grant type 1 and/or one or more uplink radio resources indicated by the (pre-)configured grant type 1, for example, based on (e.g., after or in response to) receiving the RRC message (e.g., RRC release message) comprising the (pre-)configured grant type 1 and/or based on (e.g., after or in response to) transitioning an RRC state of the wireless device to the non-RRC connected state.

One or more uplink radio resources determined (and/or indicated) by (pre-)configured grant type 2 may require an indication of (re-)initiating (and/or (re-)activating) the one or more uplink radio resources. The wireless device may not (re-)initiate (and/or (re-)activate) the one or more uplink radio resources, for example, based on (e.g., after or in response to) receiving the RRC message comprising (e.g., RRC release message) the (pre-)configured grant type 2 that indicates the one or more uplink radio resources. The wireless device may (re-)initiate (and/or (re-)activate) the one or more uplink radio resources, for example, based on (e.g., after or in response to) receiving the indication of (re-)initiating (and/or (re-)activating) the one or more uplink radio resources in the non-RRC connected state. The wireless device may receive the indication based on (e.g., after or in response to) receiving the RRC message (e.g., RRC release message) comprising the (pre-)configured grant type 2 that indicates the one or more uplink radio resources. The wireless device may receive the indication in the non-RRC connected state. The wireless device may receive the indication in an RRC connected state. The wireless device may (re-)initiate (and/or (re-)activate) the one or more uplink radio resources based on (e.g., after or in response to) transitioning an RRC state of the wireless device to the non-RRC connected state, for example, if the wireless device receives the indication in the RRC connected state. The wireless device may (re-)initiate (and/or (re-) activate) the one or more uplink radio resources for the RRC connected state, for example, if the wireless device receives the indication in an RRC connected state. The wireless device may determine to (re-)initiate (and/or (re-)activate) and/or may keep the (re-)initiated (and/or (re-) activated) one or more uplink radio resources in the RRC connected state as active in the non-RRC connected, for example, based on (e.g., after or in response to) transitioning an RRC state of the wireless device to the non-RRC connected state.

The uplink grant(s) indicating the one or more uplink radio resources in the non-RRC connected state may be referred to as (pre-)configured grant(s). A (pre-)configured grant may be associated with (e.g., comprise) a type indicator, e.g., a (pre-)configured grant type 1, 2, 3, 4, etc.

The (pre-)configured grant type 1 and the (pre-)configured grant type 2 may indicate one or more (periodic) uplink grants in the RRC connected state. The (pre-)configured grant type 3 (and/or other types of (pre-)configured grant) may indicate one or more (periodic) uplink grants in the non-RRC connected state.

A wireless device may receive (e.g., from a base station) one or more configuration parameters.

The one or more configuration parameters may comprise a parameter indicating a quantity/number of occasions of the one or more uplink radio resources (e.g., a higher layer parameter NumOccasions). The one or more uplink radio resources may be for a CG-based SDT. The parameter may indicate that the one or more uplink radio resources are one time use resources (or grants) for a single uplink transmission. The parameter may indicate that the one or more uplink radio resources is a plurality of uplink radio resources. The parameter may indicate that the one or more uplink radio resources are one or more periodic radio resources.

The wireless device may receive the one or more configuration parameters. The wireless device may receive the one or more configuration parameters, for example, via a wireless device-specific message (e.g., an RRC message). The wireless device-specific message may be an RRC release message. The wireless device-specific message may be an RRC message that the wireless device receives in an RRC connected state.

The one or more configuration parameters that the wireless device receives may indicate a resource allocation of the one or more uplink radio resources. The one or more configuration parameters may indicate a periodicity (e.g., via a higher layer parameter Periodicity) of the one or more uplink radio resources in the non-RRC connected state. The periodicity may be for uplink grant(s) of an SDT (e.g., CG-based SDT) and/or the one or more uplink radio resources indicated by the uplink grant(s).

The one or more configuration parameters may comprise a time offset. The time offset may be for (e.g., correspond to) uplink grant(s) of an SDT (e.g., CG-based SDT) and/or the one or more uplink radio resources indicated by the uplink grant(s). The time offset may be a time domain offset with respect to (and/or related to) a time reference. The time reference may be a particular SFN (e.g., of a hyper-SFN (H-SFN)), a particular subframe number, a particular slot number, a particular symbol number, and/or a combination thereof. The time reference may be predefined (e.g., SFN=0 and/or H-SFN=0). The time reference may be a predefined value (e.g., SFN=0 and/or H-SFN=0), for example, if a field indicating the time reference is not present in the one or more configuration parameters. The wireless device may receive the uplink grant(s), for example, indicated by the one or more configuration parameters. The uplink grant(s) may indicate the one or more uplink radio resources. The one or more uplink radio resources may start from a symbol (of a slot of an SFN of an H-SFN) indicated by the time offset. The one or more uplink radio resources may occur from the symbol periodically and with the periodicity. The wireless device may determine an $N^{th}$ uplink grant of the one or more uplink grant(s). The wireless device may, e.g., sequentially, determine that an $N^{th}$ uplink grant of the one or more uplink grant(s) occurs in a transmission time interval (TTI, e.g., slot(s), mini-slot(s), symbol(s)) based on the time offset and (N×Periodicity). The time offset may be defined in terms of a quantity of symbols, a quantity of slots, a quantity of subframes, a quantity of SFNs, a quantity of H-SFNs, and/or a combination thereof. The one or more configuration parameters may comprise an offset parameter, (e.g., timeDomainOffset) or the like. The offset parameter may indicate the time offset that the wireless device receives from a base station. The one or more configuration parameters may comprise a time reference parameter (e.g., timeReferenceSFN, a time reference defined in terms of SFN(s) and/or H-SFN) indicating a time reference. The time reference parameter may indicate an SFN to be used as the time reference for determination of the time offset of a resource in time domain. The SFN may repeat with a period of 1024 frames. For example, the wireless device may receive, via a system frame with SFN=3, the one or more configuration parameters indicating that the time reference parameter is equal to 0. The time reference parameter being equal to 0 may indicate a time reference SFN=0 that is, for example, 3 SFNs before the SFN=3. The time reference parameter being equal to 0 may indicate a time reference SFN=0 that is, for example, 1021 SFNs after the SFN=3. The wireless device may determine the closest SFN with the indicated number/quantity (e.g., indicated by the time reference parameter) preceding the reception of the configured grant configuration. For example, in the above example, the wireless device may determine that the time reference parameter being equal to 0 indicates a time reference SFN=0 that is 3 SFNs before the SFN=3.

The wireless device may determine an $N^{th}$ uplink grant of the one or more uplink grant(s). The wireless device may, e.g., sequentially, determine that the $N^{th}$ uplink grant of the uplink grant(s) occurs (and/or the uplink grant recurs) in a symbol for which: [(SFN×numberOfSlotsPerFrame×numberOfSymbolsPerSlot)+(slot number in the frame×numberOfSymbolsPerSlot)+symbol number in the slot]=(timeReferenceSFN×numberOfSlotsPerFrame× numberOfSymbolsPerSlot+timeDomainOffset× numberOfSymbolsPerSlot+S+N×periodicity) modulo (1024×numberOfSlotsPerFrame×numberOfSymbolsPerSlot). The parameter numberOfSlotsPerFrame may be a number/quantity of slots in a frame. The parameter numberOfSymbolsPerSlot may be a number/quantity of symbols in a slot. The parameter periodicity may be a periodicity of the one or more uplink radio resources indicated by the one or more configuration parameters. S may be a symbol number (or symbol offset) indicated by the one or more configuration parameters. The determination of the $N^{th}$ uplink grant as described above may be for a scenario in which (pre-)configured grant(s) may not require an additional activation message (e.g., DCI, MAC CE, and/or RRC) that activates (and/or initiates) the one or more uplink radio resources (and/or (pre-)configured grant(s)).

The wireless device may determine an $N^{th}$ uplink grant of the one or more uplink grant(s). The wireless device may, e.g., sequentially, determine that the $N^{th}$ uplink grant of the uplink grant(s) occurs (and/or the uplink grant recurs) in a symbol for which: [(SFN×numberOfSlotsPerFrame×numberOfSymbolsPerSlot)+(slot number in the frame×numberOfSymbolsPerSlot)+symbol number in the slot]=[(SFN-start time×numberOfSlotsPerFrame× numberOfSymbolsPerSlot+slotstart time× numberOfSymbolsPerSlot+symbolstart time)+N× periodicity] modulo (1024×numberOfSlotsPerFrame× numberOfSymbolsPerSlot). The determination of the $N^{th}$ uplink grant as described above may be for a scenario in which (pre-)configured grant(s) may require an additional activation message (e.g., DCI, MAC CE, and/or RRC) that activates (and/or initiates) the one or more uplink radio resources (and/or (pre-)configured grant(s)). The parameters SFNstart time, slotstart time, and symbolstart time may be equal to the SFN, slot, and symbol, respectively, at a time the one or more uplink grant(s) was (re-)initiated. The parameters SFNstart time, slotstart time, and symbolstart time may be the SFN, slot, and symbol, respectively, at a time when the wireless device receives an indication (e.g., DCI) of (re-)initiating (and/or (re-)activating) the one or more uplink grant(s). The parameters SFNstart time, slotstart time, and symbolstart time may be equal to the SFN, slot, and symbol, respectively, of a transmission opportunity of a PUSCH where the one or more uplink grant(s) was (re-)initiated. The transmission opportunity of PUSCH may be the first opportunity of PUSCH where the one or more uplink grant(s) was (re-)initiated.

The wireless device may (re-)initiate transmission via one or more uplink radio resources in the non-RRC connected state based on one or more conditions. For example, the transmission may be a CG-based SDT. The wireless device may receive configuration parameter(s) indicating the one or more conditions. The wireless device may determine if a cell, where one or more uplink radio resources in the non-RRC connected state are configured, supports transmission(s) via the one or more uplink radio resources. The wireless device may receive RRC message(s) (e.g., SIB). The RRC message(s) may comprise configuration parameter(s) indicating whether the cell supports transmission(s) via the one or more uplink radio resources. The configuration parameter(s) may indicate which type of transmission is supported (or available) via the one or more uplink radio resources. The type may comprise CP transmission and/or UP transmission. The configuration parameter(s) may indicate which type of network, that the cell is connected to, supports the transmission via the one or more uplink radio resources. The wireless device may determine whether the transmission via the one or more uplink radio resources is supported in the cell, for example, based on the type of network that the cell is connected to. The type of network may comprise one or more generations in a network system (e.g., 5GC, EPC, etc.) and/or one or more wireless technologies (e.g., Wifi, 5G, Bluetooth, etc.). The configuration parameter(s) may indicate which type(s) of spectrum (and/or frequency band) supports the transmission via the one or more uplink radio resources. The type of spectrum may comprise licensed spectrum and/or unlicensed spectrum. The type of spectrum may comprise a citizens broadband radio service (CBRS) band (e.g., a wideband in 3.5 GHz band). The type of spectrum may comprise a millimeter wave band (e.g., over 30 GHz band). The configuration parameter(s) in the RRC message(s) may indicate a combination of the type of network, the type of spectrum, and/or the type of transmission. For example, parameter(s) cp-PUR-5GC (e.g., the parameter value may be true/false or enabled'/'disabled), in the RRC message(s) may indicate whether CP transmission using CG-based SDT is supported in the cell when connected to 5G core network. For example, parameter(s) cp-PUR-EPC (e.g., the parameter value may be true/false or enabled/disabled), in the RRC message(s) may indicate whether CP transmission using CG-based SDT is supported in the cell when connected to EPC. The wireless device may determine that the CG-based SDT is supported in the cell when connected to EPC, for example, if the RRC message(s) received from a cell indicates cp-PUR-EPC=true (or enabled).

Figure 19A:
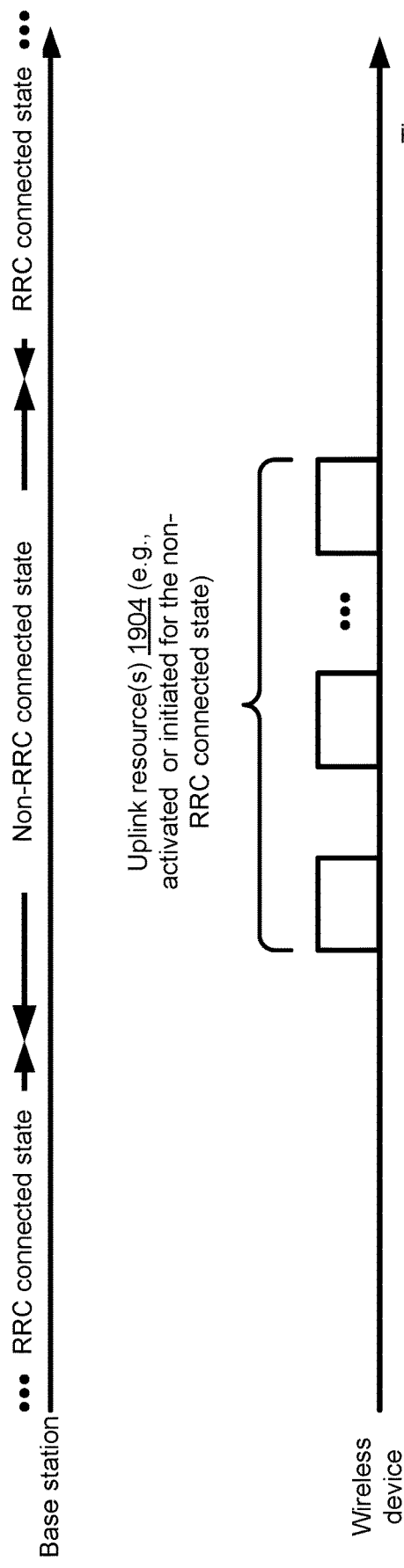
FIG. 19A shows an example of (pre-)configured grant(s) of one or more uplink radio resources.

FIG. 19A shows an example of (pre-)configured grant(s) of one or more uplink radio resources.

The one or more uplink radio resources 1904 may be for a non-RRC connected state of a wireless device. The wireless device may perform a CG-based SDT via the one or more uplink radio resources 1904 of the (pre-)configured grant(s).

The (pre-)configured grant(s) may not require an additional activation message (e.g., DCI, MAC CE, and/or RRC) to activate (and/or initiate) the one or more uplink radio resources 1904 (and/or (pre-)configured grant(s)). For example, the wireless device may receive an RRC message. The RRC message may comprise configuration parameters of the (pre-)configured grant(s) of a cell. The RRC message may comprise an indication and/or an index of a configuration that comprises/indicates the configuration parameters. The RRC message may be an RRC release message. The wireless device may determine (and/or store) the (pre-)configured grant(s) for the cell, for example, based on (e.g., after and/or in response to) receiving the RRC message. The wireless device may (re-)initiate (or activate) the (pre-)configured grant(s), for example, based on (e.g., after or in response to receiving the RRC message). The wireless device may activate and/or initiate the one or more uplink radio resources 1904 (and/or (pre-)configured grant(s) indicating the one or more uplink radio resources 1904) in an RRC inactive state (e.g., RRC_INACTIVE state). The wireless device may (re-)initiate (or activate) the (pre-)configured grant to start in (and/or from) a time reference. The time reference may be a symbol, a slot, a subframe, an SFN, and/or an H-SFN. The H-SFN comprise one or more SFNs (e.g., 1024 SFNs). The time reference may be a combination of one or more of a symbol, a slot, a subframe, an SFN, and/or an H-SFN. The time reference may be a symbol of a slot of an SFN, of an H-SFN, indicated by the configuration parameters. For example, the configuration parameters may indicate a time domain offset (e.g., indicating the H-SFN, the SFN and/or the slot) and a symbol number S (e.g., indicating the symbol). The wireless device may determine that the (pre-)configured grant (re-)occurs with a periodicity indicated by the configuration parameters.

A wireless device may establish/make a connection to a network (and/or a base station) via the CG-based SDT. The wireless device may send/transmit a first message, via one or more uplink radio resources 1904, in a non-RRC connected state during the CG-based SDT. The first message may comprise an RRC connection setup request (e.g., for the RRC connection setup procedure) and/or an RRC connection resume request (e.g., for the RRC connection resume procedure). The first message may comprise an SDT (EDT) request message. The wireless device may receive, from the base station, a second message indicating a transition to an RRC connected state. The second message may be a response to the first message. The wireless device may receive an RRC connection setup message, or an RRC connection resume message (e.g., as the second message). The wireless device may transition to the RRC connected state, for example, based on (e.g., after or in response to) receiving the second message. The wireless device may deactivate and/or suspend (or clear), in an RRC connected state, the one or more uplink radio resources 1904 (and/or (pre-)configured grant(s)) that were used in the non-RRC connected state. The one or more uplink radio resources 1904 (and/or (pre-)configured grant(s)) may be deactivated and/or suspended (cleared, and/or rendered invalid), for example, based on (e.g., after or in response to) establishing/ making the connection to the base station (e.g., as described with respect to in FIG. 18A or 18B.)

Figure 19B:
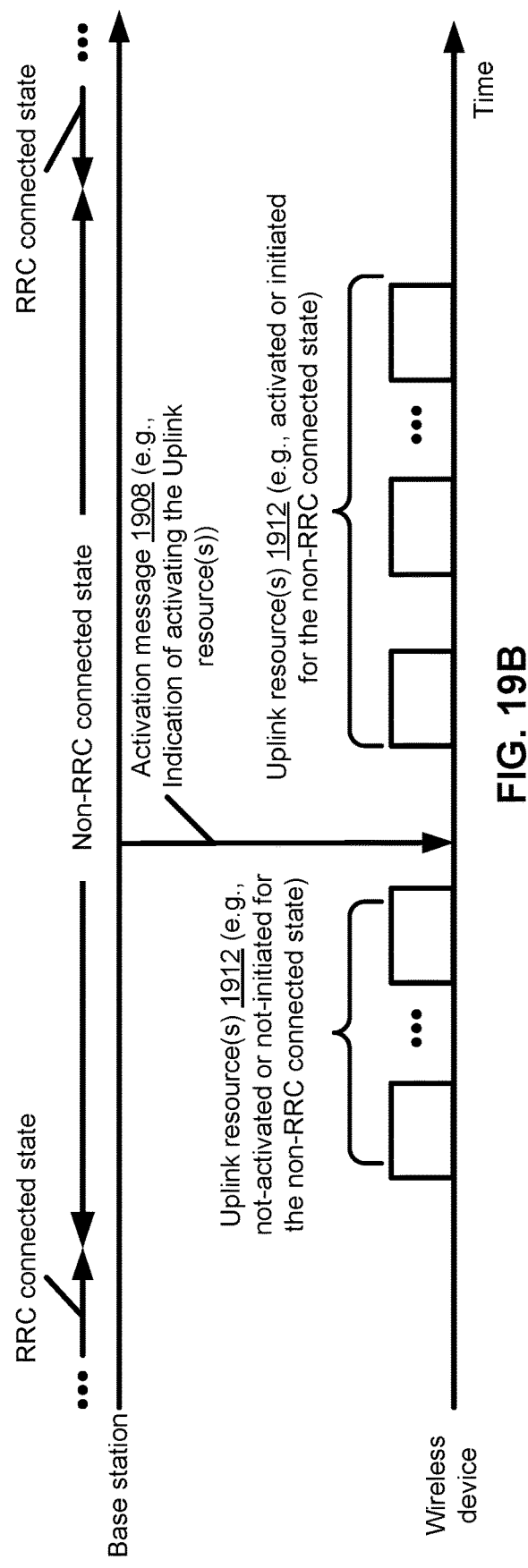
FIG. 19B shows an example of (pre-)configured grant(s) of one or more uplink radio resources.

FIG. 19B shows an example of (pre-)configured grant(s) of one or more uplink radio resources.

The one or more uplink radio resources may be for a non-RRC connected of a wireless device. A wireless device may perform a CG-based SDT via the one or more uplink radio resources of the (pre-)configured grant(s). The one or more uplink radio resources may be activated by an activation message.

The (pre-)configured grant(s) may require an additional activation message (e.g., DCI, MAC CE, and/or RRC) that activates (and/or initiates) the one or more uplink radio resources 1912 (and/or (pre-)configured grant(s)). The wireless device may receive an RRC message comprising configuration parameters of the (pre-)configured grant(s) of a cell. The wireless device may determine (and/or store) the (pre-)configured grant(s) for the cell, for example, based on (e.g., after or in response to) receiving the RRC message. The RRC message may be an RRC release message. The wireless device (e.g., based on receiving the RRC message) may not (re-)initiate (or activate) the (pre-)configured grant, for example, until the wireless device receives an additional activation message 1908 (e.g., DCI, MAC CE, and/or RRC). The wireless device may monitor a PDCCH in the non-RRC connected state to receive the additional activation message 1908. The wireless device may receive the additional activation message 1908 (e.g., DCI, MAC CE, and/or RRC), for example, based on (e.g., after or in response to) receiving the RRC message. The additional activation message may be DCI carried by the PDCCH. The additional activation message 1908 may be a MAC CE, and/or an RRC message received based on a downlink assignment (e.g., DCI carried by the PDCCH). The configuration parameters in the RRC message may indicate time and frequency resource allocation of the PDCCH, monitoring occasion(s) of the PDCCH, and/or a monitoring periodicity of the PDCCH. The wireless device may determine that the (pre-)configured grant (re-) occurs with a periodicity indicated by the configuration parameters and/or timing offset references (e.g., an H-SFN, an SFN, a slot and/or a symbol). The wireless device may determine the SFN (e.g., of the H-SFN), the slot, and/or the symbol based on a reception timing of the additional activation message 1908 received via the PDCCH. The wireless device may receive a deactivation message that indicates to deactivate and/or suspend (clear, and/or invalidate) the one or more uplink radio resources 1912 (and/or (pre-)configured grant(s)). The wireless device may receive the deactivation message in the non-RRC connected state.

The wireless device may make/establish a connection to a network (and/or a base station) via the CG-based SDT. For example, the wireless device may send/transmit a first message via the one or more uplink radio resources in a non-RRC connected state during the CG-based SDT. The first message may comprise an RRC connection setup request (e.g., for the RRC connection setup procedure) and/or an RRC connection resume request (e.g., for the RRC connection resume procedure). The first message may comprise an SDT (EDT) request message. The wireless device may receive, from the base station, a second message indicating a transition to an RRC connected state. The second message may be a response to the first message. For example, the second message may be an RRC connection setup message or an RRC connection resume message. The wireless device may transition to the RRC connected state, for example, based on (e.g., after and/or in response to) receiving the second message. The wireless device may deactivate and/or suspend (or clear), in an RRC connected state, the one or more uplink radio resources 1912 (and/or (pre-)configured grant(s)) that were used in the non-RRC connected state. The one or more uplink radio resources 1912 (and/or (pre-) configured grant(s)) may be deactivated and/or suspended (cleared, and/or invalid), for example, based on (e.g., after or in response to) connecting to the base station (e.g., as described with respect to FIG. 18A or 18B).

A wireless device may perform (e.g., with a base station) downlink and/or uplink beam management. The downlink and/or uplink beam management may comprise downlink and/or uplink beam measurement procedure(s), (re-)configuration of one or more beams (e.g., TCI states), beam (e.g., TCI state) activation of the one or more beams, and/or beam selection among the one or more beams. For example, a TCI state may comprise a downlink TCI state and/or spatial relation information (e.g., an uplink TCI state). The downlink and/or uplink beam management may comprise beam failure detection and/or beam failure recovery procedures. The wireless device may perform the downlink beam management and the uplink beam management separately.

A wireless device may perform the downlink (e.g., PDSCH and/or PDCCH) beam management and/or uplink (e.g., PUSCH, PUCCH, and/or SRS) beam management for transmission and/or reception in an RRC connected state. A wireless device may perform the downlink (e.g., PDSCH and/or PDCCH) beam management and/or uplink (e.g., PUSCH, PUCCH, and/or SRS) beam management for transmission and/or reception in a non-RRC connected state (e.g., for an SDT and/or one or more subsequent transmissions associated with the SDT).

A reference signal (e.g., an indicator of the reference signal) in the downlink and/or uplink beam management procedures may indicate a beam (e.g., TCI state, Tx beam and/or Rx beam of the wireless device) to use in the transmission and/or the reception in the non-RRC connected state. For example, a wireless device may receive message(s) (e.g., RRC message(s), an RRC release message, and/or the like) comprising configuration parameters of one or more radio resource(s). The configuration parameters may comprise indication(s) (e.g., indices) of one or more reference signals. The one or more reference signals may comprise an SSB identified by an SSB indicator (e.g., index/identifier), a CSI-RS identified by a CSI-RS indicator (e.g., index/identifier) (and/or CSI-RS resource indicator/index/identifier), etc. The one or more reference signals may comprise an SRS identified by an SRS indicator (e.g., index/identifier) (e.g., SRS resource index/identifier, SRS resource set index/identifier, and/or a combination thereof). The reference signal may represent and/or indicate a particular beam (and/or a beam width). For example, the SSB may represent and/or indicate a wide beam; the CSI-RS may represent and/or indicate a narrow beam; and/or the SRS may represent and/or indicate a Tx beam of the wireless device.

The configuration parameters in the message(s) (e.g., RRC release message) may comprise indicator(s) indicating respective reference signal(s) associated with respective transmission(s) (e.g., uplink transmission, PUSCH transmission, PUCCH transmission, and/or SRS transmission) and/or reception(s) (e.g., downlink reception, PDCCH reception and/or PDSCH reception). A reference signal may be configured for radio link monitoring; radio link recovery; and/or transmission and/or reception in an RRC connected state and/or a non-RRC connected state.

The configuration parameters may comprise indicator(s) indicating reference signal(s) associated with data reception (e.g., PDSCH reception) and/or control signal reception (e.g., PDCCH reception) in a non-RRC connected state. The data and/or the control signal may be associated with the transmission via the one or more radio resource(s). For example, the reception may be for receiving a response (e.g., RRC response via PDSCH, and/or L1 ACK/L1 NACK/L1 fallback via PDCCH) to the transmission. The response (e.g., the RRC response via PDSCH) may be an RRC release message and/or RRC connection setup message. The response (e.g., L1 ACK, L1 NACK, or L1 fallback via PDCCH) may be DCI comprising field(s) indicating acknowledgement (e.g., L1 ACK), negative acknowledgement (e.g., L1 NACK), and/or fallback (e.g., L1 fallback). The L1 ACK may indicate a success of the transmission via the one or more radio resource(s). The L1 NACK may indicate a failure of the transmission via the one or more radio resource(s). The L1 NACK may indicate a retransmission of the transmission via the one or more radio resource(s). The DCI indicating the L1 NACK may comprise an uplink grant to be used for the retransmission. The L1 fallback may indicate a failure of the transmission via the one or more radio resource(s). The L1 fallback may indicate a termination of the transmission via the one or more radio resource(s). The indicator(s) may comprise parameter(s) for configuring a QCL relationship between one or more downlink reference signals (e.g., SSBs and/or CSI-RSs) and the DM-RS ports of the PDSCH, the DM-RS port of PDCCH, and/or the CSI-RS port(s) of a CSI-RS resource. The parameter(s) may comprise one or more TCI states. Each of the one or more TCI states may comprise at least one of: one or more DL RS(s) (e.g., SSB(s), CSI-RS(s), and/or any combination thereof), cell indicator/index/identifier, BWP indicator/index/identifier, and/or QCL relationship type (e.g., indicating the one or more large-scale properties). The indicator(s) may comprise a TCI state of a particular channel configuration (e.g., PDSCH, PDCCH (e.g., CORESET)). For example, the PDSCH and/or PDCCH (e.g., CORESET) configuration may comprise at least one of the one or more TCI states. A TCI state of PDSCH may indicate a QCL relationship between one or more downlink reference signals (e.g., SSBs and/or CSI-RSs) and the DM-RS ports of the PDSCH. The wireless device may determine Rx beam(s) used to receive data via the PDSCH based on the TCI state (e.g., QCL relationship of the TCI state). A TCI state of PDCCH may indicate a QCL relationship between one or more downlink reference signals (e.g., SSBs and/or CSI-RSs) and the DM-RS ports of the PDCCH (e.g., CORESET). The wireless device may determine Rx beam(s) used to receive control signal(s) via the PDCCH based on the TCI state (e.g., QCL relationship of the TCI state).

A base station may send/transmit (e.g., to a wireless device) one or more message(s). The one or more messages may indicate a TCI state to be used for reception via a PDSCH and/or a PDCCH (e.g., a CORESET). The one or more message(s) may comprise an RRC message (e.g., RRC release message and/or RRC message (re-)configuring the TCI state), MAC CE, and/or DCI. At least one of the one or more message(s) may configure the TCI state for the PDSCH and/or PDCCH. At least one of the one or more message(s) may activate the TCI state (e.g., the configured TCI state by the at least one of the one or more message(s)) for the PDSCH and/or PDCCH. At least one of the one or more message(s) may schedule the PDSCH and/or PDCCH based on the TCI state (e.g., the configured TCI state by the at least one of the one or more message(s) and/or the activated TCI state by the at least one of the one or more message(s)).

A wireless device may receive one or more message(s) that (re-)configures, updates, and/or activates the TCI state(s) of PDSCH and/or PDCCH (e.g., a CORESET). For example, a first control message (e.g., an RRC message, and/or RRC release message), of the one or more message(s), may indicate at least one TCI state to be used for the PDSCH and/or PDCCH (e.g., CORESET).

A wireless device may receive one or more message(s) that (re-)configures, updates, and/or activates the TCI state(s) of PDSCH and/or PDCCH (e.g., CORESET). For example, a first control message (e.g., an RRC message, and/or RRC release message), of the one or more message(s), may indicate one or more TCI states. A second control message (e.g., another RRC message, a DCI and/or MAC CE), of the one or more message(s), may indicate at least one of the one or more TCI states to be used for the PDSCH and/or PDCCH (e.g., CORESET).

A wireless device may receive one or more message(s) that (re-)configures, updates, and/or activates the TCI state(s) of PDSCH and/or PDCCH (e.g., CORESET). For example, a first control message (e.g., an RRC message, and/or RRC release message), of the one or more message(s), may indicate one or more TCI states. A second control message (e.g., an RRC message, MAC CE, and/or DCI), of the one or more message(s), may indicate (or activate) at least first one of the one or more TCI states. A third control message (e.g., an RRC message, MAC CE, and/or DCI), of the one or more message(s), may indicate at least second one of the at least first one of the one or more TCI states to be used for the PDSCH and/or PDCCH (e.g., CORESET).

The wireless device may receive the configuration parameters comprising indicator(s) indicating reference signal(s) associated with data transmission (e.g., via PUSCH) and/or control signal transmission (e.g., via PUCCH) via the one or more radio resource(s). For example, the indicator(s) may comprise spatial relation information (e.g., uplink TCI state). The spatial relation information may be for transmission(s) via PUSCH, PUCCH, and/or SRS. The wireless device may determine (e.g., identify) particular spatial relation information based an indicator, index and/or identifier of the particular spatial relation information. The spatial relation information may indicate at least one of following: cell indicator/index/identifier, one or more DL RSs (e.g., SSB(s), CSI-RS(s), and/or any combination thereof), SRS resource indicator/index/identifier, BWP indicator/index/identifier, pathloss reference RS indicator/index/identifier, and/or power control parameter(s). The wireless device may determine antenna ports and/or precoder used for transmission(s) via PUSCH and/or PUCCH based on the spatial relation information.

The indicator(s) may be the spatial relation information (e.g., uplink TCI state) of a particular channel configuration (e.g., indicated by higher layer parameters srs-spatial-relation-information for PUSCH and/or pucch-spatial-relation-information for PUCCH). The PUSCH configuration may comprise at least one spatial relation information. The PUCCH configuration may comprise at least one spatial relation information. The spatial relation information of the PUSCH may be different from the spatial relation information of the PUCCH. The spatial relation information of the PUSCH may be the same as the spatial relation information of the PUCCH. The spatial relation information(s) of the PUSCH and PUCCH may be configured separately and/or independently. There may be one or more spatial relation information(s) applied to (and/or used for) the PUSCH and the PUCCH.

The wireless device may determine antenna ports and/or precoder used for the PUSCH based on the spatial relation information of the PUSCH. The wireless device may receive message(s) (e.g., RRC release message) comprising configuration parameters of transmission, via one or more radio resource(s), in an RRC connected state and/or a non-RRC connected state. The configuration parameters (e.g., an SRS resource indicator) may indicate an SRS resource of an SRS resource set. The SRS resource may comprise spatial relation information. The wireless device may determine, for the transmission via the one or more radio resource(s), to use the same antenna port(s) as the SRS port(s) of the SRS resource. The wireless device may send/transmit, based on the determination, data via the one or more radio resource(s) using the same antenna port(s).

The wireless device may determine antenna ports and/or precoder used for the PUCCH based on the spatial relation information of the PUCCH. The wireless device may receive message(s) (e.g., RRC release message) comprising configuration parameters of PUCCH in an RRC connected state and/or a non-RRC connected state. The wireless device may send/transmit uplink control signal(s) via the PUCCH, for HARQ feedback (e.g., ACK or NACK) to PDSCH (e.g., in the non-RRC connected state), for SR transmission(s), and/or for measurement report(s). The configuration parameters (e.g., PUCCH spatial relation information) may indicate the spatial setting (e.g., precoder and/or spatial domain filter) for PUCCH transmission and the parameters for PUCCH power control. The wireless device may determine, for the PUCCH transmission in the non-RRC connected state, a spatial domain filter used for a reception of a downlink reference signal (DL RS) indicated by the spatial relation information. The wireless device may send a PUCCH transmission (e.g., via a PUCCH) using a same spatial domain filter as used for a reception of an SSB for a cell, for example, if the spatial relation information for the PUCCH comprises an SSB index/identifier of the SSB. The wireless device may send a PUCCH transmission (e.g., via a PUCCH) using a same spatial domain filter as used for a reception of a CSI-RS for a cell, for example, if the spatial relation information for the PUCCH comprises a CSI-RS index/identifier (e.g., NZP-CSI-RS resource index/identifier) of the CSI-RS. The wireless device may send a PUCCH transmission (e.g., via a PUCCH) using a same spatial domain filter as used for a transmission of an SRS for a cell and/or uplink BWP, for example, if the spatial relation information for the PUCCH comprises an SRS index/identifier of the SRS (e.g., SRS resource).

A base station may send/transmit (e.g., to a wireless device) one or more message(s) (e.g., RRC release message(s)). The one or more messages may indicate spatial relation information (e.g., uplink TCI state) to be used for a PUSCH transmission, a PUCCH transmission, and/or an SRS transmission. The one or more message(s) may comprise an RRC message(s), MAC CE(s), and/or DCI message(s). At least one of the one or more message(s) may configure the spatial relation information (e.g., uplink TCI state) for the PUSCH transmission, PUCCH transmission, and/or SRS transmission. At least one of the one or more message(s) may activate the spatial relation information (e.g., uplink TCI state) for the PUSCH transmission, PUCCH transmission, and/or SRS transmission. At least one of the one or more message(s) may schedule the PUSCH transmission, PUCCH transmission, and/or SRS transmission based on the spatial relation information (e.g., uplink TCI state).

A wireless device may receive one or more message(s). The one or more messages may (re-) configure, update, and/or activate the spatial relation information of/corresponding to a PUSCH transmission, a PUCCH transmission, and/or an SRS transmission. For example, a first control message (e.g., an RRC message, and/or RRC release message) of the one or more message(s) may indicate at least one spatial relation information (e.g., at least one uplink TCI state) to be used for the PUSCH transmission, PUCCH transmission, and/or SRS transmission.

A wireless device may receive one or more message(s). The one or more messages may (re-) configure, update, and/or activate the spatial relation information of/corresponding to a PUSCH transmission, PUCCH transmission, and/or SRS transmission. A first control message (e.g., an RRC message, and/or RRC release message) of the one or more message(s) may indicate one or more spatial relation information(s) (e.g., uplink TCI state(s)). A second control message (e.g., another RRC message, a DCI and/or MAC CE) of the one or more message(s) may indicate at least one of the one or more spatial relation information(s) to be used for the PUSCH transmission, PUCCH transmission, and/or SRS transmission.

A wireless device may receive one or more message(s). The one or more messages may (re-)configure, update, and/or activate the spatial relation information of/corresponding to a PUSCH transmission, PUCCH transmission, and/or SRS transmission. A first control message (e.g., an RRC message, and/or RRC release message) of the one or more message(s) may indicate one or more spatial relation information(s) (e.g., uplink TCI state(s)). A second control message (e.g., an RRC message, MAC CE, and/or DCI) of the one or more message(s) may indicate (or activate) at least a first one of the one or more spatial relation information(s). A third control message (e.g., an RRC message, MAC CE, and/or DCI) of the one or more message(s) may indicate at least a second one of the at least first one of the one or more spatial relation information(s) to be used for the PUSCH transmission, PUCCH transmission, and/or SRS transmission.

Figure 20:
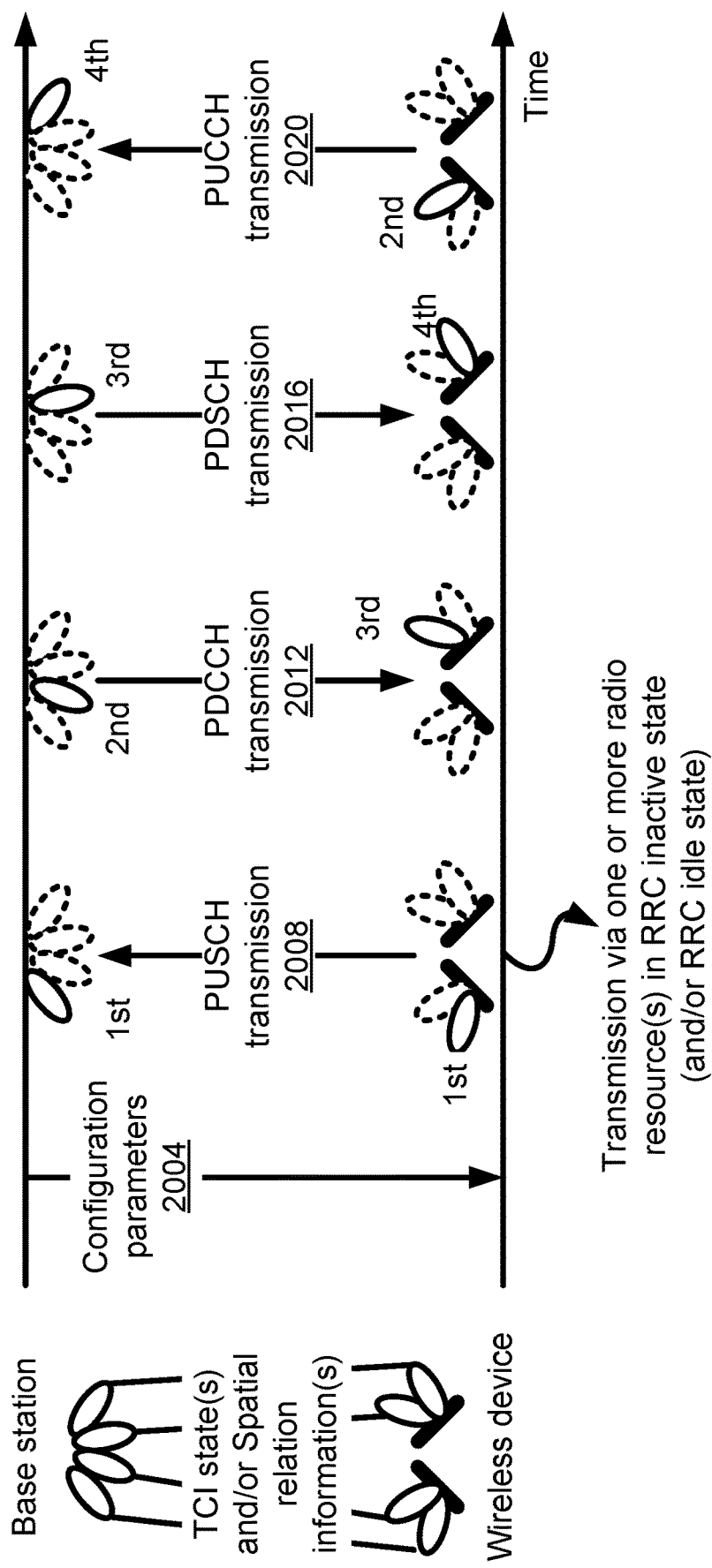
FIG. 20 shows an example of beam management for transmission and/or reception in a non-RRC connected state.

FIG. 20 shows an example of beam management for transmission and/or reception in a non-RRC connected state. The non-RRC connected state may correspond to an RRC inactive state or an RRC idle state. A wireless device may receive message(s) (e.g., an RRC release message) comprising configuration parameters 2004 for transmission/reception in the non-RRC connected state. The configuration parameters may indicate configurations of radio resources of/corresponding to PUSCH, PDCCH, PDSCH, and/or PUCCH used in the non-RRC connected state. The configuration parameters may indicate one or more radio resource(s) for uplink transmission (e.g., via PUSCH) in the non-RRC connected state. The configuration parameters may indicate beam(s) (e.g., reference signal(s)) used to send/transmit (e.g., via PUSCH and/or PUCCH) and/or receive (e.g., via PDSCH and/or PDCCH) in the non-RRC connected state. For example, the wireless device may receive MAC CE and/or DCI that indicate which beam(s) (e.g., reference signal(s)) are used to send/transmit (e.g., via PUSCH and/or PUCCH) and/or receive (e.g., via PDSCH and/or PDCCH) in the non-RRC connected state.

The wireless device may use a same beam for uplink transmissions (e.g., PUSCH and/or PUCCH). The wireless device may use a same beam for downlink transmissions (e.g., PDSCH and/or PDCCH). The wireless device may use the same beam for PUSCH transmissions and one or more other transmissions (e.g., via PDSCH, PDCCH, and/or PUCCH). The wireless device may use the above beam configuration as a default configuration.

For example, in FIG. 20, the wireless device may send/transmit, using a first beam, data (e.g., PUSCH transmission 2008) via one or more radio resource(s) in the non-RRC connected state. The wireless device may start to monitor a PDCCH using the a third beam. The wireless device may receive, via the PDCCH, a PDCCH transmission 2012 (e.g., DCI) that comprise downlink assignment of PDSCH. The wireless device may receive a PDSCH transmission 2016 (e.g., via the PDSCH) using a fourth beam. The wireless device may send/transmit, via PUCCH, a PUCCH transmission 2020 (e.g., a HARQ feedback (e.g., ACK or NACK)) using a second beam. The base station may receive or transmit data using different beams (e.g., different from beams used by the wireless device) and/or same beam (e.g., same beams as used by the wireless device). For example, the base station may use the first beam for PUSCH reception (e.g., receiving the PUSCH transmission 2008), the second beam for PDCCH transmission (e.g., the PDCCH transmission 2012), the third beam for PDSCH transmission (e.g., the PDSCH transmission 2016), and/or the fourth beam for PUCCH reception (e.g., receiving the PUCCH transmission 2020). The wireless device may receive second message(s) (e.g., RRC message, MAC CE, DCI, and/or a combination thereof) for reconfiguring, changing, activating/deactivating, and/or updating the beam configuration of the PUSCH, PDCCH, PDSCH, and/or PUCCH.

In multi-beam operations, a cell may send/transmit one or more downlink RSs (e.g., a plurality of SSBs, CSI/RS, and/or the like), for example, using one or more beams (e.g., Tx beams of the cell). Each of the one or more beams may be associated with at least one of the one or more downlink RSs. Each of channel(s) (e.g., the PDCCH, PDSCH, PUSCH and/or PUCCH) for transmission(s) and/or reception(s) of/corresponding the cell may be associated with at least one of the one or more beams (e.g., at least one of the one or more downlink RSs).

A wireless device may receive message(s) (e.g., RRC message, MAC CE, DCI, and/or any combination thereof). The message(s) may comprise radio resource configuration parameters indicating which beam is associated with which channel(s) (e.g., the PDCCH, PDSCH, PUSCH and/or PUCCH). For example, the radio resource configuration parameters may indicate that a beam configuration (e.g., TCI state (and/or downlink TCI state) and/or spatial relation information (and/or uplink TCI state)) of the channel(s) comprises a first downlink RS of the plurality of downlink RSs. The first downlink RS may represent and/or indicate the first beam (e.g., as shown in FIG. 20). One of the plurality of downlink RSs may be associated with one or more channels (e.g., the PDCCH, PDSCH, PUSCH, and/or PUCCH). The wireless device may determine, based on the association, antenna port(s) and/or precoder (e.g., spatial domain filter) to be used for the transmission and/or the reception performed via the channel(s). The wireless device may determine the antenna port(s) and/or the precoder (e.g., spatial domain filter) based on antenna port(s) and/or a precoder (e.g., a spatial domain filter) used for receiving the first downlink RS.

A wireless device may receive, from a base station, a message (e.g., RRC release message) for SDT. The message may indicate one or more downlink RSs (e.g., a plurality of SSBs, CSI/RS, and/or the like). The one or more downlink RSs may use, for example, one or more beams (e.g., Tx beams of the cell). The wireless device may determine, based on at least one of the one or more downlink RSs, transmission parameters (e.g., Tx antenna parameters) of a wireless device for PUSCH, PUCCH, and/or SRS. The wireless device may determine, based on at least one of the one or more downlink RSs, reception parameters (e.g., Rx antenna parameters) of a wireless device for PDSCH and/or PDCCH.

The message (e.g., RRC release message) that the wireless device receives for the SDT may indicate a downlink RS (e.g., an SSBs, CSI/RS, and/or the like) to be used for PDCCH, PDSCH, PUSCH, PUCCH, and/or SRS. The message may indicate a first downlink RS (e.g., an SSB, CSI/RS, and/or the like) for an uplink transmission (e.g., PUSCH transmission, PUCCH transmission, and/or SRS transmission). The message may indicate a second downlink RS (e.g., an SSBs, CSI/RS, and/or the like) for a downlink transmission (e.g., PDCCH transmission and/or PDSCH transmission). The message may indicate one or more downlink RSs (e.g., SSBs, CSI/RSs, and/or the like). Each downlink RS may be dedicated to a particular channel (e.g., PDCCH, PDSCH, PUSCH, PUCCH, and/or SRS). A downlink RS indicated by the message for a first channel (e.g., PDCCH, PDSCH, PUSCH, PUCCH, and/or SRS) may be the same as a downlink RS indicated by the message for a second channel (e.g., PDCCH, PDSCH, PUSCH, PUCCH, and/or SRS). A downlink RS indicated by the message for a first channel (e.g., PDCCH, PDSCH, PUSCH, PUCCH, and/or SRS) may be different from a downlink RS indicated by the message for a second channel (e.g., PDCCH, PDSCH, PUSCH, PUCCH, and/or SRS).

A wireless device may receive (e.g., from a base station) a message (e.g., RRC release message) indicating one or more downlink RSs (e.g., a plurality of SSBs, CSI/RS, and/or the like) for the SDT. The one or more downlink RSs may use one or more beams (e.g., Tx beams of the cell). The wireless device may select at least one of the one or more downlink RSs. The wireless device may select the at least one of the one or more downlink RSs to determine transmission parameters (e.g., Tx antenna parameters) of a wireless device for a transmission (e.g., a PUSCH transmission, a PUCCH transmission, and/or an SRS transmission). The wireless device may select at least one of the one or more downlink RSs to determine reception parameters (e.g., Rx antenna parameters) of a wireless device for receiving a transmission (e.g., a PDSCH transmission and/or PDCCH transmission). The wireless device may select the at least one of the one or more downlink RSs for reception during in the non-RRC connected state during an SDT and/or for reception of one or more subsequent transmissions (and/or receptions).

The message (e.g., RRC release message) that the wireless device receives for the SDT may indicate one or more downlink RSs (e.g., one or more SSBs, CSI/RSs, and/or the like) to be used for PDCCH, PDSCH, PUSCH, PUCCH, and/or SRS. The wireless device may select at least one of the one or more downlink RSs for the SDT. The wireless device may initiate the SDT, for example, based on (e.g., in response to) uplink data being present/available in a buffer and/or based on (e.g., in response to) an uplink grant (or an uplink radio resource of the uplink grant) being provided/available for the SDT.

The wireless device may determine or select the at least one of the one or more downlink RSs for the PDCCH, PDSCH, PUSCH, PUCCH, and/or SRS of the SDT. The determination and/or the selection of the at least one of the one or more downlink RSs may be based on measurements (e.g., RSRP values) of the one or more downlink RSs. The message (e.g., RRC release message) may comprise and/or indicate a power threshold value. The wireless device may measure RSRPs of the one or more downlink RSs. The wireless device may select the at least one of the one or more downlink RSs based on an RSRP value of the at least one of the one or more downlink RSs being larger than the power threshold value. The wireless device may select the at least one of the one or more downlink RSs based on an RSRP value of the at least one of the one or more downlink RSs being the largest one among the RSRP values of the one or more downlink RSs.

The wireless device may select at least one of the one or more downlink RSs to be used for PUSCH transmission of an SDT (and/or one or more subsequent transmissions that follow the SDT). The wireless device may determine, based on the at least one of the one or more downlink RSs, a configuration of the PUSCH transmission of the SDT and/or uplink radio resource(s) of the PUSCH transmission of the SDT. The wireless device may receive a message (e.g., an RRC release message) comprising a set of the uplink radio resource(s). The message may comprise a configuration comprising the set of the uplink radio resource(s). The message may comprise one or more configurations. Each of the one or more configurations may comprise one of the uplink radio resource(s). The message may indicate that each of the uplink radio resource(s) is associated with one of the one or more downlink RSs. The wireless device may select a first uplink grant (and/or a first uplink radio resource(s) among the set of the uplink radio resource(s), for example, if the message indicates that the first uplink grant (and/or the first uplink radio resource(s)) is associated with the at least one of the one or more downlink RSs. The wireless device may send/transmit uplink data (via CG-based SDT and/or RA-based SDT) using antenna configuration(s) (e.g., spatial relation information, and/or uplink TCI state) of the at least one of the one or more downlink RSs.

The wireless device may determine, for an SDT and/or one or more subsequent transmissions, uplink radio resource(s). The uplink radio resource(s) may be for PUCCH transmissions and/or SRS transmissions. The wireless device may determine the uplink radio resource(s), for example, based on a selection of one of the one or more downlink RSs. The wireless device may receive a message (e.g., RRC release message) indicating one or more radio resource(s) for PUCCH transmission(s) and/or SRS transmission(s). The one or more radio resource(s) may be a specific to a particular downlink RS. The wireless device may select the one of the one or more downlink RSs based on RSRPs of the one or more downlink RSs. An RSRP value of the one of the one or more downlink RSs may be larger than a power threshold. The RSRP value may be the largest one among the RSRP values of the one or more downlink RSs. A first downlink RS of the one or more downlink RSs may be configured, for example, as spatial relation information (and/or uplink TCI state) of a first radio resource(s) of the one or more radio resource(s). The wireless device may determine (and/or select), for a transmission via a first channel (e.g., PUSCH), a downlink RS (e.g., spatial relation information and/or uplink TCI state) of the one or more downlink RSs that is the same as a downlink RS for a transmission via a second channel (e.g., PUCCH and/or SRS) of transmission. The wireless device may determine (and/or select) a downlink RS (e.g., spatial relation information and/or uplink TCI state) of the one or more DL RS per transmission channel (e.g., PUSCH, PUCCH, and/or SRS).

A wireless device may select at least one of the one or more downlink RSs to be used for PDCCH (e.g., CORESET) of an SDT (and/or one or more subsequent transmissions following the SDT). The wireless device may determine, based on the at least one of the one or more downlink RSs, a configuration of the PDCCH (e.g., CORESET of the PDCCH) of the SDT and/or downlink radio resource(s) of the PDCCH of the SDT. The wireless device may receive a message (e.g., an RRC release message) comprising/indicating a set of the downlink radio resource(s) (e.g., CORESET(s)) of downlink control channels. The message may comprise a configuration indicating the set of the downlink radio resource(s) (e.g., CORESET(s)). The message may comprise/indicate one or more configurations. Each of the one or more configurations may comprise/indicate one of the downlink radio resource(s) (e.g., CORESET(s)). The message may indicate that each of the downlink radio resource(s) is associated with one of the one or more downlink RSs. Association between each of the downlink radio resource(s) and the one or more downlink RSs may be predefined. The wireless device may select at least one of the one or more downlink RSs, for example, based on RSRP values of the one or more downlink RSs. An RSRP value of the at least one of the one or more downlink RSs may be larger than a power threshold value. The RSRP value of the at least one of the one or more downlink RSs may be the largest one among the RSRP values. The wireless device may select a first downlink radio resource (e.g., CORESET) among the set of the downlink radio resource(s) (e.g., CORESET(s)), for example, if the first downlink radio resource is associated with the at least one of the one or more downlink RSs. The wireless device may receive a control signal (e.g., DCI) via the first downlink radio resource (via CG-based SDT and/or RA-based SDT) using antenna configuration(s) (e.g., TCI state) of the at least one of the one or more downlink RSs.

The wireless device may determine, for an SDT and/or one or more subsequent transmissions, downlink radio resource(s). The downlink radio resource(s) may be for PDSCH transmissions. The wireless device may determine the downlink radio resource(s), for example, based on a selection of one of the one or more downlink RSs. The wireless device may receive a message (e.g., an RRC release message) indicating one or more radio resource(s) for a PDSCH transmission. The one or more radio resource(s) may be specific to a particular downlink RS. The wireless device may select the one of the one or more downlink RSs based on RSRPs of the one or more downlink RSs. An RSRP value of the one of the one or more downlink RSs may be larger than a power threshold. The RSRP value may be the largest one among the RSRP values of the one or more downlink RSs. A first downlink RS of the one or more downlink RSs may be configured, for example, as downlink TCI state of a first radio resource(s) of the one or more radio resource(s). The wireless device may determine (and/or select), for a reception via a first channel (e.g., PDCCH), a downlink RS (e.g., downlink TCI state) of the one or more downlink RSs that is the same as a downlink RS for a reception via a second channel (e.g., PDSCH) of transmission. The wireless device may determine (and/or select) a downlink RS (e.g., downlink TCI state) of the one or more downlink RS per transmission channel (e.g., PDCCH and/or PDSCH).

The wireless device may determine (and/or select), for a reception via one or more channels (e.g., PDCCH and/or PDSCH), a downlink RS (e.g., downlink TCI state) of the one or more downlink RS to be the same as a downlink RS for a reception via a second channel (e.g., PDSCH) of transmission. The wireless device may determine (and/or select) a downlink RS (e.g., spatial relation information and/or uplink TCI state) of the one or more downlink RS per transmission channel (e.g., PDCCH and/or PDSCH).

The wireless device may determine (and/or select) a downlink RS of the one or more downlink RS (e.g., a downlink RS of spatial relation information) that is configured and/or selected for a transmission (e.g., a PUSCH transmission via an SDT) as the one (e.g., a downlink RS of a downlink TCI state) for a reception via one or more channels (e.g., PDCCH and/or PDSCH) of transmission. The wireless device may select, for example based on RSRPs of the one or more downlink RS, the downlink RS for uplink transmission of the SDT and/or its associated one or more subsequent transmissions. The wireless device may use the downlink RS for the reception of a PDCCH transmission and/or a PDSCH transmission. The wireless device may determine that DM-RS antenna port(s) associated with PDCCH reception and/or PDSCH reception is quasi co-located with the downlink RS (e.g., SS/PBCH block and/or the CSI-RS resource) that the wireless device determines and/or selects for the uplink transmission of the SDT and/or its associated one or more subsequent transmissions.

The selected downlink RS for PUSCH, PDSCH, PDCCH, and/or PUCCH in a non-RRC connected state may be referred to as a downlink RS of a common TCI and/or a default TCI. The common TCI and/or default TCI may be a TCI used for one or more uplink (e.g., PUSCH and/or PUCCH) and/or downlink (e.g., PDSCH and/or PDCCH) transmissions.

A wireless device may perform an SDT, followed by one or more subsequent transmissions, in a non-RRC connected state. The one or more subsequent transmissions may comprise at least one uplink transmission. The one or more subsequent transmissions may comprise at least one downlink transmission. An SDT and one or more subsequent transmissions may be grouped together. A group of transmission(s) may comprise the SDT and/or the one or more subsequent transmission. The SDT may be an initial uplink transmission of the group.

One or more subsequent transmissions may be one or more transmissions subsequent to and/or associated with an SDT. A wireless device may determine, based on a time window that is (re-) started based on (e.g., in response to) the SDT, whether one or more subsequent transmissions are the one or more transmissions subsequent to and/or associated with an SDT. The wireless device may send/transmit uplink data (e.g., by performing the SDT) via one or more radio resource(s) in a non-RRC connected state. The wireless device may (re-)start the time window, for example, based on (e.g., after or in response to) the SDT. The wireless device may monitor, based on transmitting the uplink data, a PDCCH within/during the time window. The wireless device may receive, within/during the time window, DCI that schedules the one or more transmissions. The one or more transmissions scheduled by the DCI received within the time window (e.g., as (re-)started based on (e.g., in response to) the SDT) may be referred to as one or more subsequent transmissions of the SDT.

The wireless device may send/transmit uplink data (e.g., by performing the SDT) via one or more radio resource(s) in a non-RRC connected state. The wireless device may monitor a PDCCH for a response to the uplink data. The wireless device may monitor, for the response, the PDCCH within/during a time window. The wireless device may (re-)start the time window, for example, based on (e.g., after or in response to) transmitting the uplink data. The wireless device may receive DCI via the PDCCH within/during the time window. The DCI may be a response (e.g., ACK or NACK HARQ feedback) to the transmitting the uplink data. The DCI may comprise an uplink grant (e.g., a dynamic grant) that schedules a first subsequent transmission (e.g., downlink or uplink transmission) of the one or more subsequent transmissions. The first subsequent transmission may be a new uplink transmission. The first subsequent transmission may be a new downlink transmission. The DCI may schedule a new transmission (e.g., the first subsequent transmission) subsequent to the SDT. A transport block of the new transmission may comprise first data (e.g., first MAC SDU) that may be different from second data (e.g., second MAC SDU) transmitted, by the wireless device, via a transport block of the SDT. The first subsequent transmission may be a retransmission of the uplink data.

The wireless device may monitor, using one or more RNTIs and within/during the time window, the PDCCH. The wireless device may monitor the PDCCH for the response to the transmission of the uplink data. The one or more RNTIs may comprise a C-RNTI of the wireless device. The one or more RNTIs may comprise an RNTI (e.g., CS-RNTI, PUR-RNTI, PUR C-RNTI, SDT-RNTI, and/or the like) assigned for the SDT. The RNTI assigned for the SDT may be referred to as an SDT-RNTI.

The wireless device may receive (and/or detect), via the PDCCH, DCI (e.g., that schedules one or more subsequent transmissions of the SDT) within/during the time window. The DCI may comprise CRC parity bits scrambled with the C-RNTI. The DCI may comprise a dynamic grant (e.g., dynamic uplink grant scheduling a PUSCH transmission and/or dynamic downlink assignment scheduling a PDSCH transmission). The DCI may comprise an uplink grant that schedules a new uplink transmission (e.g., in the non-RRC connected state). The DCI may comprise a downlink assignment that schedules a new downlink transmission (e.g., in the non-RRC connected state).

The wireless device may receive (and/or detect), via the PDCCH, DCI (e.g., that schedules one or more subsequent transmissions of the SDT) within/during the time window. The DCI may comprise CRC parity bits scrambled with the SDT-RNTI. The DCI may comprise an uplink grant that schedules a retransmission of the uplink data (and/or SDT) (e.g., in the non-RRC connected state).

The wireless device may perform, via (pre-)configured grant(s) (e.g., (pre-)configured grant type 2), one or more subsequent transmission(s) of the SDT. The wireless device may receive (and/or detect), via the PDCCH, the DCI (e.g., that schedules one or more subsequent transmissions of the SDT) within/during the time window. The DCI may comprise field(s) indicating an activation of (pre-)configured grant(s). The wireless device may receive a message (e.g., RRC release message) comprising configuration parameters of (pre-)configured grant(s). The (pre-)configured grant(s) may be for the one or more subsequent transmissions in the non-RRC connected state. The wireless device may not activate the (pre-)configured grant(s), for example, until the wireless device performs (e.g., needs to perform) the one or more subsequent transmissions and/or until the wireless device receives DCI comprising the field(s) indicating the activation of the (pre-)configured grant(s). The DCI may comprise a second field indicating an identifier (e.g., indicator/index) of configuration comprising the configuration parameters of the (pre-)configured grant(s). The message may comprise one or more configurations. Each of the one or more configurations may be indicated/identified by a respective identifier (e.g., indicator/index). Each of the one or more configurations may comprise respective (pre-)configured grant(s). Each of the one or more configurations may be configured to serve a respective type of services (e.g., enhanced mobile broadband (eMBB), machine-type communications (MTC), and/or ultra-reliable low latency communication (URLLC)), for example, with a respective periodicity and/or with a respective PUSCH transmission duration. The wireless device may activate the (pre-)configured grant(s) for the one or more subsequent transmissions, for example, based on (e.g., in response to) receiving the DCI comprising the field(s) indicating the activation of the (pre-)configured grant(s) (e.g., and comprising the second field indicating the identifier (e.g., index) of the (pre-)configured grant(s)). The configuration parameters of the (pre-)configured grant(s) may indicate one or more time domain radio resource parameters. The one or more time domain radio resource parameters may comprise a periodicity of the (pre-)configured grant(s). The one or more time domain radio resource parameters may comprise parameter(s) indicating a time offset. The time offset may be a time domain offset with respect to (and/or related to) a time reference. The time reference may be a particular SFN (e.g., of a H-SFN), a particular subframe number, a particular slot number, a particular symbol number, and/or a combination thereof. The time reference may be predefined (e.g., SFN=0 and/or H-SFN=0). The time reference may be a predefined value (e.g., SFN=0 and/or H-SFN=0), for example, if a field indicating the time reference is not present in the one or more configuration parameters. One or more radio resources indicated by the activated (pre-)configured grant(s) may start from a symbol (of a slot of an SFN of a H-SFN) indicated by the time offset. The one or more radio resources indicated by the activated (pre-)configured grant(s) may occur, following the symbol, periodically with the periodicity. The wireless device may, sequentially, determine that an $N^{th}$ (pre-)configured grant of the (pre-)configured grant(s) occurs in a transmission time interval (TTI, e.g., slot(s), mini-slot(s), symbol(s)) based on the time offset and (N*Periodicity). The time offset may be defined in terms of a quantity of symbols, a quantity of slots, a quantity of subframes, a quantity of SFNs, a quantity of H-SFNs, and/or a combination thereof.

The wireless device may perform one or more subsequent transmissions via at least one of the activated (pre-)configured grant(s). The wireless device may perform one or more subsequent transmissions, for example, until the wireless device receives an indication of a deactivation of the activated (pre-)configured grant(s). The wireless device may deactivate the activated (pre-) configured grant(s), for example, based on (e.g., after and/or in response to) receiving the indication of a deactivation of the activated (pre-)configured grant(s). The wireless device may receive, via a PDCCH, message (e.g., second DCI) comprising field(s) indicating the deactivation of the activated (pre-)configured grant(s). The wireless device may receive the second DCI within/during a time window (re-)started during one or more subsequent transmissions of the SDT (e.g., in accordance with various examples described herein). The second DCI may comprise a second field indicating an identifier (e.g., indicator/index) of a configuration comprising the configuration parameters of the activated (pre-)configured grant(s). The wireless device may deactivate the activated (pre-) configured grant(s) based on/in response to receive the second DCI indicating the deactivation of the activated (pre-)configured grant(s).

The wireless device may (re-)start the time window. The wireless device may (re-)start the time window, for example, based on (e.g., after and/or in response to) receiving the DCI. The DCI may comprise an uplink grant for a retransmission of the uplink data, an uplink grant for a new uplink transmission, and/or a downlink assignment for a new downlink transmission. The wireless device may monitor, using at least one RNTI (e.g., C-RNTI and/or SDT-RNTI) and within/during the (re)started time window, the PDCCH. The wireless device may receive, via the PDCCH, second DCI within/during the (re-)started time window. The second DCI may comprise CRC parity bits scrambled with the SDT-RNTI and/or C-RNTI. The second DCI may comprise/indicate an uplink grant for a retransmission of the uplink data, an uplink grant for a new uplink transmission, and/or a downlink assignment for a new downlink transmission. The wireless device may (re-)start the time window, for example, based on (e.g., after and/or in response to) receiving the second DCI. The wireless device may monitor, using the at least one RNTI (e.g., C-RNTI and/or SDT-RNTI), the PDCCH during the (re-)started time window. The wireless device may continue one or more subsequent transmissions by (re-)starting the time window based on receiving such DCI. The wireless device may (re-)start the time window-based on/in response to receiving such DCI, for example, after each of the one or more subsequent transmissions.

The wireless device may stop monitoring the PDCCH, for example, based on/in response to an expiry of the time window and/or the (re-)started time window. The wireless device may stop the one or more subsequent transmissions in the non-RRC connected state, for example, if the wireless device does not receive DCI within/during the time window and/or the (re-)started time window. The one or more subsequent transmissions associated with an SDT may be one or more transmissions performed based on (e.g., after and/or in response to) the SDT (e.g., the first initial transmission) and before an expiration of the time window (re-)started based on (e.g., after or in response to) the SDT. The wireless device may stop monitoring, using one or more RNTIs, the PDCCH based on/in response to an expiration of the time window and/or the (re-)started time window. The one or more RNTIs may comprise a C-RNTI of the wireless device and/or RNTI(s) (e.g., CS-RNTI, PUR-RNTI, PUR C-RNTI, SDT-RNTI, and/or the like) assigned for the SDT.

Figure 21:
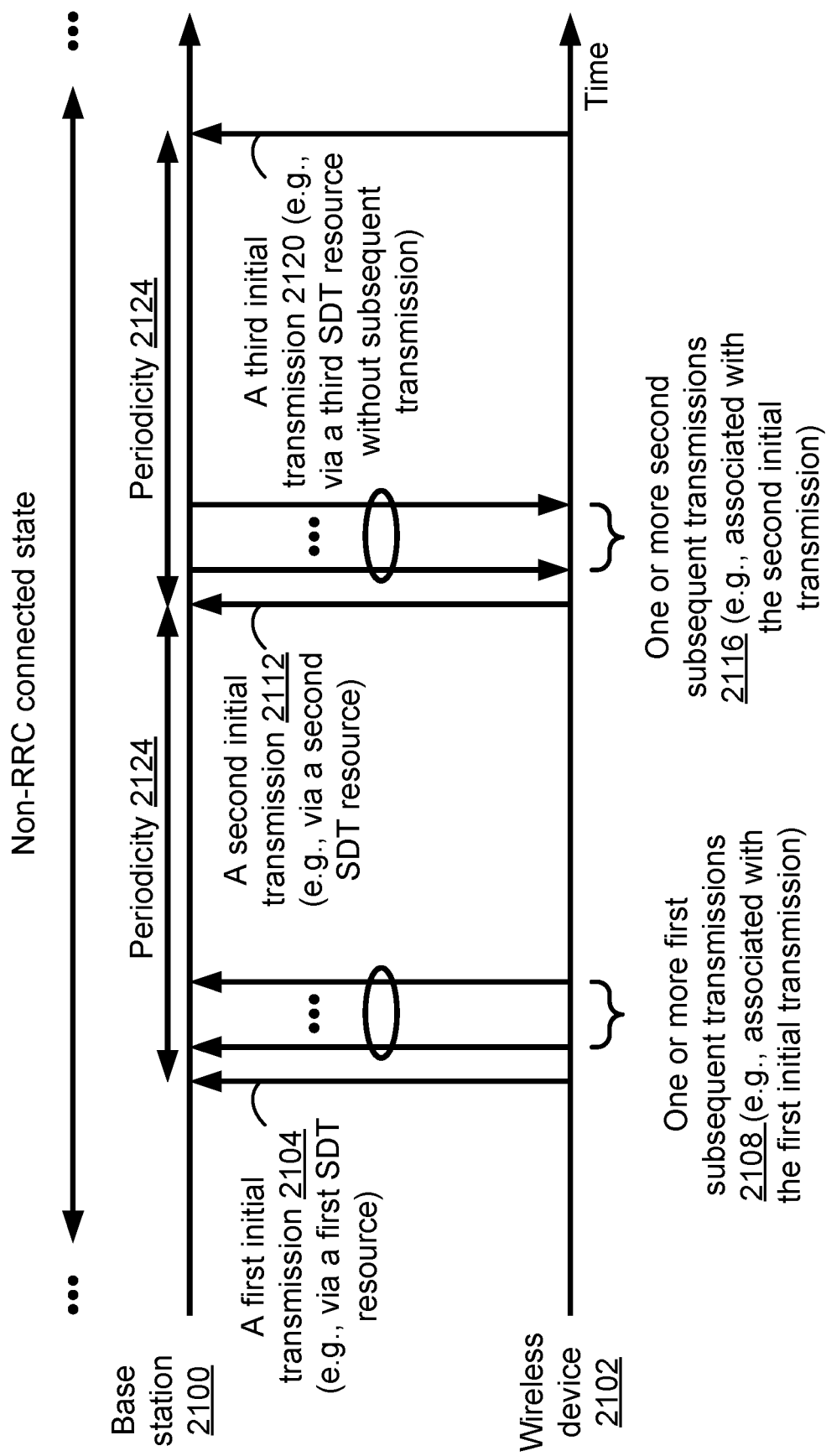
FIG. 21 shows an example of one or more subsequent transmissions of an SDT.

FIG. 21 shows an example of one or more subsequent transmissions of an SDT. A wireless device 2102 may receive a message (e.g., an RRC release message, from a base station 2100) comprising and/or indicating configuration parameters of an SDT. The configuration parameters may indicate uplink grant(s) and/or one or more uplink radio resource(s) of the uplink grant(s) for the SDT. The one or more uplink radio resource(s) may comprise a first SDT resource, a second SDT resource, and/or a third SDT resource (e.g., as shown in FIG. 21). The wireless device 2102 may send/transmit an uplink data via one of the one or more uplink radio resource(s). The wireless device 2102 may skip a transmission via one of the one or more uplink radio resource(s), for example, if there is no uplink data in a buffer of the wireless device. The one or more uplink radio resource(s) may be periodic resource(s) with a periodicity 2124.

The wireless device 2102 may perform one or more subsequent transmissions, for example, based on (e.g., after and/or in response to) an SDT. The SDT and the one or more subsequent transmissions may be grouped together. The wireless device may determine a first SDT resource, a second SDT resource, and a third SDT resource (e.g., as shown in FIG. 21). The wireless device 2102 may determine the first SDT resource, the second SDT resource, and the third SDT resource, for example, among the uplink grant(s) indicated by the configuration parameters configured for the SDT. The wireless device 2102 may perform a first initial transmission 2104 (e.g., an SDT) via the first SDT resource. The wireless device 2102 may (re-) start a time window, for example, based on/in response to the first initial transmission 2104. The wireless device 2102 may perform a second initial transmission 2112 (e.g., an SDT) via the second SDT resource. The wireless device 2102 may (re-)start a time window, for example, based on/in response to the second initial transmission 2112.

The wireless device 2102 may receive, via a PDCCH, one or more DCI messages that schedule one or more subsequent transmissions. The wireless device may perform (e.g., send/transmit and/or receive) the one or more subsequent transmissions based on the one or more DCI messages. The wireless device 2102 may receive the one or more DCI messages during the time window. The one or more DCI messages may comprise a DCI message that comprises a dynamic grant of the one or more subsequent transmissions. The one or more DCI messages may comprise a DCI message indicating an activation of (pre-)configured grant(s). The (pre-) configured grant(s) may be configured (e.g., by the RRC release message) for the one or more subsequent transmissions. The wireless device 2102 may receive the one or more DCI messages during the time window and/or the (re-)started time window. The time window may be (re-)started one or more times. The wireless device may stop monitoring the PDCCH, for example, in response to an expiry of the time window (or the (re-)started time window).

The one or more subsequent transmissions may comprise at least one uplink transmission (e.g., the one or more first subsequent transmission 2108). The one or more subsequent transmissions may comprise at least one downlink transmission (e.g., the one or more second subsequent transmissions 2116).

The wireless device 2102 may perform a third initial transmission 2120 (e.g., an SDT) via the third SDT resource. The wireless device 2102 may not perform one or more subsequent transmissions following the third initial transmission 2120.

A wireless device may maintain a time window for an SDT and/or one or more subsequent transmissions of an SDT. The wireless device may receive, from a base station, a message (e.g., an RRC release message) indicating/comprising a value (e.g., length) of the time window. The value may indicate a time period (or interval) during which the wireless device performs (e.g., is allowed to perform) an SDT and/or one or more subsequent transmissions of an SDT. The value may indicate a time period (or interval) that the wireless device monitors (e.g., is allowed to monitor) a PDCCH to receive one or more uplink and/or downlink grants (e.g., for new uplink and/or new downlink transmissions and/or retransmission(s) of the SDT and/or the one or more subsequent transmissions of the SDT). The wireless device may receive one or more DCI messages via the PDCCH. The one or more DCI messages may comprise the one or more uplink uplink and/or downlink downlink grants. The wireless device may not (re-)start the time window, for example, based on/in response to receiving a grant (e.g., uplink grant and/or downlink grant) via the one or more DCI messages. The wireless device may not (re-)start the time window, for example, based on/in response to performing a transmission scheduled by a grant (e.g., uplink grant and/or downlink grant) of the one or more uplink and/or downlink grants (e.g., for the SDT and/or the one or more subsequent transmissions of the SDT). The wireless device may stop monitoring the PDCCH, for example, based on/in response to an expiry of the time window. The wireless device may stop performing the SDT and/or the one or more subsequent transmissions of the SDT, for example, based on/in response to an expiry of the time window.

Figure 22A:
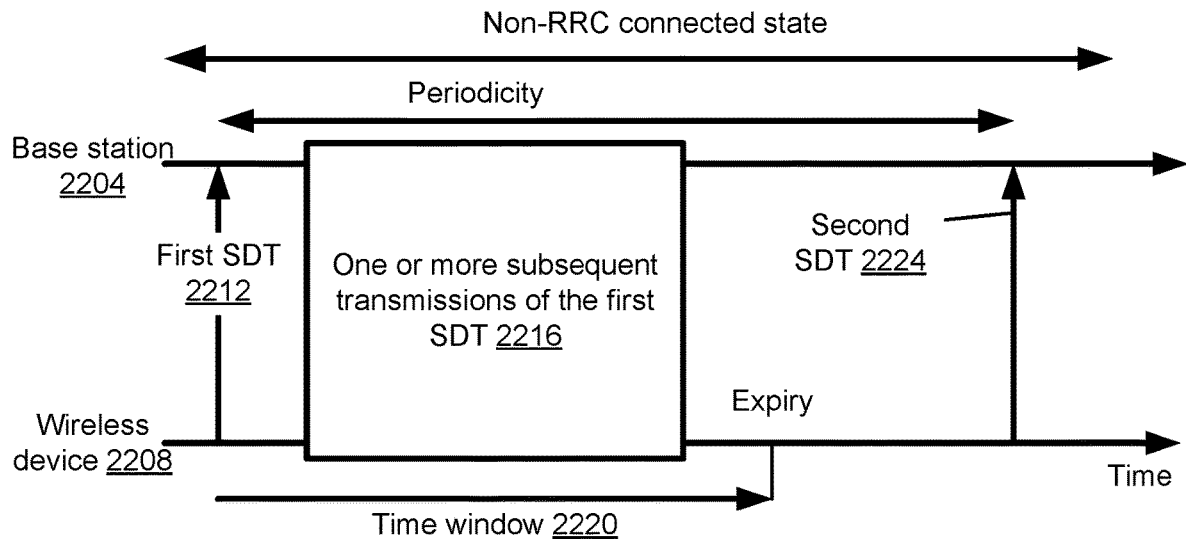
FIG. 22A shows an example time window management.

FIG. 22A shows example time window management for an SDT procedure. The example time window management may be for one or more subsequent transmissions of an SDT. A wireless device 2208 may receive a message (e.g., an RRC release message from a base station 2204). The message may comprise and/or indicate configuration parameters of an SDT. The configuration parameters may indicate uplink grant(s) and/or one or more uplink radio resource(s) of the uplink grant(s) for the SDT. As shown in FIG. 22A, a first SDT 2212 and a second SDT 2224 may be transmissions via the uplink grant(s) and/or the one or more uplink radio resource(s) (e.g., with a periodicity). The wireless device 2208 may (re-)start a time window, for example, based on/in response to sending/transmitting, via the uplink grant(s) and/or the one or more uplink radio resource(s), uplink data. The wireless device 2208 may (re-)start a time window 2220, for example, based on/in response to performing the first SDT 2212. The message may comprise a value (e.g., length/duration) of the time window. The wireless device may monitor a PDCCH during/within the time window with one or more RNTIs. The one or more RNTIs may be predefined and/or configured by the base station 2204 (e.g., via one or more RRC message(s) that may comprise the message) for the PDCCH monitoring for the SDT and/or for a non-RRC connected state. The one or more RNTIs may comprise C-RNTI, SDT-RNTI, and/or P-RNTI (e.g., RNTI for a paging message). The wireless device 2208 may receive, via the PDCCH, one or more DCI messages. The one or more DCI messages may comprise uplink grant(s) that schedule new uplink transmission(s). The one or more DCI messages may comprise uplink grant(s) that schedule uplink (re-)transmissions. The one or more DCI messages may comprise downlink grant(s) that schedule new downlink transmissions. The one or more DCI messages may comprise downlink grant(s) that schedule downlink (re-)transmissions. The wireless device 2208 may continue running the time window 2220 (e.g., not restart the time window 2220), independent of reception of the one or more DCI messages and/or independent of performing uplink and/or downlink new transmission(s) and/or (re-)transmissions. For example, the wireless device 2208 may not stop or may not (re-) start the time window 2220 based on/in response to receiving the one or more DCI messages and/or in response to performing uplink and/or downlink new transmission(s) and/or (re-) transmissions. The wireless device 2208 may continue to monitor (and/or keep monitoring) the PDCCH until the time window 2220 expires. The wireless device may stop to monitor the PDCCH, for example, based on/in response to an expiry of the time window 2220.

A wireless device may maintain a time window for an SDT and/or one or more subsequent transmissions of an SDT. The wireless device may receive, from a base station, a message (e.g., RRC release message) indicating/comprising a value (e.g., length/duration) of the time window. The value may indicate a time period (or interval) during which the wireless device may perform (e.g., is allowed to perform) an SDT and/or one or more subsequent transmissions of an SDT. The value may indicate a time period (or interval) during which the wireless device may monitor (e.g., is allowed to monitor) a PDCCH to receive one or more uplink and/or downlink grants for new uplink and/or downlink transmissions and/or retransmissions of the SDT and/or the one or more subsequent transmissions of the SDT. The wireless device may receive one or more DCI messages via the PDCCH. The one or more DCI messages may comprise the one or more uplink and/or downlink grants. The wireless device may (re-)start the time window, for example, based on/in response to receiving a grant (e.g., uplink grant and/or downlink grant) of the one or more DCI messages. The wireless device may (re-)start the time window, for example, based on/in response to performing a transmission scheduled by a grant (e.g., uplink grant and/or downlink grant) for the SDT and/or the one or more subsequent transmissions of the SDT. The wireless device may stop monitoring the PDCCH, for example, based on/in response to an expiry of the time window. The wireless device may stop performing the SDT and/or the one or more subsequent transmissions of the SDT, for example, based on/in response to an expiry of the time window.

Figure 22B:
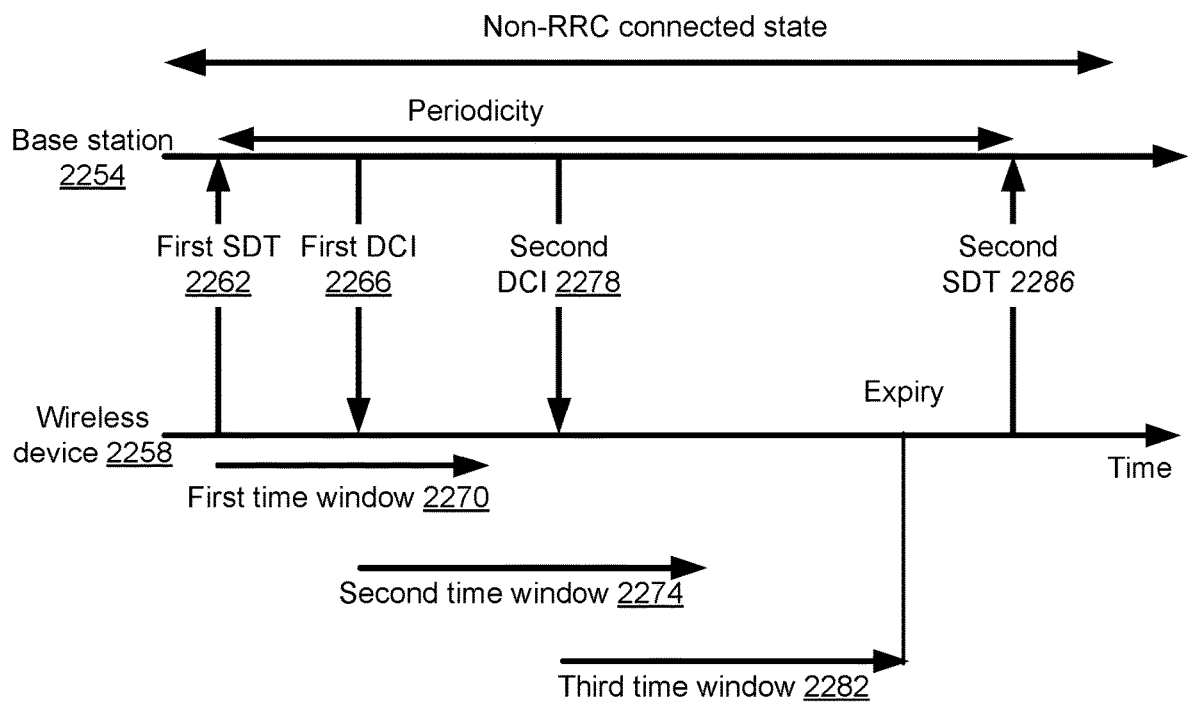
FIG. 22B shows an example time window management.

FIG. 22B shows example time window management for an SDT procedure. The example time window management may be for one or more subsequent transmissions of an SDT. A wireless device 2258 may receive a message (e.g., an RRC release message, from a base station 2254). The message may comprise and/or indicate configuration parameters for an SDT. The configuration parameters may indicate uplink grant(s) and/or one or more uplink radio resource(s) of the uplink grant(s) for the SDT. A first SDT 2262 and a second SDT 2286 may be the transmissions via the uplink grant(s) and/or the one or more uplink radio resource(s) (e.g., with a periodicity). The wireless device may (re-)start a time window, for example, based on/in response to sending/transmitting, via the uplink grant(s) and/or the one or more uplink radio resource(s), uplink data. For example, the wireless device may (re-)start a first time window based on/in response to performing the first SDT 2262. The message may indicate/comprise a value (e.g., length/duration) of a first time window 2270. The wireless device 2258 may monitor a PDCCH during the first time window 2270 using/based on one or more RNTIs. The one or more RNTIs may be predefined and/or configured by the base station 2254 (e.g., indicated by one or more RRC message(s) that may comprise the message) for the PDCCH monitoring for the SDT and/or for a non-RRC connected state. The one or more RNTIs may comprise C-RNTI, SDT-RNTI, and/or P-RNTI (e.g., RNTI for a paging message). The wireless device 2258 may receive, via the PDCCH, first DCI 2266, for example, within/during the first time window 2270. The first DCI 2266 may comprise uplink grant(s) that schedule new uplink transmission(s). The first DCI 2266 may comprise uplink grant(s) that schedule uplink (re-)transmissions of the first SDT 2262. The first DCI 2266 may comprise downlink grant(s) that schedule new downlink transmissions. The wireless device 2258 may (re-)start a second time window 2274, for example, based on/in response to receiving the first DCI 2266 and/or based on/in response to performing an uplink or downlink transmission (e.g., receiving the downlink transmission) scheduled by the first DCI 2266. The second time window 2274 may have a same length/duration as the first time window 2270. The wireless device 2258 may (re-)start the first time window 2270 as the second time window 2274, for example, based on/in response to receiving the first DCI 2266 and/or based on/in response to performing an uplink or a downlink transmission (e.g., receiving the downlink transmission) scheduled by the first DCI 2266. The wireless device 2258 may monitor, during the second time window 2274, the PDCCH with/based on the one or more RNTIs. The wireless device 2258 may (re-)start a new time window and/or (re-)start the first time window 2270, for example, based on/in response to receiving DCI and/or based on/in response to performing a transmission scheduled by the DCI. The wireless device 2258 may (re-)start a third time window 2282, for example, based on/in response to receiving second DCI 2278 during the second time window 2274 and/or based on/in response to performing an uplink or a downlink transmission (e.g., receiving the downlink transmission) scheduled by the second DCI 2278. The third time window 2282 may be the first time window 2270 that the wireless device (re-) starts, for example, based on/in response to receiving second DCI 2278 during the second time window 2274 and/or based on/in response to performing an uplink or a downlink transmission (e.g., receiving the downlink transmission) scheduled by the second DCI 2278. The wireless device 2258 may continue monitoring the PDCCH while a time window (e.g., the first time window 2270, the second time window 2274, and/or the third time window 2282) started for the SDT and/or its associated subsequent transmission(s) is running. The wireless device 2258 may continue monitoring the PDCCH within a time window. The wireless device 2258 may stop monitoring the PDCCH, with/using the one or more RNTIs, for example, if the time window expires. The wireless device 2258 may stop monitoring the PDCCH, for example, if the wireless device 2258 has not received DCI (e.g., introduced based on the one or more RNTIs) and/or if the third time window 2258 expires (e.g., without receiving DCI).

A wireless device may perform an SDT, followed by one or more subsequent transmissions in a non-RRC connected state. The one or more subsequent transmissions may comprise at least one uplink transmission. The one or more subsequent transmissions may comprise at least one downlink transmission. An SDT and/or one or more subsequent transmissions may be grouped together. An SDT and/or one or more subsequent transmissions may be grouped together, for example, if the one or more subsequent transmissions are scheduled based on the SDT (e.g., as described herein with respect to various examples). A group of transmission(s) may comprise the SDT and/or the one or more subsequent transmission. The SDT may be an initial uplink transmission of the group, which may be followed by the one or more subsequent transmission. The wireless device may determine the group of transmission(s) based on an RRC procedure that the wireless device may initiate. The RRC procedure may be initiated by an RRC layer of the wireless device. The RRC procedure may comprise an RRC resume procedure, an RRC early data transmission procedure, an RRC small data transmission (SDT) procedure, and/or the like. The determining the group of transmission(s) may comprise a determination of a start of the group of transmission(s) and/or a determination of whether the group of transmission(s) has started. The determining the group of transmission(s) may comprise a determination of an end of the group of transmission(s) and/or a determination of whether the group of transmission(s) has been completed (e.g., ended, and/or terminated). The determining the group of transmission(s) may comprise a determination of whether the group of transmission(s) has been completed (e.g., ends, and/or is terminated) successfully or unsuccessfully.

The group of transmission(s) may refer to one or more transmissions of data that the wireless device may perform while maintaining an RRC state of the wireless device as the non-RRC connected state. The data may comprise the data associated with DTCH and/or CCCH. The group of transmission(s) that comprises the SDT and/or the one or more subsequent transmission may be referred to as an SDT procedure (or an SDT process), an RRC SDT procedure (or an RRC SDT process), an RRC resume procedure, an RRC early data transmission procedure, and/or the like. The wireless device may perform the SDT, for example, as an initial transmission of the SDT procedure. The wireless device (e.g., RRC layer of the wireless device) may initiate the SDT procedure. The wireless device (e.g., RRC layer of the wireless device) may initiate the SDT procedure, for example, based on/in response to data (e.g., data associated with DTCH, CCCH, and/or dedicated control channel, DCCH) being available for transmission. The wireless device may perform the SDT, for example, based on (e.g., after and/or in response to) initiating the SDT procedure.

The group of transmission(s) (e.g., corresponding to the SDT procedure) may start, for example, based on (e.g., after and/or in response to) a transmission of an RRC request message. The RRC request message may comprise an RRC resume request, an RRC early data transmission request, an RRC small data transmission request, and/or the like. The transmitting the RRC request message may be the SDT (e.g., the initial uplink transmission of the group). The group of transmission(s) may complete (e.g., end and/or be terminated), for example, based on receiving a response to the RRC request message. The wireless device may complete and/or terminate (e.g., successfully) the SDT procedure, for example, based on (e.g., after and/or in response to) receiving the response. The wireless device may receive the response of the RRC request message via (or in) the last transmission (e.g., downlink transmission) of the one or more subsequent transmissions of the SDT. The last transmission of the one or more subsequent transmission of the SDT may be a downlink transmission from a base station to the wireless device. The downlink transmission may comprise receiving, by the wireless device, the response to the RRC request message.

The wireless device may perform, in the non-RRC connected state, one or more subsequent transmissions (downlink transmission and/or uplink transmission). The one or more subsequent transmissions may be between the transmission (e.g., SDT) of the RRC request message and the reception of the response to the RRC request message. The wireless device may perform, in the non-RRC connected state, one or more subsequent transmissions (e.g., downlink transmission and/or uplink transmission), for example, based on (e.g., after and/or in response to) initiating the SDT procedure. The wireless device may perform, in the non-RRC connected state, one or more subsequent transmissions (e.g., downlink transmission and/or uplink transmission), for example, until the wireless device determines that the SDT procedure has been completed (e.g., ended and/or terminated) successfully or unsuccessfully.

The response to the RRC request message may be an RRC release message. The wireless device may maintain an RRC state of the wireless device as the non-RRC connected state, for example, based on (e.g., after and/or in response to) receiving the response (e.g., the RRC release message). The wireless device may stop monitoring PDCCH (e.g., based on one or more RNTIs) associated with the SDT and/or the one or more subsequent transmissions. The wireless device may stop the time window (e.g., a time window as shown in FIG. 22A and/or FIG. 22B), if running, for example, based on (e.g., after and/or in response to) receiving the response (e.g., the RRC release message). The wireless device may not (re-)start the time window (e.g., a time window as shown in FIG. 22A and/or FIG. 22B), for example, based on (e.g., after and/or in response to) receiving the response (e.g., the RRC release message).

The response to the RRC request message may be an RRC connection setup message. The RRC connection setup message may comprise an RRC resume message, an RRC (re)establishment message, an RRC setup message, and/or an RRC message. The RRC connection setup message may comprise parameters that indicate a transition of the wireless device from a non-RRC connected state to an RRC connected state. The wireless device may transition the RRC state of the wireless device from the non-RRC connected state to the RRC connected state, for example, based on (e.g., after and/or in response to) receiving the response (e.g., the RRC connection setup message). The wireless device may determine to (e.g., successfully) complete and/or terminate the group of transmission(s), for example, based on (e.g., after and/or in response to) receiving the response (e.g., the RRC connection setup message). The wireless device may stop monitoring PDCCH (e.g., based on one or more RNTIs associated with the SDT and/or the one or more subsequent transmissions), for example, based on (e.g., after and/or in response to) receiving the response (e.g., the RRC connection setup message). The wireless device may stop the time window (e.g., a time window as shown in FIG. 22A and/or FIG. 22B), for example, based on/in response to the time window running and/or based on/in response to receiving the response (e.g., the RRC connection setup message). The wireless device may not (re-)start the time window (e.g., a time window as shown in FIG. 22A and/or FIG. 22B), for example, based on (e.g., after and/or in response to) receiving the response (e.g., the RRC connection setup message).

Figure 23:
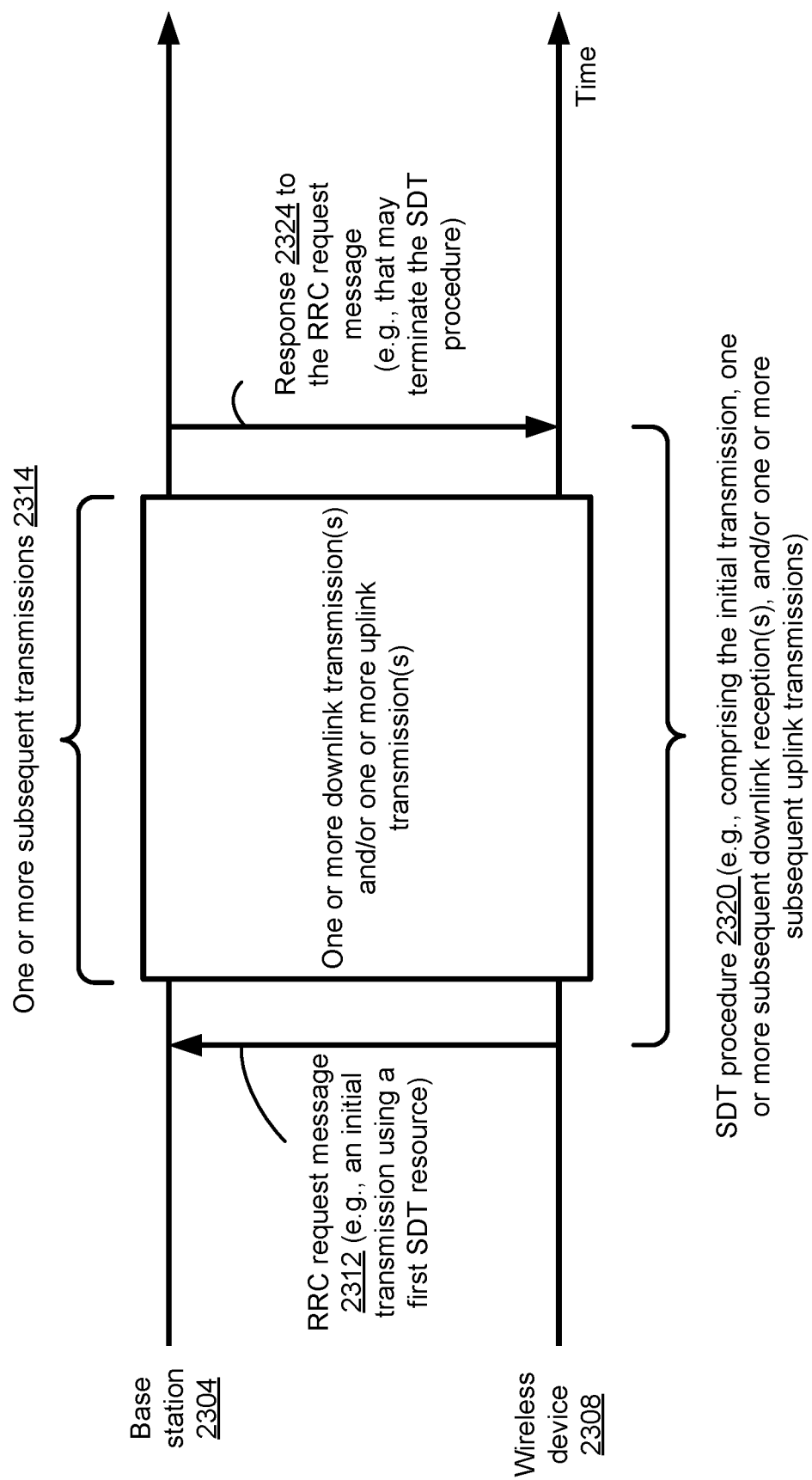
FIG. 23 shows an example SDT procedure.

FIG. 23 shows an example SDT procedure. The example SDT procedure 2320 may comprise an SDT and one or more subsequent transmissions of an SDT. A wireless device 2308 may receive a message (e.g., a first RRC release message, from a base station 2304) comprising configuration parameters of an SDT in a non-RRC connected state. The wireless device 2308 may receive the message (e.g., a first RRC release message) in an RRC connected state. The configuration parameters may indicate uplink grant(s) configured for the SDT and/or one or more uplink radio resource(s) of the uplink grant(s) configured for the SDT. The one or more uplink radio resource(s) may comprise a first SDT resource (e.g., as shown in FIG. 23). The wireless device 2308 may initiate the SDT procedure 2320. The wireless device 2308 may determine, as the first SDT resource, one of the one or more uplink radio resource(s) of the uplink grant(s) configured for the SDT. The wireless device 2308 may send/transmit uplink data via the first SDT resource, for example, based on (e.g., after and/or in response to) initiating the SDT procedure 2320. The transmission of the uplink data via the first SDT resource may be the SDT of the SDT procedure. The wireless device 2308 may perform one or more subsequent transmissions 2314 (e.g., of the SDT procedure 2320), for example, based on (e.g., after and/or in response to) sending/transmitting the uplink data via the first SDT resource. The SDT and the one or more subsequent transmissions 2314 may be grouped as the SDT procedure 2320.

The wireless device 2308 may send/transmit, via the first SDT resource, an RRC request message 2312 as an initial transmission (e.g., an SDT) of the SDT procedure 2320. The wireless device 2308 may start (and/or restart one or more times) a time window, for example, based on (e.g., after and/or in response to) the initial transmission. The wireless device 2308 may receive, via a PDCCH and/or during the SDT procedure 2320, one or more DCI messages that schedule the one or more subsequent transmissions 2314. The wireless device 2308 may receive the one or more DCI messages within/during the time window. The wireless device 2308 may receive the one or more DCI messages within/during the time window and/or the (re-)started time window (e.g., as described with respect to FIG. 22A and/or FIG. 22B). The one or more subsequent transmissions 2314 may comprise at least one uplink transmission (e.g., the one or more first subsequent transmissions 2108 as described with respect to FIG. 21). The one or more subsequent transmissions 2314 may comprise at least one downlink transmission (e.g., the one or more second subsequent transmission 2116 as described with respect to FIG. 21). The wireless device 2308 may stop monitoring the PDCCH, for example, based on (e.g., after and/or in response to) an expiry of the time window (or an expiry of the (re-)started time window). The wireless device 2308 may determine that the SDT procedure 2320 has been completed (e.g., successfully), for example, based on (e.g., after and/or in response to) receiving a response 2324 to the RRC request message 2312. The SDT procedure 2320 may start with an uplink transmission (e.g., the initial transmission) of the RRC request message 2312. The SDT procedure 2320 may be terminated, for example, based on (e.g., after and/or in response to) receiving the response 2324 to the RRC request message.

A wireless device may perform a communication procedure for communicating with a network (e.g., a base station). The wireless device may perform the communication procedure for communication during a non-connected state (e.g., an inactive state such as an RRC inactive state, an idle state such as an RRC idle state, etc.) of the wireless device. For example, the wireless device may perform an SDT procedure. The wireless device may select an RA-based SDT or a CG-based SDT for the SDT procedure. For example, the wireless device may have data (e.g., from DTCH, CCCH, and/or dedicated control channel, DCCH) available during a non-RRC connected state (e.g., during a time period in which the wireless device is in a non-RRC connected state). The data may be new data arriving (e.g., in a buffer) during the SDT procedure in a non-RRC connected state (e.g., during an ongoing SDT procedure in a non-RRC connected state). The wireless device may select one of a plurality of transmission types to send/transmit the data (e.g., to a base station). The transmission types may comprise the RA-based SDT and the CG-based SDT. The wireless device may send/transmit the data via the RA-based SDT and/or one or more subsequent transmissions initiated by the RA-based SDT. The wireless device may transmit the data via the CG-based SDT and/or one or more subsequent transmissions initiated by the CG-based SDT. The transmission types may comprise one or more transmissions during an RRC connected state. The wireless device may perform (e.g., in the non-RRC connected state) an RA procedure (e.g., as shown in FIG. 13A, FIG. 13BA, FIG. 13C), that may not support an SDT, to perform the one or more transmissions. The RA procedure that may not support an SDT to perform the one or more transmissions may be referred to as a normal RA procedure. FIG. 13A, FIG. 13BA, and/or FIG. 13C show examples of the normal RA procedure. The wireless device may establish a connection (e.g., an RRC connection) with a network, for example, based on (e.g., after and/or in response to) the normal RA procedure (that may not support the SDT) being successfully completed. The wireless device may transition to the RRC connected state, for example, based on (e.g., after and/or in response to) the normal RA procedure (that may not support the SDT) being successfully completed. The wireless device may perform the one or more transmission during the RRC connected state, for example, based on (e.g., after and/or in response to) the normal RA procedure (that may not support the SDT) being successfully completed.

The wireless device may not send/transmit data (e.g., from DTCH and/or DCCH) during the normal RA procedure. For example, Msg 3 (e.g., Msg 3 1313 as shown in FIG. 13A) and/or Msg A (Msg 1331 as shown in FIG. 13C) of the normal RA procedure may not comprise the data (e.g., from DTCH and/or DCCH). The Msg 3 and/or the Msg A of the normal RA procedure may comprise data of a particular logical channel (e.g., CCCH). The wireless device may send/transmit data (e.g., from DTCH and/or DCCH) via uplink grant(s) received, for example, based on (e.g., in response to and/or after) the normal RA procedure (e.g., successfully) being completed. The wireless device may transmission to an RRC connected state, for example, based on (e.g., in response to and/or after) the normal RA procedure (e.g., successfully) being complete. The wireless device may send/transmit data (e.g., from DTCH and/or DCCH) via uplink grant(s) during the RRC connected state.

A wireless device may determine/select one of RA-based SDT, CG-based SDT, and/or a normal RA procedure, for example, based on (e.g., if) the wireless device having data (e.g., from DTCH and/or DCCH) available (e.g., arriving) during a non-RRC connected state. The wireless device may select the one based on one or more conditions (e.g., criteria). The conditions may comprise availability of corresponding configuration parameters (e.g., configuration parameters of radio resources) in a cell, a data volume size of the data (e.g., a size of message comprising the data) and/or an RSRP value measured by the wireless device on the cell. The conditions may comprise any other criteria based on channel condition(s) of the cell, data to be transmitted, configuration of the wireless device/cell, etc.

The one or more conditions that the wireless device may use to determine/select the CG-based SDT may be referred to as CG-based SDT selection condition(s). The wireless device may determine/select the CG-based SDT, for example, if at least one of the CG-based SDT selection conditions(s) are met. The CG-based SDT selection condition(s) may comprise the data volume size being smaller than or equal to a data volume threshold value (e.g., indicated by a higher layer parameter, sdt-TBS) of the CG-based SDT. The CG-based SDT selection condition(s) may comprise the RSRP value being greater than or equal to an RSRP threshold value of the CG-based SDT. The RSRP threshold value of the CG-based SDT may be predefined and/or indicated by a base station. The wireless device may receive system information (e.g., via a broadcast message) and/or an RRC message (e.g., wireless device-specific message, and/or RRC release message). The system information and/or the RRC message may configure the RSRP threshold value of the CG-based SDT. The CG-based SDT selection condition(s) may comprise availability of one or more valid uplink radio resources (e.g., CG-based SDT resources as shown in FIG. 19A and/or FIG. 19B). The wireless device may determine/select the CG-based SDT, for example, if at least one of following conditions is satisfied: the data volume size is smaller than or equal to the data volume threshold value of the CG-based SDT; the RSRP value is greater than or equal to the RSRP threshold value of the CG-based SDT; and/or at least one of one or more valid uplink radio resources (e.g., CG-based SDT resources as shown in FIG. 19A and/or FIG. 19B) is available.

The one or more conditions that the wireless device may use to determine/select the RA-based SDT may be referred to as RA-based SDT selection condition(s). The wireless device may determine/select the RA-based SDT, for example, based on (e.g., if) at least one of the RA-based SDT selection conditions(s) being met. The RA-based SDT selection condition(s) may comprise the data volume size being smaller than or equal to a data volume threshold value (e.g., indicated by a higher layer parameter, sdt-TBS) of the RA-based SDT. The RA-based SDT selection condition(s) may comprise the RSRP value being greater than or equal to an RSRP threshold value of the RA-based SDT. The RSRP threshold of the RA-based SDT may be predefined and/or indicated by a base station. The wireless device may receive system information (e.g., broadcast message) and/or an RRC message (e.g., wireless device specific message, and/or RRC release message). The system information and/or the RRC message may configure the RSRP threshold value of the RA-based SDT. The RA-based SDT selection condition(s) may comprise availability of RA-based SDT configurations. The RA-based SDT configurations may be for a four-step RA procedure (e.g., as shown in FIG. 18A). The RA-based SDT configurations may be for a two-step RA procedure (e.g., as shown in FIG. 18B). The wireless device may determine/select the RA-based SDT, for example, if at least one of following conditions is satisfied: the data volume size is smaller than or equal to the data volume threshold value of the RA-based SDT; the RSRP value is greater than or equal to the RSRP threshold value of the RA-based SDT; and/or at least one of the RA-based SDT configurations for four-step RA procedure (e.g., FIG. 18A) and/or for two-step RA procedure (FIG. 18B) is available.

The data volume threshold value of the CG-based SDT and the data volume threshold value of the RA-based SDT may be separately configured. A wireless device may receive (e.g., from a base station) a first data volume threshold value (e.g., first sdt-TBS) that may be used as the data volume threshold value of the CG-based SDT. The wireless device may receive (e.g., from the base station) a second data volume threshold value (e.g., second sdt-TBS) that may be used as the data volume threshold value of the RA-based SDT. The first data volume threshold value may be the same as the second data volume threshold value. The first data volume threshold value may be different from the second data volume threshold value.

The data volume threshold value of the CG-based SDT may be the same as the data volume threshold value of the RA-based SDT. A wireless device may receive a data volume threshold value (e.g., indicated by a higher layer parameter sdt-TBS) that may be used as the data volume threshold value of the CG-based SDT and/or as the data volume threshold value of the RA-based SDT. For example, a single data volume threshold value may be used as the data volume threshold values of the CG-based SDT and the RA-based SDT.

The RSRP threshold value of the CG-based SDT and the RSRP threshold value of the RA-based SDT may be separately configured. A wireless device may receive a first RSRP threshold value that may be used as the RSRP threshold value of the CG-based SDT and/or a second RSRP threshold value that may be used as the RSRP threshold value of the RA-based SDT. The first RSRP threshold value of the CG-based SDT may be the same as the second RSRP threshold value of the RA-based SDT. The first RSRP threshold value of the CG-based SDT may be different from the second RSRP threshold value of the RA-based SDT.

The RSRP threshold value of the CG-based SDT may be the same as the RSRP threshold value of the RA-based SDT. A wireless device may receive an RSRP threshold value that may be used as the RSRP threshold value of the CG-based SDT and/or as the RSRP threshold value of the RA-based SDT. For example, a single RSRP threshold value may be used as the RSRP threshold values of the CG-based SDT and the RA-based SDT.

The CG-based SDT may have a higher priority than the RA-based SDT and/or the normal RA procedure. The CG-based SDT may have a higher priority for selection among the RA-based SDT, the CG-based SDT, and/or the normal RA procedure. The RA-based SDT may have a higher priority than the normal RA procedure for selection among the RA-based SDT and/or the normal RA procedure. The wireless device may determine/select the CG-based SDT among the CG-based SDT, the RA-based SDT, and/or the normal RA procedure, for example, if at least one of (e.g., or all of) the CG-based SDT selection conditions(s) is met. The wireless device may determine/select the RA-based SDT among the CG-based SDT, the RA-based SDT, and/or the normal RA procedure, for example, if at least one of the CG-based SDT selection conditions(s) is not met, and/or if at least one of (e.g., all of) the RA-based SDT selection conditions(s) is met.

The wireless device may further determine whether to perform the selected RA-based SDT using the four-step RA procedure (e.g., as shown in FIG. 18A) or the two-step RA procedure (e.g., as shown in FIG. 18B). The wireless device may use the measured RSRP value to determine whether to perform the selected RA-based SDT using the four-step RA procedure or the two-step RA procedure. The wireless device may determine which one of the four-step RA procedure or the two-step RA procedure to use based on one or more conditions. The wireless may determine/select the two-step RA procedure to perform the selected RA-based SDT, for example, if the measured RSRP value is higher than an RA type selection threshold value. The wireless may determine/select the four-step RA procedure to perform the selected RA-based SDT, for example, if the measured RSRP value is lower than or equal to the RA type selection threshold value. The wireless device may receive system information (e.g., a broadcast message) and/or an RRC message (e.g., a wireless device dedicated message, an RRC release message) that indicate the RA type selection threshold value.

The wireless device may determine/select the normal RA procedure among the CG-based SDT, the RA-based SDT, and/or the normal RA procedure, for example, if at least one of the CG-based SDT selection conditions(s) are not met and/or if at least one of the RA-based SDT selection conditions(s) is not met. The wireless device may further determine/select whether to perform the selected normal RA procedure using the four-step RA procedure (e.g., as shown in FIG. 18A) or the two-step RA procedure (e.g., as shown in FIG. 18B). The wireless device may use the measured RSRP value to determine whether to perform the selected normal RA procedure using the four-step RA procedure or the two-step RA procedure. The wireless may determine/select the two-step RA procedure to perform the selected normal RA procedure, for example, if the measured RSRP value is higher than an RA type selection threshold value. The wireless may determine/select the four-step RA procedure to perform the selected normal RA procedure, for example, if the measured RSRP value is lower than or equal to the RA type selection threshold value. The wireless device may receive system information (e.g., a broadcast message) and/or an RRC message (e.g., a wireless device dedicated message, an RRC release message) that indicate the RA type selection threshold value.

A wireless device may determine/select an uplink carrier of a cell. The wireless device may determine/select the uplink carrier among an NUL carrier of the cell and an SUL carrier of the cell. The wireless device may determine/select the uplink carrier, for example, before the wireless device selects one of RA-based SDT, CG-based SDT, and/or a normal RA procedure. The cell may comprise a downlink carrier and at least two uplink carriers (e.g., comprising NUL and SUL carriers). The downlink carrier and the at least two uplink carriers may be configured with a same cell indicator/identity (e.g., cell ID and/or physical cell identity). The uplink transmission (e.g., a PUSCH transmission, a PUCCH transmission, and/or an SRS transmission) may be associated with the downlink carrier. The wireless device may measure a pathloss of transmit power of the uplink transmission using a downlink reference signal received via the downlink carrier of the cell. The wireless device may select, on the selected uplink carrier (e.g., NUL carrier or SUL carrier) of the cell, one of RA-based SDT, CG-based SDT, and/or a normal RA procedure. The wireless device may use a measured RSRP value to select the uplink carrier of the cell. The wireless device may select the NUL carrier, for example, if the measured RSRP value is higher than an uplink carrier selection threshold value. The wireless device may select the SUL carrier, for example, if the measured RSRP value is smaller than or equal to the uplink carrier selection threshold value. The wireless device may receive system information (e.g., a broadcast message) and/or an RRC message (e.g., a wireless device dedicated message, RRC release message) that indicate the uplink carrier selection threshold value.

The wireless device may receive configuration parameters of the CG-based SDT of the selected uplink carrier (e.g., NUL carrier or SUL carrier). The wireless device may receive configuration parameters of the RA-based SDT of the selected uplink carrier (e.g., NUL carrier or SUL carrier). The wireless device may receive configuration parameters of the normal RA procedure of the selected uplink carrier (e.g., NUL carrier or SUL carrier). The wireless device may or may not receive configuration parameters of at least one of the CG-based SDT, the RA-based SDT, and/or the normal RA procedure. The wireless device may exclude the at least one from selection of a transmission type (e.g., CG-based SDT, RA-based SDT, and/or the normal RA procedure) to send/transmit data. The wireless device may select, as a transmission type to send/transmit the data (e.g., based on the RA-based SDT selection condition(s)), one of the RA-based SDT and the normal RA procedure, for example, if the wireless device does not receive configuration parameters of the CG-based SDT. The wireless device may select, as a transmission type to transmit the data (e.g., based on the CG-based SDT selection condition(s)), one of the CG-based SDT and the normal RA procedure, for example, if the wireless device does not receive configuration parameters of the RA-based SDT. The wireless device may select, as a transmission type to transmit the data, the normal RA procedure, for example, if the wireless device does not receive configuration parameters of the CG-based SDT and the RA-based SDT.

Figure 24:
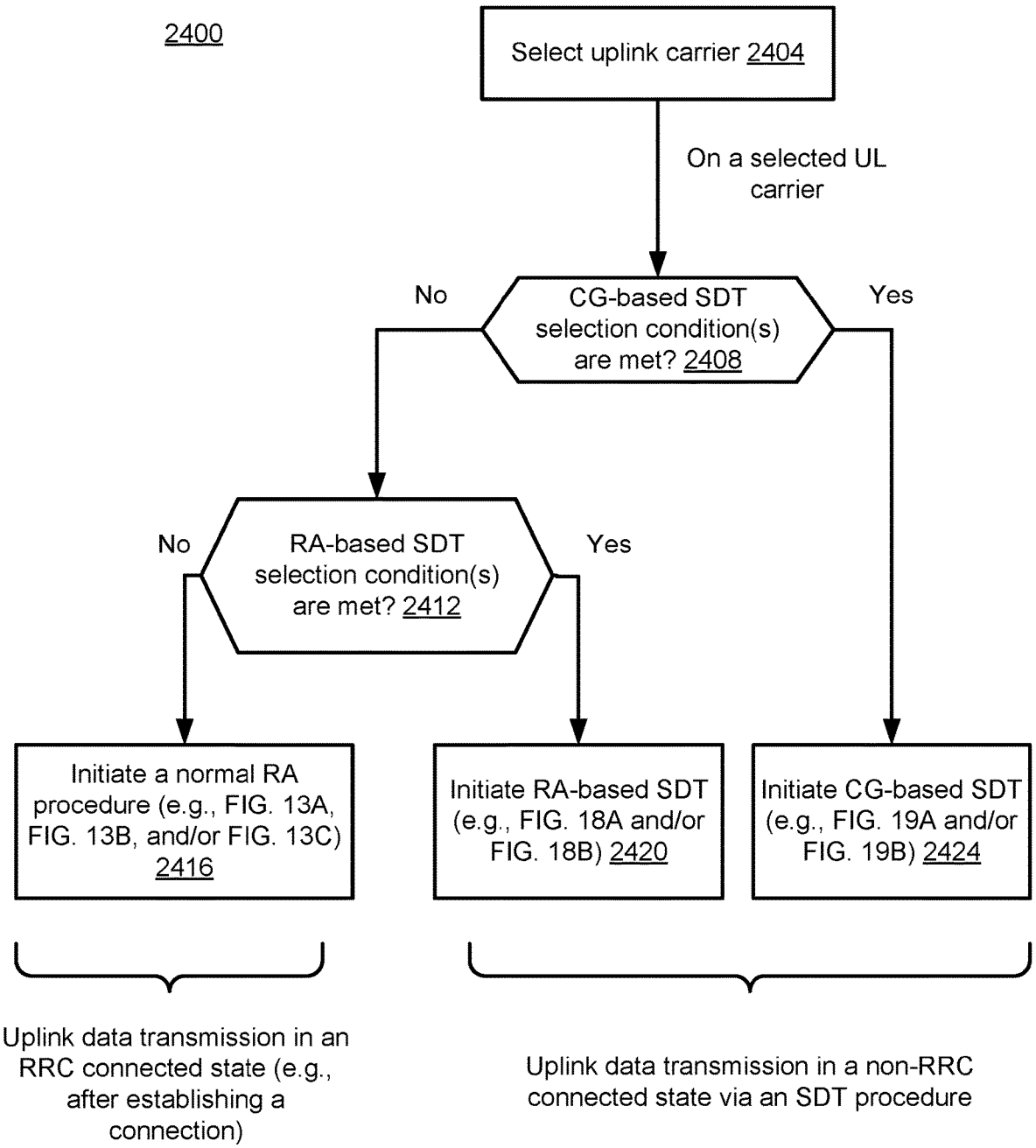
FIG. 24 shows an example procedure for selection of a transmission type for an SDT procedure.

FIG. 24 shows an example procedure for selection of a transmission type for an SDT procedure. The example procedure 2400 of FIG. 24 may be performed by a wireless device. The wireless device may be in communication with a base station.

The wireless device may have (e.g., stored in a buffer), during a non-RRC connected state, data (e.g., uplink data arrival) to send/transmit. The wireless device may be in a cell. The wireless device may determine/select the cell using a cell (re-)selection procedure. The wireless device may camp on the cell, for example, to receive/avail one or more service(s) from a network during the non-RRC connected state. The wireless device may determine one of transmission types based on which the wireless device may send/transmit the data. The transmission types may comprise a CG-based SDT, in which the wireless device may send an initial transmission of the CG-based SDT and/or one or more subsequent transmissions of the CG-based SDT. The transmission types may comprise an RA-based SDT, in which the wireless device may send an initial transmission of the RA-based SDT and/or one or more subsequent transmissions of the RA-based SDT. The wireless device may send/transmit the data using an SDT procedure during a time period in which the wireless device may keep the RRC state as the non-RRC connected state. The wireless device may keep the RRC state as the non-RRC connected state, for example, if the wireless device selects the transmission type as the CG-based SDT and/or the RA-based SDT. The transmission types may comprise a normal RA procedure. The wireless device may transition to an RRC connected state and send/transmit the data using the normal RA procedure, for example, if the wireless device selects the normal RA procedure.

The wireless device may determine an uplink carrier of the cell (e.g., step 2404). The wireless device may determine the uplink carrier of the cell, for example, if the cell comprises an NUL carrier and an SUL carrier. The wireless device may skip the determination of the uplink carrier, for example, if the cell comprises a single uplink carrier (e.g., an NUL carrier or an SUL carrier). The wireless device may determine/select the uplink carrier based on a measured RSRP value and/or an uplink carrier selection threshold value. The wireless device may determine the measured RSRP value by measuring signal strengths and/or received signal power of one or more downlink RSs (e.g., SSBs and/or CSI-RS) of the cell. The wireless device may determine the NUL carrier as the uplink carrier, for example, if the measured RSRP value is higher than the uplink carrier selection threshold value. The wireless device may determine the SUL carrier as the uplink carrier, for example, if the measured RSRP value is lower than or equal to the uplink carrier selection threshold value.

The wireless device may determine one of the transmission types on a selected uplink carrier of the cell. The wireless device may send/transmit the data (e.g., to a base station) using the determined one of the transmission types. The base station (e.g., associated with the cell) may receive the data.

The wireless device may determine whether the wireless device may transmit the data using the CG-based SDT. For example, the wireless device may determine if at least one (e.g., all) of the CG-based SDT selection condition(s) are met (e.g., step 2408). The wireless device may skip determining whether to transmit the data using the CG-based SDT, for example, if the wireless device does not receive configuration parameters of the CG-based SDT on the selected uplink carrier of the cell. The wireless device may determine whether to transmit the data using the RA-based SDT (e.g., step 2412), for example, if the wireless device does not receive configuration parameters of the CG-based SDT on the selected uplink carrier of the cell. The wireless device may determine to transmit the data using the CG-based SDT, for example, based on at least one (e.g., all) of the CG-based SDT selection condition(s) being met (e.g., if at least one of the CG-based selection condition(s) are met/satisfied). The wireless device may initiate an SDT procedure using the CG-based SDT (e.g., step 2424), for example, based on (e.g., after and/or in response to) determining to transmit the data using the CG-based SDT. The wireless device may perform one or more subsequent transmissions of the CG-based SDT, for example, based on (e.g., after and/or in response to) performing the CG-based SDT (e.g., an initial transmission of the CG-based SDT).

The wireless device may determine not to use the CG-based SDT, for example, based on one or more (e.g., at least one) of the CG-based SDT selection condition(s) not being met (e.g., if at least one of the CG-based selection condition(s) are not met/satisfied). The wireless device may determine whether to transmit the data using the RA-based SDT, for example, if the wireless device does not determine/select the CG-based SDT (e.g., because the one or more of the CG-based SDT selection condition(s) are not met and/or because configuration parameters of the CG-based SDT have not been received). For example, the wireless device may determine if at least one (e.g., all) of the RA-based SDT selection condition(s) are met (e.g., step 2412). The wireless device may determine to transmit the data using the RA-based SDT, for example, based on at least one (e.g., all) of the RA-based SDT selection condition(s) being met (e.g., if at least one of the RA-based selection condition(s) are met/satisfied). The wireless device may initiate an SDT procedure using the RA-based SDT (e.g., step 2420), for example, based on (e.g., after and/or in response to) determining to transmit the data using the RA-based SDT. The wireless device may perform one or more subsequent transmissions of the RA-based SDT, for example, based on (e.g., after and/or in response to) performing the RA-based SDT (e.g., an initial transmission of the RA-based SDT).

The wireless device may determine to initiate/use the normal RA procedure (e.g., step 2416), for example, if one or more (e.g., at least one) of the RA-based SDT selection condition(s) are not met and/or if the wireless device may not determine/select the CG-based SDT. The wireless device may determine use the normal RA procedure, for example, if the wireless device does not receive configuration parameters of the RA-based SDT of the selected uplink carrier and/or if the wireless device does not determine/select the CG-based SDT. The wireless device may initiate the normal RA procedure (e.g., as shown in FIG. 13A, FIG. 13B, and/or FIG. 13C), for example, based on (e.g., after and/or in response to) determining to select the normal RA procedure. The wireless device may not transmit the data (during a time period in which the wireless device performs the normal RA procedure), for example, via PUSCH of Msg 3 and/or via PUSCH of Msg A. The wireless device may transmit an Msg 3 and/or Msg A comprising an RRC connection request (e.g., RRC resume request, RRC setup request, RRC connection (re-)establishment request) during the normal RA procedure. The wireless device may transition to the RRC connected state, for example, based on (e.g., after and/or in response to) determining that the normal RA procedure is successfully completed. The wireless device may transmit the data, during the RRC connected state, via an uplink grant received during the RRC connected state. Selection of the RA-based SDT and/or CG-based SDT may comprise performing one or more subsequent transmissions, for example, in accordance with examples described herein (e.g., as shown in FIG. 21, FIG. 22A, FIG. 22B, and/or FIG. 23). The wireless device and/or the base station may apply/use any of the procedures described with respect to FIGS. 17-23.

A wireless device may initiate an SDT procedure based on (e.g., after and/or in response to) transmitting an SDT (e.g., CG-based SDT and/or RA-based SDT). The wireless device may start an SDT failure detection timer, for example, based on (e.g., after and/or in response to) initiating the SDT procedure. The SDT failure detection timer may be different from the time window as described with respect to FIG. 22A and/or FIG. 22B. The wireless device may receive a first timer value of the SDT failure detection timer and/or a second timer value of the time window. The timer window may be for monitoring a downlink channel (e.g., a PDCCH). The wireless device may monitor the PDCCH during a time period in which the time window is running. The wireless device may send/transmit a signal (e.g., uplink data via PUSCH, UCI via PUCCH, and/or SRS via SRS resources) during a time period in which the the time window is not running (e.g., stops, has stopped, expires, and/or has expired). A physical layer of the wireless device may manage (e.g., (re-)start, stop, and/or determine an expiration of) the time window. The SDT failure detection timer may be used to determine whether the wireless device may perform the SDT procedure. The wireless device may perform uplink transmission(s) (e.g., a PUSCH transmission, a PUCCH transmission, and/or an SRS transmission), PDCCH monitoring, and/or downlink reception(s) (e.g., via PDSCH and/or PDCCH) during a time period in which the SDT failure detection timer is running. The uplink transmission(s), the PDCCH monitoring, and/or the downlink reception(s) may comprise an SDT, one or more subsequent transmissions of the SDT, the PDCCH monitoring triggered based on/in response to the SDT and/or the one or more subsequent transmissions.

An RRC layer of the wireless device may manage (e.g., (re-)start, stop, determine an expiration of) the SDT failure detection timer. The SDT failure detection timer may run during the SDT procedure. The wireless device may stop the SDT failure detection timer, for example, based on (e.g., after and/or in response to) a response to an RRC message (e.g., CCCH) transmitted via the SDT. The response may comprise an RRC release message, an RRC resume message, an RRC setup message, and/or an RRC reconfiguration message. The wireless device may stop the SDT procedure, for example, based on (e.g., after and/or in response to) an expiry of the SDT failure detection timer. The wireless device may determine a failure of the SDT procedure, for example, based on (e.g., after and/or in response to) the expiry of the SDT failure detection timer. The wireless device may stop the time window (e.g., if running), for example, based on (e.g., after and/or in response to) stopping and/or expiring the SDT failure detection timer. The wireless device may not stop the SDT failure detection timer (e.g., if running), for example, based on (e.g., after and/or in response to) stopping and/or expiring the time window. The wireless device may not start and/or may not run the SDT procedure, for example, if the SDT failure detection timer is not running (e.g., stops, has stopped, expires, and/or has expires). The time window may run during a time period in which the SDT failure detection timer is running. The time window may not run during a time period in which the SDT failure detection timer is running.

A wireless device may perform an SDT procedure. The wireless device may have data for transmission (e.g., new data arrival) during the SDT procedure. The wireless device may have the data (e.g., new data arrival), for example, after the SDT failure detection timer starts and/or during a time period in which the SDT failure detection timer is running. The wireless device may initiate, for example, based on/in response to the data (e.g., the new data arrival), a buffer status reporting procedure during the SDT procedure. The wireless device may trigger one or more buffer status reports (BSRs) (e.g., a regular BSR, a padding BSR, a periodic BSR, etc.) using the BSR procedure. The wireless device may trigger a BSR (e.g., a regular BSR), for example, based on/in response to data arrival (e.g., data becoming available to the MAC entity of the wireless device) during the SDT procedure. The data may be from/correspond to a particular logical channel (LC) which belongs to a particular LC group (LCG). The data may belong/correspond to a logical channel with higher priority than the priority of one or more logical channels (e.g., configured for the SDT procedure) corresponding to available uplink data. The wireless device may have the data becoming available, for example, when none of the logical channel(s) which belong to the LCG comprises uplink data (e.g., any available uplink data). The wireless device may trigger a BSR (e.g., a padding BSR), for example, if uplink radio resource(s) are allocated and number/quantity of padding bits is equal to or larger than a sum of the size of the BSR MAC CE and a subheader of the BSR MAC CE. The wireless device may trigger a BSR (e.g., a regular BSR), for example, if a BSR retransmission timer expires and/or if at least one of the logical channels, which belong to an LCG, comprises uplink data. The wireless device may trigger a BSR (e.g., a periodic BSR), e.g., in response to an expiry of a BSR periodic timer.

The wireless device may trigger an SR. The triggering the SR may be based on/in response to a determination that at least one BSR has been triggered and/or not cancelled. The triggering the SR may be further based on/in response to no uplink radio resource (e.g., no UL-SCH resource) being available for a transmission of the data arriving during the SDT procedure. The triggering the SR may be further based on/in response to the BSR (e.g., regular BS) being triggered for a logical channel. Configuration parameter(s) (e.g., higher layer parameter logicalChannelSR-Mask may be set to false) of the logical channel may indicate that the wireless device is allowed to trigger the SR if the wireless device is configured with (pre-) configured uplink grant(s) (e.g., a (pre-)configured grant type 1 and/or a (pre-)configured grant type 2).

The wireless device may trigger an SR based on/in response to triggering the BSR. The wireless device may or may not receive configuration parameters (e.g., higher layer parameters SchedulingRequestConfig information element (IE) and/or SchedulingRequestResourceConfig IE) of SR, for example, for the SDT procedure. A network may not transmit, to the wireless device, the configuration parameters, for example, if the network does not allow transmission of the SR during the SDT procedure and/or in a non-RRC connected state.

The wireless device may initiate an RA procedure during the SDT procedure. The wireless device may send/transmit, via the RA procedure (e.g., via Msg 3 and/or Msg A), an indication of a radio resource request and/or a buffer status (e.g., BSR) of the wireless device. The indication may be a MAC CE comprising an identity of the wireless device (e.g., C-RNTI MAC CE) and/or a BSR MAC CE.

The wireless device may initiate the RA procedure, for example, if at least one SR is triggered (and/or is pending and/or is not cancelled), and/or if no valid PUCCH resource configured for the triggered (and/or pending and/or not cancelled) SR is available or configured (e.g., the wireless device does not receive SchedulingRequestConfig IE and/or SchedulingRequestResourceConfig IE). The wireless device may trigger a BSR during the SDT procedure, for example, in accordance with the various examples described herein. The triggered BSR may trigger an SR, for example, in accordance with the various examples described herein. The wireless device may initiate the RA procedure, for example, if the SR is triggered (and/or is pending and/or is not cancelled), and/or if no valid PUCCH resource configured for the triggered (and/or pending and/or not cancelled) SR is available or configured (e.g., the wireless device does not receive SchedulingRequestConfig IE and/or SchedulingRequestResourceConfig IE).

The wireless device may initiate, based on a triggered BSR, the RA procedure during the SDT procedure. The triggered BSR may initiate the RA procedure, for example, if the wireless device does not receive configuration parameters (e.g., the wireless device does not receive SchedulingRequestConfig IE and/or SchedulingRequestResourceConfig IE) of SR and/or if no valid PUCCH resource configured for the triggered (and/or pending and/or not cancelled) SR is available or configured.

The initiating the RA procedure may be based on/in response to a determination that at least one BSR has been triggered and/or not cancelled. The initiating the RA procedure may be further based on/in response to no uplink radio resource (e.g., no UL-SCH resource) being available for a transmission of the data arriving during the SDT procedure. The initiating the RA procedure may be further based on/in response to the BSR (e.g., regular BS) being triggered for a logical channel for which configuration parameter(s) (e.g., higher layer parameter logicalChannelSR-Mask is set to false) indicate that the wireless device is allowed to trigger the SR if the wireless device is configured with (pre-) configured uplink grant(s) (e.g., a (pre-) configured grant type 1 and/or a (pre-)configured grant type 2). The initiating the RA procedure may be further based on/in response to the BSR (e.g., regular BS) being triggered for a logical channel for which configuration parameter(s) (e.g., higher layer parameter logicalChannelSR-Mask is set to true) indicate that the wireless device is not allowed to trigger the SR if the wireless device is configured with (pre-)configured uplink grant(s) (e.g., a (pre-) configured grant type 1 and/or a (pre-)configured grant type 2). The initiating the RA procedure may be further based on/in response to the BSR (e.g., regular BS) being triggered for a logical channel for which configuration parameter(s) (e.g., higher layer parameter logicalChannelRA-Mask is set to false) indicate that the wireless device is allowed to initiate the RA procedure if the wireless device is configured with (pre-)configured uplink grant(s) (e.g., a (pre-)configured grant type 1 and/or a (pre-)configured grant type 2).

A wireless device may perform transmissions and/or reception (e.g., using an SDT procedure).

The wireless device may perform the transmissions and/or receptions during a time period in which the wireless device is in a non-connected state (e.g., an idle state and/or an inactive state) with respect to a network. The wireless device may perform an RA procedure, for example, in a non-connected state (e.g., and during an SDT procedure). The wireless device may perform the RA procedure, for example, to indicate a buffer status, to indicate a new data arrival, to send a BSR, to send a radio resource request, etc. The RA procedure may be initiated based on (e.g., after and/or in response to) arrival of new data for transmission (e.g., at a buffer), a triggered BSR and/or triggered SR. In some scenarios, the wireless device may determine conditions that may not be suitable for continuation of the SDT procedure or a current transmission type of the SDT procedure. For example, the wireless device may measure a low RSRP and/or may have a large amount of data in a buffer for transmission. It may not be efficient to perform and/or to continue the SDT procedure (e.g., after and/or in response to) the RA procedure, for example, because of the low RSRP and large data volume. For example, the measured RSRP value may be low (e.g., lower than or equal to the RSRP threshold value) and/or a size of the data in the buffer may be large (e.g., larger than the data volume threshold value). The low RSRP may result in a poor connection to a base station, which may result retransmissions of uplink and/or downlink transmissions. Retransmissions may cause a large power consumption of the wireless device. The SDT procedure may also be inefficient for large data transmissions (e.g., because SDT procedure uses small data bursts for transmission with low resource overhead). The RRC connected state may be more suitable for the wireless device for large data transmission. For example, the wireless device may use one or more functions that are enabled in the RRC connected state (e.g., SR procedure, PDCP duplication, carrier aggregation, dual-connectivity, and/or the like), but disabled in the non-RRC connected state, to facilitate the large data transmission.

Various examples herein may enable flexible selection of a transmission type within/during an ongoing communication procedure. For example, various examples herein may enable selection of a transmission type (e.g., CG-based SDT, RA-based SDT, and/or the normal RA procedure) within/during an ongoing procedure (e.g., SDT procedure). The procedure may be performed during a time period in which a wireless device is not connected to a network. Various examples herein may enable the wireless device to stop an ongoing SDT procedure, for example, based on initiating an RA procedure (e.g., based on/in response to triggering a BSR, triggering a SR, arrival of new data for transmission, etc.) within/during the ongoing SDT procedure. The wireless device may change a transmission type, for example, based on stopping an ongoing SDT procedure. For example, the wireless device may (re-)select an uplink carrier, may switch to a different SDT procedure (e.g., switch from a CG-based SDT to an RA-based SDT, or vice-versa), and/or may initiate an RA procedure to transition to an RRC connected state. Selection of a transmission type within/during the SDT procedure may be based on one or more conditions (e.g., RSRP, data volume, etc.). For example, a wireless device may initiate a normal RA procedure (e.g., during an SDT procedure) and transition to an RRC connected state if the wireless device has a low RSRP and/or needs to perform large data transmission.

Various examples herein may enable the wireless device to apply/use different conditions for selection of a transmission type for initiating the SDP procedure and during the initiated SDP procedure. The wireless device may select a first transmission type based on one or more first conditions being satisfied, for example, if the selecting the first transmission type is based on/in response to initiating (e.g., occurs to initiate) the SDP procedure. The wireless device may select a second transmission type based on one or more second conditions being satisfied, for example, if the selecting the second transmission type occurs during an ongoing SDT procedure. The one or more first conditions and the one or more second conditions may or may not share one or more common conditions. The one or more first conditions may comprise the one or more second conditions and one or more fourth conditions. The one or more second conditions may comprise the one or more first conditions and one or more fifth conditions.

Various examples described herein may enable the wireless device to (e.g., based on a measured RSRP, a transmission data size/volume, other channel conditions, and/or transmission criteria) to (re-)select an uplink carrier and/or (re-)select a transmission type (e.g., one of RA-based SDT, CG-based SDT, and/or a normal RA procedure). Enabling (re-)selection of a transmission type within an SDT procedure may reduce retransmission of uplink and/or downlink transmissions and reduce a power consumption of the wireless device. Various examples herein may allow efficient transitioning to an RRC connected state (e.g., using a normal RA procedure). Transitioning to an RRC connected state may enable selection of one or more functions (e.g., SR procedure, PDCP duplication, carrier aggregation, dual-connectivity, and/or the like) that may facilitate large data transmission.

A wireless device may perform an uplink carrier selection (e.g., among the NUL carrier and/or the SUL carrier) and/or determine/select a transmission type (e.g., one of RA-based SDT, CG-based SDT, and/or a normal RA procedure), for example, during an SDT procedure (e.g., during a time period in which an SDT failure detection timer is running and/or after an SDT of the SDT procedure). The wireless device may perform the uplink carrier selection and/or determine/select the transmission type, for example, if the wireless device has data (e.g., from DTCH and/or DCCH) available (e.g., arriving) during the SDT procedure in a non-RRC connected state, and/or if no uplink resource (e.g., PUSCH to transmit the data and/or PUCCH to transmit an SR to indicate a request a radio resource to transmit the data) for the data is available during the SDT procedure.

The wireless device may initiate the SDT procedure. The wireless device may start the SDT failure detection timer, for example, based on (e.g., after and/or in response to) initiating the SDT procedure. The wireless device may perform a first uplink carrier selection (e.g., among the NUL carrier and/or the SUL carrier) and/or a first selection of one of RA-based SDT, CG-based SDT, and/or a normal RA procedure according to example embodiments of the present disclosure (e.g., as described with reference to FIG. 24), for example, based on initiating the SDT procedure. The wireless device may determine/select an RA-based SDT or CG-based SDT as an initial transmission (e.g., as described with reference to FIG. 23) of the SDT procedure. The wireless device may send/transmit first data using the RA-based SDT or CG-based SDT during the SDT procedure.

The wireless device may have second data for transmission during the SDT procedure. The second data may be remaining data in a buffer after the first data transmitted using the RA-based SDT or the CG-based SDT. The second data may correspond to new data arrival in the buffer during the SDT procedure (e.g., after the first data is transmitted using the RA-based SDT or the CG-based SDT). The wireless device may not receive an uplink grant via which the wireless device may be able to transmit the second data during the SDT procedure. For example, no uplink resource for the second data (e.g., PUSCH to transmit the second data and/or PUCCH to transmit an SR to indicate a request a radio resource to transmit the second data) may be available during the SDT procedure and/or after the first data is transmitted using the RA-based SDT or the CG-based SDT. The wireless device may perform (e.g., for the second data) a second uplink carrier selection (e.g., among the NUL carrier and/or the SUL carrier) and/or a second selection of one of RA-based SDT, CG-based SDT, and/or a normal RA procedure. The wireless device may perform the second uplink carrier selection and/or the second selection of the one of RA-based SDT, CG-based SDT, and/or a normal RA procedure, for example, based on/in response to no uplink resource for the second data being available during the SDT procedure and/or after the first data is transmitted using the RA-based SDT or the CG-based SDT. The wireless device may perform the second uplink carrier selection and/or the second selection of the one of RA-based SDT, CG-based SDT, and/or a normal RA procedure, for example, based on/in response to a BSR being triggered based on the second data. The wireless device may perform the second uplink carrier selection and/or the second selection of the one of RA-based SDT, CG-based SDT, and/or a normal RA procedure, for example, based on/in response to a triggered SR (e.g., which may be triggered based on a BSR triggered based on the second data). The wireless device may perform the second uplink carrier selection and/or the second selection of the one, for example, based on/in response to initiating an RA procedure by the triggered SR and/or no PUCCH resource being configured for the triggered (and/or pending) SR.

The wireless device may switch to a second uplink carrier (e.g., selected via the second uplink carrier selection) from a first uplink carrier (e.g., selected by the first uplink carrier selection). The wireless device may select, as the second uplink carrier, the same uplink carrier as the one selected via the first uplink carrier selection.

The wireless device may determine/select a normal RA procedure via the second selection of the one of the RA-based SDT, the CG-based SDT, and/or the normal RA procedure. The wireless device may stop and/or cancel the SDT procedure, for example, based on/in response to selecting the normal RA procedure. The wireless device may perform the normal RA procedure, for example, based on the selecting the normal RA procedure. The wireless device may not send/transmit the second data during the normal RA procedure. The wireless device may transition to an RRC connected state, for example, based on/in response to determining that the normal RA procedure has been successfully completing. The wireless device may receive an uplink grant for the second data in the RRC connected state, for example, based on (e.g., after and/or in response to) transitioning to the RRC connected state.

Figure 25:
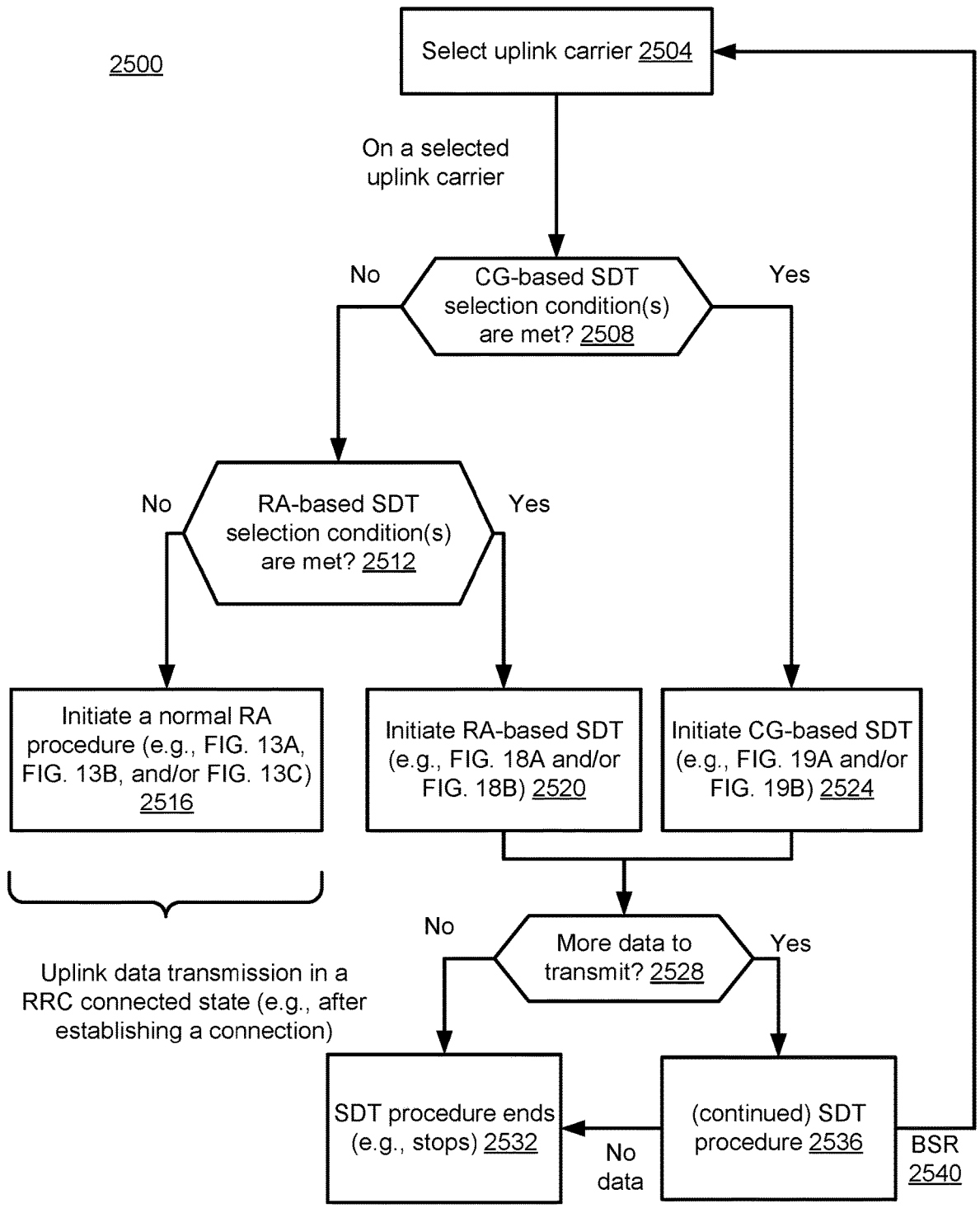
FIG. 25 shows an example procedure for a (re-)selection of a transmission type for an SDT procedure.

FIG. 25 shows an example procedure for (re-)selection of a transmission type for an SDT procedure. A wireless device may perform an example procedure 2500 which incorporates (re-selection of a transmission type by the wireless device. The example procedure 2500 may enable switching between an RA-based SDT and a CG-based SDT and may be advantageously used in scenarios where the wireless device is in motion and subject to different channel conditions (e.g., different RSRPs).

The wireless device may have (e.g., in a buffer), during a non-RRC connected state, first data (e.g., based on arrival of uplink data at the buffer) to send/transmit. The wireless device may initiate the SDT procedure to transmit the first data in the non-RRC connected state. The wireless device may follow the procedure 2400 for a selection of a transmission type for an SDT procedure as described with respect to FIG. 24. For example, steps 2504, 2508, 2512, 2516, 2520, and 2524 of FIG. 25 may be similar, or substantially similar, to steps 2404, 2408, 2412, 2416, 2420, and 2424 as described with respect to FIG. 24. At step 2504, the wireless device may determine/select an uplink carrier of a cell (e.g., among an NUL carrier and/or an SUL carrier). The wireless device may select (e.g., based on the RA-based SDT selection condition(s) and/or CG-based SDT selection condition(s)) an SDT procedure (e.g., one of the RA-based SDT or the CG-based SDT, steps 2508, 2512, 2520, and/or 2524). The wireless device may initiate the one of the RA-based SDT or the CG-based SDT on the selected uplink carrier. The wireless device may start an SDT failure detection timer, for example, based on/in response to initiating the SDT procedure. The wireless device may send/transmit, via an SDT resource, an RRC message (e.g., RRC resume, RRC, early data transmission, RRC setup, and/or the like), for example, based on/in response to initiating the SDT procedure. The wireless device may send/transmit the first data and the RRC message via the SDT resource. The wireless device may start an SDT failure detection timer, for example, based on/in response to transmitting the RRC message.

At step 2528, the wireless device may determine if there is additional data (e.g., in a buffer) to transmit (e.g., following the transmission of the first data). The wireless device may have no more data to transmit, for example, during the SDT procedure and/or based on/after transmitting the first data. The wireless device may stop (e.g., end) the SDT procedure, for example, if the wireless device determines that there is no more data to transmit during the SDT procedure (e.g., step 2532). The wireless device may receive an RRC release message during the SDT procedure. The wireless device may stop the SDT procedure, for example, based on/in response to receiving the RRC release message.

The wireless device may have more data to transmit during the SDT procedure (e.g., during a time period in which the SDT failure detection timer is running) The wireless device may have more data to transmit, for example, after transmitting the first data and/or the RRC message. At step 2528, the wireless device may determine that there is additional data to transmit (e.g., following the transmission of the first data). For example, the wireless device may have second data during the SDT procedure. The second data may be remaining data in a buffer, for example, after the first data is transmitted using the RA-based SDT (e.g., at step 2520) or the CG-based SDT (e.g., at step 2524). The second data may be new data that arrives during the SDT procedure, for example, after transmitting the first data using the RA-based SDT or the CG-based SDT. The wireless device may continue the SDT procedure, for example, if there is remaining data (e.g., the second data) in a buffer (e.g., step 2536).

The wireless device may trigger, during the SDT procedure, one or more BSRs using the BSR procedure. The wireless device may trigger a BSR, for example, based on determining that there is additional data to transmit. The wireless device may trigger a BSR (e.g., referred to as a regular BSR), for example, based on/in response to the arrival of second data (e.g., second data becoming available to the MAC entity of the wireless device, second data being stored in the buffer) during the SDT procedure. The second data may be from a particular logical channel (LC) which belongs to a particular LCG. The second data may belong to a logical channel with higher priority than the priority of one or more logical channels (e.g., configured for the SDT procedure). The one or more logical channels may comprise available uplink data belonging to one or more LCGs (e.g., configured for the SDT procedure). The wireless device may have the second data becoming available, for example, when none of the logical channel(s) which belong to the LCG comprises uplink data (e.g., any available uplink data). The wireless device may trigger a BSR (e.g., a padding BSR), for example, if uplink radio resource(s) are allocated and a quantity of padding bits is equal to or larger than a sum of the size of the BSR MAC CE and a subheader of the BSR MAC CE. The wireless device may trigger a BSR (e.g., a regular BSR), for example, if a BSR retransmission timer expires and/or if at least one of the logical channels, which belong to an LCG, comprises uplink data (e.g., the second data). The wireless device may trigger a BSR (e.g., a periodic BSR), for example, based on/in response to an expiry of a BSR periodic timer.

The wireless device may trigger and/or have triggered a BSR (e.g., BSR 2540) based on the second data. The wireless device may or may not receive an uplink grant via which the wireless device may send/transmit the second data during the SDT procedure. The wireless device may determine to initiate an RA procedure based on the BSR (e.g., triggered based on the second data). The wireless device may determine to initiate the RA procedure, during the SDT procedure, based on the BSR, for example, if the wireless device does not receive an uplink grant for the second data. The wireless device may determine to initiate an RA procedure, for example, based on/in response to an SR (e.g., triggered based on/in response to the BSR).

The wireless device may restart the selection procedures as shown in FIG. 24 and/or FIG. 25, for example, based on (e.g., after or in response to) the RA procedure initiated based on the BSR. The wireless device may restart the selection procedures during the SDT procedure. The wireless device may determine an uplink carrier of the cell, for example, if the cell comprises a NUL carrier and a SUL carrier (e.g., step 2504). The wireless device may skip the determination of the uplink carrier, for example, if the cell comprises a single uplink carrier. The wireless device may determine/select the uplink carrier based on a measured RSRP value and/or an uplink carrier selection threshold value. A first carrier selected for the initial SDT procedure may be different from a second carrier selected based on the BSR. For example, the wireless device may initiate the SDT procedure from a first carrier. The wireless device may switch, based on the measured RSRP value, from the first uplink carrier (e.g., selected for the initial SDT) to a second uplink carrier (e.g., selected during the SDT procedure started with the initial SDT). The wireless device may select, as the second uplink carrier, the same uplink carrier as the one selected for the initial SDT.

The wireless device may determine one of the transmission types on the uplink carrier selected during the SDT procedure. The wireless device may determine whether the wireless device sends/transmits the second data using the CG-based SDT (e.g., at step 2508). The wireless device may skip the determination of whether the data is to be transmitted using the CG-based SDT, for example, if the wireless device does not receive configuration parameters of the CG-based SDT on the selected uplink carrier of the cell. The wireless device may determine whether to transmit the second data using the RA-based SDT (e.g., step 2512). The wireless device may determine whether to transmit the second data using the RA-based SDT, for example, if the wireless device does not receive configuration parameters of the CG-based SDT on the selected uplink carrier of the cell. The wireless device may determine to transmit the second data using the CG-based SDT (e.g., step 2524), for example, if at least one (e.g., or all) of the CG-based SDT selection condition(s) is met. The wireless device may initiate an SDT procedure using the CG-based SDT (e.g., step 2524), for example, based on (e.g., after and/or in response to) determining to transmit the second data using the CG-based SDT. The wireless device may perform one or more subsequent transmissions of the CG-based SDT, for example, based on (e.g., after and/or in response to) performing the CG-based SDT. The wireless device may determine not to use the CG-based SDT, for example, if one or more (e.g., at least one) of the CG-based SDT selection condition(s) are not met.

The wireless device may determine (e.g., at step 2512) whether to transmit the second data using the RA-based SDT. The wireless device may determine whether to transmit the second data using the RA-based SDT, for example, if the wireless device does not determine/select the CG-based SDT (e.g., due to the one or more of the CG-based SDT selection condition(s) being not met and/or due to configuration parameters of the CG-based SDT not being received and/or configured). The wireless device may determine to send/transmit the second data using the RA-based SDT (e.g. step 2520), for example, if at least one (e.g., or all) of the RA-based SDT selection condition(s) is met. The wireless device may initiate an SDT procedure using the RA-based SDT, for example, based on (e.g., after and/or in response to) determining to transmit the second data using the RA-based SDT. The wireless device may perform one or more subsequent transmissions of the RA-based SDT, for example, based on (e.g., after and/or in response to) performing the RA-based SDT. The wireless device may multiplex a message (e.g., a MAC CE) indicating an indicator/identity of the wireless device into a MAC PDU. The message may be a MAC CE comprising the identity. The identity may be C-RNTI of the wireless device. The identity may be an SDT-RNTI (e.g., CS-RNTI, PUR-RNTI, PUR C-RNTI, SDT-RNTI, and/or the like), for example, assigned for the SDT. The wireless device may transmit the MAC PDU (e.g., via an Msg 3 and/or an Msg A transmission) of the RA-based SDT selected during the SDT procedure.

The network (e.g., a base station) may receive the MAC CE. The network may determine whether the wireless device has requested an uplink grant (e.g., for the SDT procedure) or has requested to initiate a new SDT procedure. The network may determine that the wireless device has requested an uplink grant during/for the SDT procedure, for example, if the MAC PDU comprises the identity. The network may determine that the wireless device request to initiate a new SDT procedure, for example, if the MAC PDU comprises an RRC message (e.g., RRC resume request, RRC early data transmission request, RRC SDT request, etc.).

The wireless device may determine to use the normal RA procedure (e.g., step 2516). The wireless device may determine to use the normal RA procedure, for example, if one or more (e.g., at least one) of the RA-based SDT selection condition(s) are not met and/or if the wireless device may not determine/select the CG-based SDT. The wireless device may determine to use the normal RA procedure, for example, if the wireless device does not receive configuration parameters of the RA-based SDT of the selected uplink carrier and/or if the wireless device may not determine/select the CG-based SDT. For example, the wireless device may initiate the normal RA procedure (e.g., as described with respect to FIG. 13A, FIG. 13B, and/or FIG. 13C), for example, based on (e.g., after and/or in response to) determining to select/use the normal RA procedure. The wireless device may determine to cancel the SDT procedure, for example, if the wireless device selects the normal RA procedure. The wireless device may transmit an RRC connection request message (e.g., RRC resume request, RRC setup request, RRC connection (re-)establishment request), for example, if the wireless device selects the normal RA procedure. The wireless device may not transmit the second data while the wireless device performs the normal RA procedure. For example, the wireless device may not transmit the second data via a PUSCH transmission of Msg 3 and/or via a PUSCH transmission of Msg A. The wireless device may (re-)construct Msg 3 or Msg A such that Msg 3 and/or Msg A comprise the RRC connection request message. The RRC connection request message may be for initiating an RRC connection (re-)establishment procedure) The wireless device may transmit an Msg 3 and/or Msg A comprising the RRC connection request during the normal RA procedure. The wireless device may transition to the RRC connected state, for example, based on (e.g., after and/or in response to) determining that the normal RA procedure has successfully completed. The wireless device, in/during the RRC connected state, may receive an uplink grant. The wireless device may transmit the second data, during the RRC connected state, via the uplink grant received during the RRC connected state.

Figure 26:
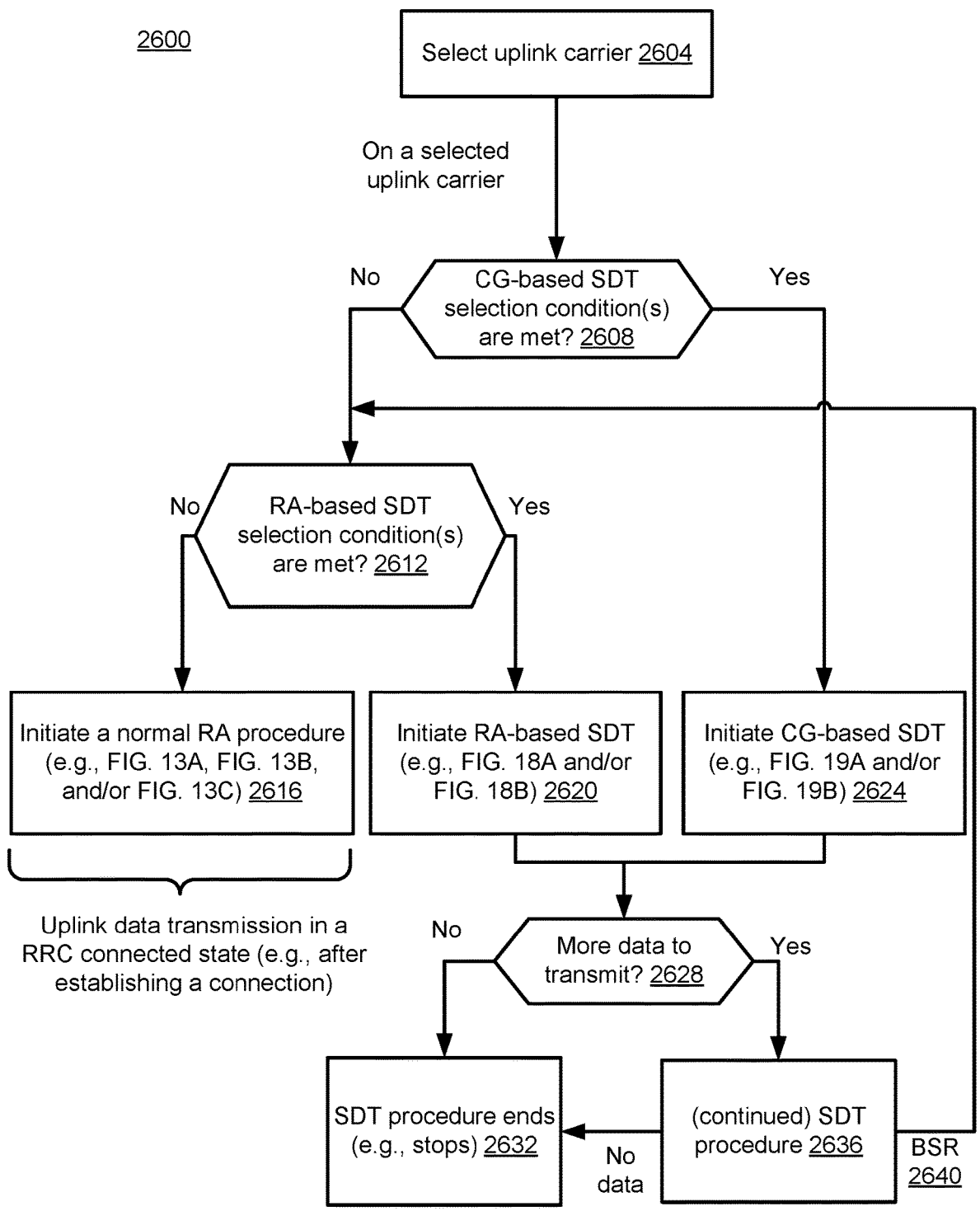
FIG. 26 shows an example procedure for a (re-)selection of a transmission type for an SDT procedure.

FIG. 26 shows an example procedure for (re-)selection of a transmission type for an SDT procedure. A wireless device may perform an example procedure 2600 which incorporates (re-) selection of a transmission type by the wireless device. The example procedure 2600 may enable transitioning to an RRC connected state (e.g., via a normal RA procedure) during an SDT procedure. The example procedure 2600 may be advantageously used in scenarios where the wireless device is less mobile (e.g., subject to low variations in RSRP), but may be subject to variations in uplink data volume.

The wireless device may have (e.g., in a buffer), during a non-RRC connected state, first data (e.g., based on arrival of uplink data at the buffer) to send/transmit. The wireless device may initiate the SDT procedure to transmit the first data in the non-RRC connected state. The wireless device may follow the procedure 2400 for a selection of a transmission type for an SDT procedure as described with respect to FIG. 24. For example, steps 2604, 2608, 2612, 2616, 2620, and 2624 of FIG. 26 may be similar, or substantially similar to steps 2404, 2408, 2412, 2416, 2420, and 2424 as described with respect to FIG. 24. At step 2604, the wireless device may determine/select an uplink carrier of a cell (e.g., among an NUL carrier and/or an SUL carrier). The wireless device may select (e.g., based on the RA-based SDT selection condition(s) and/or CG-based SDT selection condition(s)) an SDT procedure (e.g., one of the RA-based SDT or the CG-based SDT, steps 2608, 2612, 2620, and/or 2624). The wireless device may initiate the one of the RA-based SDT or the CG-based SDT on the selected uplink carrier. The wireless device may start an SDT failure detection timer, for example, based on/in response to initiating the SDT procedure. The wireless device may send/transmit, via an SDT resource, an RRC message (e.g., RRC resume, RRC, early data transmission, RRC setup, and/or the like), for example, based on/in response to initiating the SDT procedure. The wireless device may send/transmit the first data and the RRC message via the SDT resource. The wireless device may start an SDT failure detection timer, for example, based on/in response to transmitting the RRC message.

At step 2628, the wireless device may determine if there is additional data (e.g., in a buffer) to transmit (e.g., following the transmission of the first data). The wireless device may have no more data to transmit, for example, during the SDT procedure and/or based on/after transmitting the first data. The wireless device may stop (e.g., end) the SDT procedure, for example, if the wireless device determines that there is no more data to transmit during the SDT procedure (e.g., step 2632). The wireless device may receive an RRC release message during the SDT procedure. The wireless device may stop the SDT procedure, for example, based on/in response to receiving the RRC release message.

The wireless device may have more data to transmit during the SDT procedure (e.g., during a time period in which the SDT failure detection timer is running) The wireless device may have more data to transmit, for example, after transmitting the first data and/or the RRC message. At step 2628, the wireless device may determine that there is additional data to transmit (e.g., following the transmission of the first data). For example, the wireless device may have second data during the SDT procedure. The second data may be remaining data in a buffer, for example, after the first data is transmitted using the RA-based SDT (e.g., at step 2620) or the CG-based SDT (e.g., at step 2624). The second data may be new data that arrives during the SDT procedure, for example, after transmitting the first data using the RA-based SDT or the CG-based SDT. The wireless device may continue the SDT procedure, for example, if there is remaining data (e.g., the second data) in a buffer (e.g., step 2636).

The wireless device may trigger, during the SDT procedure, one or more BSRs using the BSR procedure. The wireless device may trigger a BSR, for example, based on determining that there is additional data to transmit. The wireless device may trigger a BSR (e.g., referred to as a regular BSR), for example, based on/in response to the arrival of second data (e.g., second data becoming available to the MAC entity of the wireless device, second data being stored in the buffer) during the SDT procedure. The second data may be from a particular logical channel (LC) which belongs to a particular LCG. The second data may belong to a logical channel with higher priority than the priority of one or more logical channels (e.g., configured for the SDT procedure). The one or more logical channels may comprise available uplink data belonging to one or more LCGs (e.g., configured for the SDT procedure). The wireless device may have the second data becoming available, for example, when none of the logical channel(s) which belong to the LCG comprises uplink data (e.g., any available uplink data). The wireless device may trigger a BSR (e.g., a padding BSR), for example, if uplink radio resource(s) are allocated and a quantity of padding bits is equal to or larger than a sum of the size of the BSR MAC CE and a subheader of the BSR MAC CE. The wireless device may trigger a BSR (e.g., a regular BSR), for example, if a BSR retransmission timer expires and/or if at least one of the logical channels, which belong to an LCG, comprises uplink data (e.g., the second data). The wireless device may trigger a BSR (e.g., a periodic BSR), for example, based on/in response to an expiry of a BSR periodic timer.

The wireless device may trigger and/or have triggered a BSR (e.g., BSR 2640) based on the second data. The wireless device may or may not receive an uplink grant via which the wireless device may send/transmit the second data during the SDT procedure. The wireless device may determine to initiate an RA procedure based on the BSR (e.g., triggered based on the second data). The wireless device may determine to initiate the RA procedure based on the BSR, for example, if the wireless device does not receive an uplink grant for the second data. The wireless device may determine to initiate an RA procedure, for example, based on/in response to an SR (e.g., triggered based on/in response to the BSR).

The wireless device may restart one or more of the selection procedures (e.g., as described with respect to FIG. 24 and/or FIG. 26), for example, based on/in response to the RA procedure initiated based on the BSR. The wireless device may skip the uplink carrier selection. The wireless device may maintain a same uplink carrier that was selected (e.g., at step 2604) with the initiation of the SDT procedure. The wireless device may skip a selection of transmission type between the RA-based SDT and the CG-based SDT (e.g., at step 2608). The skipping the selection of transmission type between the RA-based SDT and the CG-based SDT may be based on/in response to the triggering conditions of the BSR (e.g., initiating the RA procedure during the SDT procedure) and/or based on/in response to the wireless device selecting the same uplink carrier.

The wireless device may determine (e.g., at step 2612) whether to transmit the second data using the RA-based SDT or the normal RA procedure. The wireless device may determine to send/transmit the second data using the RA-based SDT (e.g. step 2620), for example, if at least one (e.g., or all) of the RA-based SDT selection condition(s) is met. The wireless device may initiate an SDT procedure using the RA-based SDT, for example, based on (e.g., after and/or in response to) determining to transmit the second data using the RA-based SDT. The wireless device may perform one or more subsequent transmissions of the RA-based SDT, for example, based on (e.g., after and/or in response to) performing the RA-based SDT. The wireless device may multiplex a message (e.g., a MAC CE) indicating an indicator/identity of the wireless device into a MAC PDU. The message may be a MAC CE comprising the identity. The identity may be C-RNTI of the wireless device. The identity may be an SDT-RNTI (e.g., CS-RNTI, PUR-RNTI, PUR C-RNTI, SDT-RNTI, and/or the like), for example, assigned for the SDT. The wireless device may transmit the MAC PDU (e.g., via an Msg 3 and/or an Msg A transmission) of the RA-based SDT selected during the SDT procedure.

The network (e.g., a base station) may receive the MAC CE. The network may determine whether the wireless device has requested an uplink grant (e.g., for the SDT procedure) or has requested to initiate a new SDT procedure. The network may determine that the wireless device has requested an uplink grant during/for the SDT procedure, for example, if the MAC PDU comprises the identity. The network may determine that the wireless device request to initiate a new SDT procedure, for example, if the MAC PDU comprises an RRC message (e.g., RRC resume request, RRC early data transmission request, RRC SDT request, etc.).

The wireless device may determine to use the normal RA procedure (e.g., step 2616). The wireless device may determine to use the normal RA procedure, for example, if one or more (e.g., at least one) of the RA-based SDT selection condition(s) are not met and/or if the wireless device may not determine/select the CG-based SDT. The wireless device may determine to use the normal RA procedure, for example, if the wireless device does not receive configuration parameters of the RA-based SDT of the uplink carrier and/or if the wireless device may not determine/select the CG-based SDT. For example, the wireless device may initiate the normal RA procedure (e.g., as described with respect to FIG. 13A, FIG. 13B, and/or FIG. 13C), for example, based on (e.g., after and/or in response to) determining to select/use the normal RA procedure. The wireless device may determine to cancel the SDT procedure, for example, if the wireless device selects the normal RA procedure. The wireless device may transmit an RRC connection request message (e.g., RRC resume request, RRC setup request, RRC connection (re-)establishment request), for example, if the wireless device selects the normal RA procedure. The wireless device may not transmit the second data during a time period in which the wireless device performs the normal RA procedure. For example, the wireless device may not transmit the second data via a PUSCH transmission of Msg 3 and/or via a PUSCH transmission of Msg A. The wireless device may (re-)construct Msg 3 or Msg A such that Msg 3 and/or Msg A comprise the RRC connection request message. The RRC connection request message may be for initiating an RRC connection (re-)establishment procedure) The wireless device may transmit an Msg 3 and/or Msg A comprising the RRC connection request during the normal RA procedure. The wireless device may transition to the RRC connected state, for example, based on (e.g., after and/or in response to) determining that the normal RA procedure has successfully completed. The wireless device, in/during the RRC connected state, may receive an uplink grant. The wireless device may transmit the second data, during the RRC connected state, via the uplink grant received during the RRC connected state.

Figure 27:
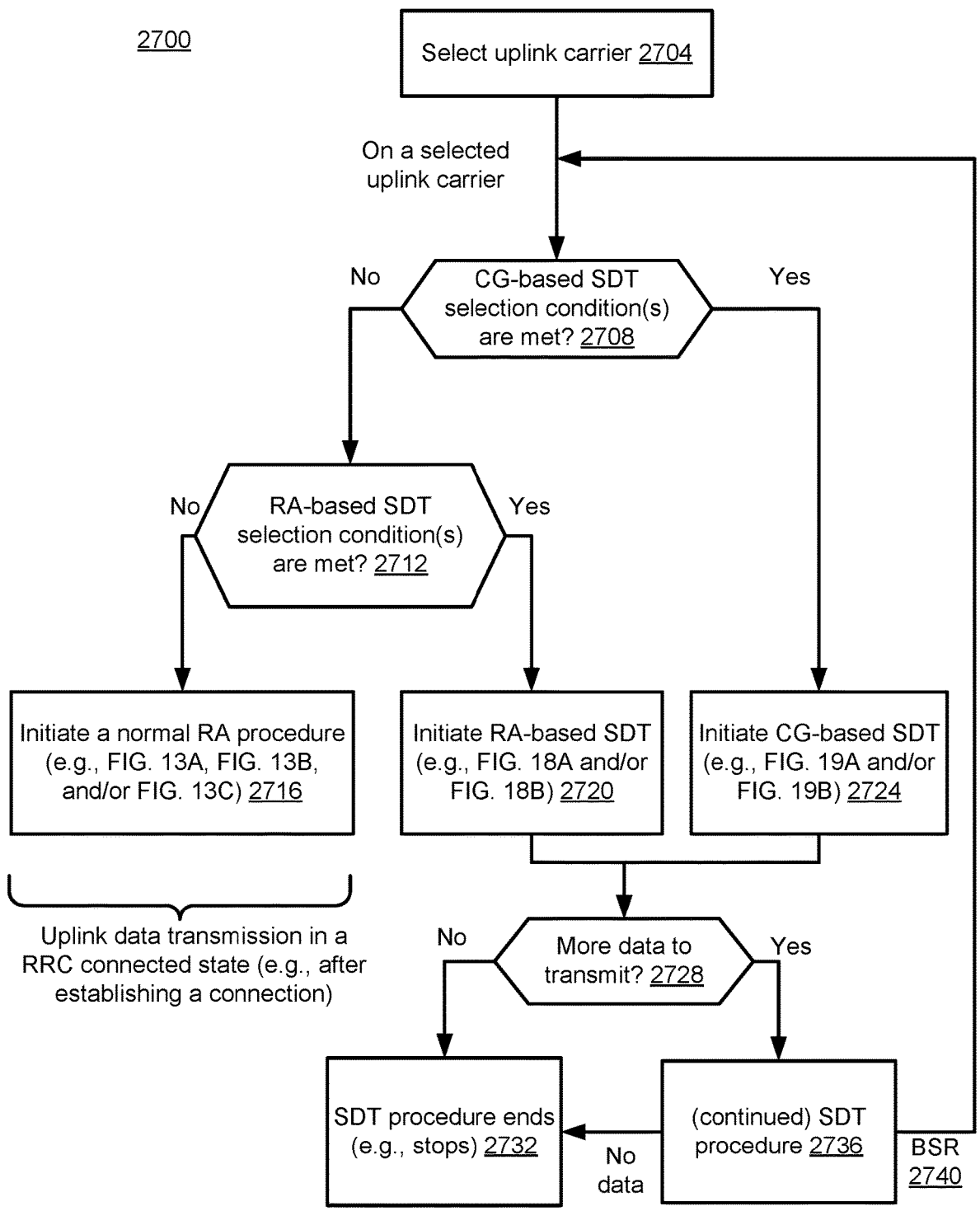
FIG. 27 shows an example procedure for a (re-)selection of a transmission type for an SDT procedure.

FIG. 27 shows an example procedure for (re-)selection of a transmission type for an SDT procedure. A wireless device may perform an example procedure 2700 which incorporates (re-) selection of a transmission type by the wireless device. The example procedure 2700 may enable switching between an RA-based SDT and a CG-based SDT and may be advantageously used in scenarios where the wireless device is in motion and subject to different channel conditions (e.g., different RSRPs). For example, a wireless device moving closer to a center of a coverage area of a cell (e.g., with higher RSRP) may, based on the example procedure 2700, determine to switch to a CG-based SDT from an RA-based SDT.

The wireless device may have (e.g., in a buffer), during a non-RRC connected state, first data (e.g., based on arrival of uplink data at the buffer) to send/transmit. The wireless device may initiate the SDT procedure to transmit the first data in the non-RRC connected state. The wireless device may follow the procedure 2400 for a selection of a transmission type for an SDT procedure as described with respect to FIG. 24. For example, steps 2704, 2708, 2712, 2716, 2720, and 2724 of FIG. 27 may be similar, or substantially similar, to steps 2404, 2408, 2412, 2416, 2420, and 2424 as described with respect to FIG. 24. At step 2704, the wireless device may determine/select an uplink carrier of a cell (e.g., among an NUL carrier and/or an SUL carrier). The wireless device may select (e.g., based on the RA-based SDT selection condition(s) and/or CG-based SDT selection condition(s)) an SDT procedure (e.g., one of the RA-based SDT or the CG-based SDT, steps 2708, 2712, 2720, and/or 2724). The wireless device may initiate the one of the RA-based SDT or the CG-based SDT on the selected uplink carrier. The wireless device may start an SDT failure detection timer, for example, based on/in response to initiating the SDT procedure. The wireless device may send/transmit, via an SDT resource, an RRC message (e.g., RRC resume, RRC, early data transmission, RRC setup, and/or the like), for example, based on/in response to initiating the SDT procedure. The wireless device may send/transmit the first data and the RRC message via the SDT resource. The wireless device may start an SDT failure detection timer, for example, based on/in response to transmitting the RRC message.

At step 2728, the wireless device may determine if there is additional data (e.g., in a buffer) to transmit (e.g., following the transmission of the first data). The wireless device may have no more data to transmit, for example, during the SDT procedure and/or based on/after transmitting the first data. The wireless device may stop (e.g., end) the SDT procedure, for example, if the wireless device determines that there is no more data to transmit during the SDT procedure (e.g., step 2732). The wireless device may receive an RRC release message during the SDT procedure. The wireless device may stop the SDT procedure, for example, based on/in response to receiving the RRC release message.

The wireless device may have more data to transmit during the SDT procedure (e.g., during a time period in which the SDT failure detection timer is running) The wireless device may have more data to transmit, for example, after transmitting the first data and/or the RRC message. At step 2728, the wireless device may determine that there is additional data to transmit (e.g., following the transmission of the first data). For example, the wireless device may have second data during the SDT procedure. The second data may be remaining data in a buffer, for example, after the first data is transmitted using the RA-based SDT (e.g., at step 2720) or the CG-based SDT (e.g., at step 2724). The second data may be new data that arrives during the SDT procedure, for example, after transmitting the first data using the RA-based SDT or the CG-based SDT. The wireless device may continue the SDT procedure, for example, if there is remaining data (e.g., the second data) in a buffer (e.g., step 2736).

The wireless device may trigger, during the SDT procedure, one or more BSRs using the BSR procedure. The wireless device may trigger a BSR, for example, based on determining that there is additional data to transmit. The wireless device may trigger a BSR (e.g., referred to as a regular BSR), for example, based on/in response to the arrival of second data (e.g., second data becoming available to the MAC entity of the wireless device, second data being stored in the buffer) during the SDT procedure. The second data may be from a particular logical channel (LC) which belongs to a particular LCG. The second data may belong to a logical channel with higher priority than the priority of one or more logical channels (e.g., configured for the SDT procedure). The one or more logical channels may comprise available uplink data belonging to one or more LCGs (e.g., configured for the SDT procedure). The wireless device may have the second data becoming available, for example, when none of the logical channel(s) which belong to the LCG comprises uplink data (e.g., any available uplink data). The wireless device may trigger a BSR (e.g., a padding BSR), for example, if uplink radio resource(s) are allocated and a quantity of padding bits is equal to or larger than a sum of the size of the BSR MAC CE and a subheader of the BSR MAC CE. The wireless device may trigger a BSR (e.g., a regular BSR), for example, if a BSR retransmission timer expires and/or if at least one of the logical channels, which belong to an LCG, comprises uplink data (e.g., the second data). The wireless device may trigger a BSR (e.g., a periodic BSR), for example, based on/in response to an expiry of a BSR periodic timer.

The wireless device may trigger and/or have triggered a BSR (e.g., BSR 2740) based on the second data. The wireless device may or may not receive an uplink grant via which the wireless device may send/transmit the second data during the SDT procedure. The wireless device may determine to initiate an RA procedure based on the BSR (e.g., triggered based on the second data). The wireless device may determine to initiate the RA procedure based on the BSR, for example, if the wireless device does not receive an uplink grant for the second data. The wireless device may determine to initiate an RA procedure, for example, based on/in response to an SR (e.g., triggered based on/in response to the BSR).

The wireless device may restart one or more of the selection procedures (e.g., as described with respect to FIG. 24 and/or FIG. 27), for example, based on/in response to the RA procedure (e.g., initiated based on the BSR). The wireless device may skip the uplink carrier selection. The wireless device may maintain a same uplink carrier that was selected (e.g., at step 2704) with the initiation of the SDT procedure.

The wireless device may determine one of the transmission types on the uplink carrier selected during the SDT procedure. The wireless device may determine whether the wireless device sends/transmits the second data using the CG-based SDT (e.g., at step 2708). The wireless device may skip the determination of whether the data is to be transmitted using the CG-based SDT, for example, if the wireless device does not receive configuration parameters of the CG-based SDT on the selected uplink carrier of the cell. The wireless device may determine whether to transmit the second data using the RA-based SDT (e.g., step 2712). The wireless device may determine whether to transmit the second data using the RA-based SDT, for example, if the wireless device does not receive configuration parameters of the CG-based SDT on the uplink carrier of the cell. The wireless device may determine to transmit the second data using the CG-based SDT (e.g., step 2724), for example, if at least one (e.g., or all) of the CG-based SDT selection condition(s) is met. The wireless device may initiate an SDT procedure using the CG-based SDT (e.g., step 2724), for example, based on (e.g., after and/or in response to) determining to transmit the second data using the CG-based SDT. The wireless device may perform one or more subsequent transmissions of the CG-based SDT, for example, based on (e.g., after and/or in response to) performing the CG-based SDT. The wireless device may determine not to use the CG-based SDT, for example, if one or more (e.g., at least one) of the CG-based SDT selection condition(s) are not met.

The wireless device may determine (e.g., at step 2712) whether to transmit the second data using the RA-based SDT or the normal RA procedure. The wireless device may determine whether to transmit the second data using the RA-based SDT or the normal RA procedure, for example, if the wireless device does not determine/select the CG-based SDT (e.g., due to the one or more of the CG-based SDT selection condition(s) being not met and/or due to configuration parameters of the CG-based SDT not being received and/or configured). The wireless device may determine to send/transmit the second data using the RA-based SDT (e.g. step 2720), for example, if at least one (e.g., or all) of the RA-based SDT selection condition(s) is met. The wireless device may initiate an SDT procedure using the RA-based SDT, for example, based on (e.g., after and/or in response to) determining to transmit the second data using the RA-based SDT. The wireless device may perform one or more subsequent transmissions of the RA-based SDT, for example, based on (e.g., after and/or in response to) performing the RA-based SDT. The wireless device may multiplex a message (e.g., a MAC CE) indicating an indicator/identity of the wireless device into a MAC PDU. The message may be a MAC CE comprising the identity. The identity may be C-RNTI of the wireless device. The identity may be an SDT-RNTI (e.g., CS-RNTI, PUR-RNTI, PUR C-RNTI, SDT-RNTI, and/or the like), for example, assigned for the SDT. The wireless device may transmit the MAC PDU (e.g., via an Msg 3 and/or an Msg A transmission) of the RA-based SDT selected during the SDT procedure.

The network (e.g., a base station) may receive the MAC CE. The network may determine whether the wireless device has requested an uplink grant (e.g., for the SDT procedure) or has requested to initiate a new SDT procedure. The network may determine that the wireless device has requested an uplink grant during/for the SDT procedure, for example, if the MAC PDU comprises the identity. The network may determine that the wireless device request to initiate a new SDT procedure, for example, if the MAC PDU comprises an RRC message (e.g., RRC resume request, RRC early data transmission request, RRC SDT request, etc.).

The wireless device may determine to use the normal RA procedure (e.g., step 2716). The wireless device may determine to use the normal RA procedure, for example, if one or more (e.g., at least one) of the RA-based SDT selection condition(s) are not met and/or if the wireless device may not determine/select the CG-based SDT. The wireless device may determine to use the normal RA procedure, for example, if the wireless device does not receive configuration parameters of the RA-based SDT of the selected uplink carrier and/or if the wireless device does not determine/select the CG-based SDT. For example, the wireless device may initiate the normal RA procedure (e.g., as described with respect to FIG. 13A, FIG. 13B, and/or FIG. 13C), for example, based on (e.g., after and/or in response to) determining to select/use the normal RA procedure. The wireless device may determine to cancel the SDT procedure, for example, if the wireless device selects the normal RA procedure. The wireless device may transmit an RRC connection request message (e.g., RRC resume request, RRC setup request, RRC connection (re-)establishment request), for example, if the wireless device selects the normal RA procedure. The wireless device may not transmit the second data while the wireless device performs the normal RA procedure. For example, the wireless device may not transmit the second data via a PUSCH transmission of Msg 3 and/or via a PUSCH transmission of Msg A. The wireless device may (re-)construct Msg 3 or Msg A such that Msg 3 and/or Msg A comprise the RRC connection request message. The RRC connection request message may be for initiating an RRC connection (re-)establishment procedure) The wireless device may transmit an Msg 3 and/or Msg A comprising the RRC connection request during the normal RA procedure. The wireless device may transition to the RRC connected state, for example, based on (e.g., after and/or in response to) determining that the normal RA procedure has successfully completed. The wireless device, in/during the RRC connected state, may receive an uplink grant. The wireless device may transmit the second data, during the RRC connected state, via the uplink grant received during the RRC connected state.

Figure 28:
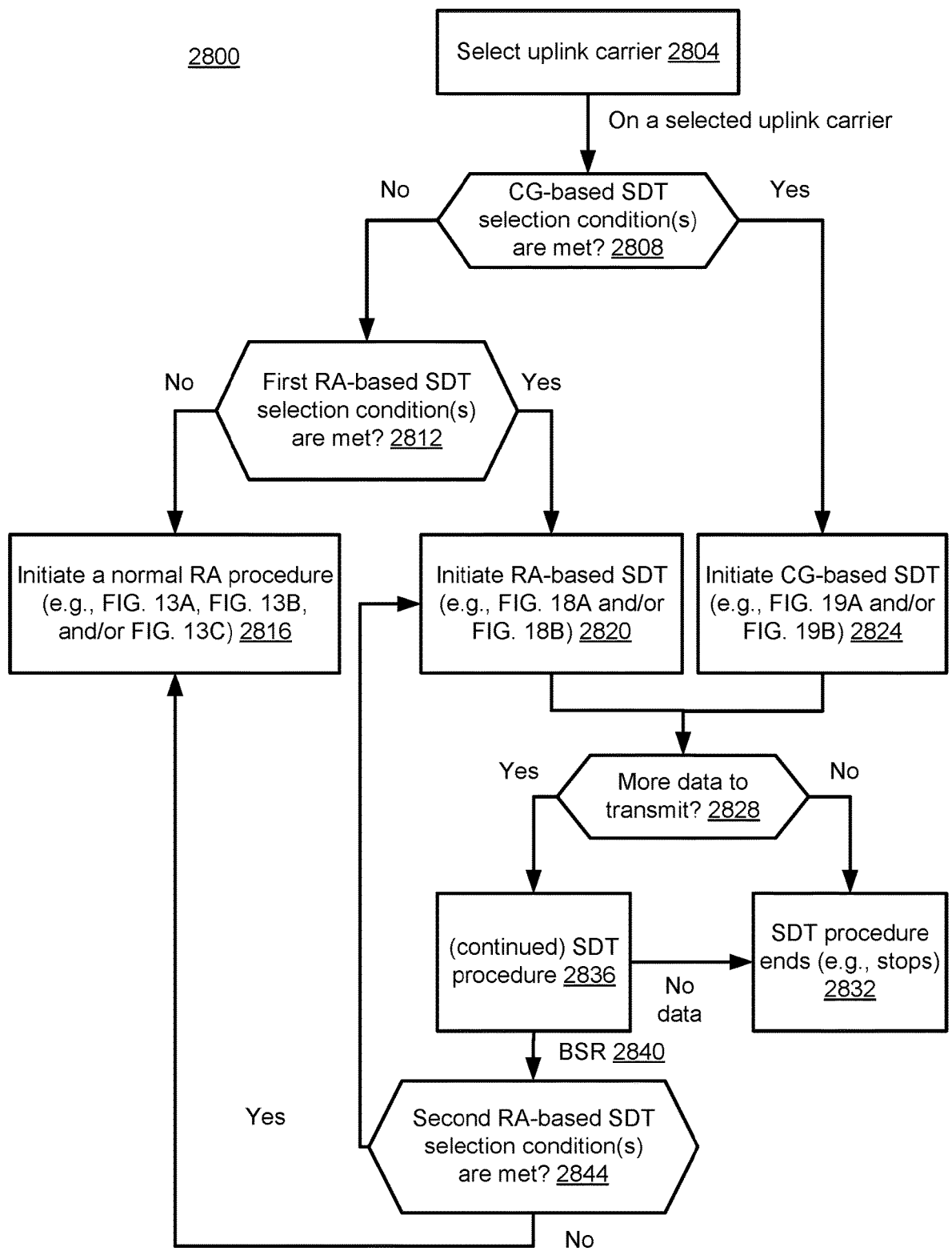
FIG. 28 shows an example procedure for a (re-)selection of a transmission type for an SDT procedure.

FIG. 28 shows an example procedure for (re-)selection of a transmission type for an SDT procedure. A wireless device may perform an example procedure 2800 which incorporates (re-) selection of a transmission type by the wireless device. The example procedure 2600 may enable transitioning to an RRC connected state (e.g., via a normal RA procedure) during an SDT procedure. The wireless device may use, during the SDT procedure, two different RA-based SDT selection condition(s) for selecting between an RA-based SDT or a normal RA procedure.

The wireless device may have (e.g., in a buffer), during a non-RRC connected state, first data (e.g., based on arrival of uplink data at the buffer) to send/transmit. The wireless device may initiate the SDT procedure to transmit the first data in the non-RRC connected state. The wireless device may follow the procedure 2400 for a selection of a transmission type for an SDT procedure as described with respect to FIG. 24. For example, steps 2804, 2808, 2812, 2816, 2820, and 2824 of FIG. 28 may be similar, or substantially similar, to steps 2404, 2408, 2412, 2416, 2420, and 2424 as described with respect to FIG. 24. At step 2804, the wireless device may determine/select an uplink carrier of a cell (e.g., among an NUL carrier and/or an SUL carrier). The wireless device may select (e.g., based on first RA-based SDT selection condition(s) and/or CG-based SDT selection condition(s)) an SDT procedure (e.g., one of the RA-based SDT or the CG-based SDT, steps 2808, 2812, 2820, and/or 2824). The wireless device may initiate the one of the RA-based SDT or the CG-based SDT on the selected uplink carrier. The wireless device may start an SDT failure detection timer, for example, based on/in response to initiating the SDT procedure. The wireless device may send/transmit, via an SDT resource, an RRC message (e.g., RRC resume, RRC, early data transmission, RRC setup, and/or the like), for example, based on/in response to initiating the SDT procedure. The wireless device may send/transmit the first data and the RRC message via the SDT resource. The wireless device may start an SDT failure detection timer, for example, based on/in response to transmitting the RRC message.

The first RA-based SDT selection condition(s) may comprise the data volume size being smaller than or equal to a data volume threshold value (e.g., indicated by a higher layer parameter sdt-TBS) of the RA-based SDT. The first RA-based SDT selection condition(s) may comprise the RSRP value being greater than or equal to an RSRP threshold value of the RA-based SDT. The first RA-based SDT selection condition(s) may comprise availability of RA-based SDT configurations.

At step 2828, the wireless device may determine if there is additional data (e.g., in a buffer) to transmit (e.g., following the transmission of the first data). The wireless device may have no more data to transmit, for example, during the SDT procedure and/or based on/after transmitting the first data. The wireless device may stop (e.g., end) the SDT procedure, for example, if the wireless device determines that there is no more data to transmit during the SDT procedure (e.g., step 2832). The wireless device may receive an RRC release message during the SDT procedure. The wireless device may stop the SDT procedure, for example, based on/in response to receiving the RRC release message.

The wireless device may have more data to transmit during the SDT procedure (e.g., during a time period in which the SDT failure detection timer is running) The wireless device may have more data to transmit, for example, after transmitting the first data and/or the RRC message. At step 2828, the wireless device may determine that there is additional data to transmit (e.g., following the transmission of the first data). For example, the wireless device may have second data during the SDT procedure. The second data may be remaining data in a buffer, for example, after the first data is transmitted using the RA-based SDT (e.g., at step 2820) or the CG-based SDT (e.g., at step 2824). The second data may be new data that arrives during the SDT procedure, for example, after transmitting the first data using the RA-based SDT or the CG-based SDT. The wireless device may continue the SDT procedure, for example, if there is remaining data (e.g., the second data) in a buffer (e.g., step 2836).

The wireless device may trigger, during the SDT procedure, one or more BSRs using the BSR procedure. The wireless device may trigger a BSR, for example, based on determining that there is additional data to transmit. The wireless device may trigger a BSR (e.g., referred to as a regular BSR), for example, based on/in response to the arrival of second data (e.g., second data becoming available to the MAC entity of the wireless device, second data being stored in the buffer) during the SDT procedure. The second data may be from a particular logical channel (LC) which belongs to a particular LCG. The second data may belong to a logical channel with higher priority than the priority of one or more logical channels (e.g., configured for the SDT procedure). The one or more logical channels may comprise available uplink data belonging to one or more LCGs (e.g., configured for the SDT procedure). The wireless device may have the second data becoming available, for example, when none of the logical channel(s) which belong to the LCG comprises uplink data (e.g., any available uplink data). The wireless device may trigger a BSR (e.g., a padding BSR), for example, if uplink radio resource(s) are allocated and a quantity of padding bits is equal to or larger than a sum of the size of the BSR MAC CE and a subheader of the BSR MAC CE. The wireless device may trigger a BSR (e.g., a regular BSR), for example, if a BSR retransmission timer expires and/or if at least one of the logical channels, which belong to an LCG, comprises uplink data (e.g., the second data). The wireless device may trigger a BSR (e.g., a periodic BSR), for example, based on/in response to an expiry of a BSR periodic timer.

The wireless device may trigger and/or have triggered a BSR (e.g., BSR 2840) based on the second data. The wireless device may or may not receive an uplink grant via which the wireless device may send/transmit the second data during the SDT procedure. The wireless device may determine to initiate an RA procedure based on the BSR (e.g., triggered based on the second data). The wireless device may determine to initiate the RA procedure based on the BSR, for example, if the wireless device does not receive an uplink grant for the second data. The wireless device may determine to initiate an RA procedure, for example, based on/in response to an SR (e.g., triggered based on/in response to the BSR).

The wireless device may determine whether to initiate the normal RA procedure or the RA-based SDT, for example, based on/in response to the RA procedure initiated based on the BSR. The wireless device may maintain a same uplink carrier that was selected at the initiation of the SDT procedure. The wireless device may determine, on the uplink carrier, whether to initiate the normal RA procedure or the RA-based SDT (e.g., step 2844). The wireless device may determine, on the uplink carrier, whether to initiate the normal RA procedure or the RA-based SDT, for example, based on/in response to the RA procedure initiated based on the BSR. For example, the determination may be based on a second RA-based SDT selection conditions(s). The second RA-based SDT selection condition(s) may be different from the first RA-based SDT selection condition(s). The second RA-based SDT selection condition(s) may comprise the RSRP value being greater than or equal to a second RSRP threshold value of the RA-based SDT. The second RSRP threshold value may be the same as or different from the RSRP threshold value of the first RA-based SDT selection condition(s). The second RA-based SDT selection condition(s) may comprise availability of RA-based SDT configurations. The second RA-based SDT selection condition(s) may or may not include a condition associated with a data volume size. For example, the wireless device may not, based on the second RA-based SDT selection condition(s), measure the data volume size (e.g., of the second data). For example, the wireless device may not, based on the second RA-based SDT selection condition(s), determine whether the data volume size is larger than a data volume threshold value (e.g., indicated by a higher layer parameter sdt-TBS) of the RA-based SDT.

The wireless device may determine to send/transmit the second data using the RA-based SDT (e.g. step 2820). The wireless device may determine to send/transmit the second data using the RA-based SDT, for example, if at least one (e.g., or all) of the second RA-based SDT selection condition(s) is met. The wireless device may initiate an SDT procedure using the RA-based SDT, for example, based on (e.g., after and/or in response to) determining to transmit the second data using the RA-based SDT. The wireless device may perform one or more subsequent transmissions of the RA-based SDT, for example, based on (e.g., after and/or in response to) performing the RA-based SDT. The wireless device may multiplex a message (e.g., a MAC CE) indicating an indicator/identity of the wireless device into a MAC PDU. The message may be a MAC CE comprising the identity. The identity may be C-RNTI of the wireless device. The identity may be an SDT-RNTI (e.g., CS-RNTI, PUR-RNTI, PUR C-RNTI, SDT-RNTI, and/or the like), for example, assigned for the SDT. The wireless device may transmit the MAC PDU (e.g., via an Msg 3 and/or an Msg A transmission) of the RA-based SDT selected during the SDT procedure.

The network (e.g., a base station) may receive the MAC CE. The network may determine whether the wireless device has requested an uplink grant (e.g., for the SDT procedure) or has requested to initiate a new SDT procedure. The network may determine that the wireless device has requested an uplink grant during/for the SDT procedure, for example, if the MAC PDU comprises the identity. The network may determine that the wireless device request to initiate a new SDT procedure, for example, if the MAC PDU comprises an RRC message (e.g., RRC resume request, RRC early data transmission request, RRC SDT request, etc.).

The wireless device may determine to use the normal RA procedure (e.g., step 2816). The wireless device may determine to use the normal RA procedure, for example, if one or more (e.g., at least one) of the second RA-based SDT selection condition(s) are not met and/or if the wireless device does not determine/select the CG-based SDT. The wireless device may determine to use the normal RA procedure, for example, if the wireless device does not receive configuration parameters of the RA-based SDT of the uplink carrier and/or if the wireless device does not determine/select the CG-based SDT. For example, the wireless device may initiate the normal RA procedure (e.g., as described with respect to FIG. 13A, FIG. 13B, and/or FIG. 13C), for example, based on (e.g., after and/or in response to) determining to select/use the normal RA procedure. The wireless device may determine to cancel the SDT procedure, for example, if the wireless device selects the normal RA procedure. The wireless device may transmit an RRC connection request message (e.g., RRC resume request, RRC setup request, RRC connection (re-)establishment request), for example, if the wireless device selects the normal RA procedure. The wireless device may not transmit the second data while the wireless device performs the normal RA procedure. For example, the wireless device may not transmit the second data via a PUSCH transmission of Msg 3 and/or via a PUSCH transmission of Msg A. The wireless device may (re-)construct Msg 3 or Msg A such that Msg 3 and/or Msg A comprise the RRC connection request message. The RRC connection request message may be for initiating an RRC connection (re-)establishment procedure) The wireless device may transmit an Msg 3 and/or Msg A comprising the RRC connection request during the normal RA procedure. The wireless device may transition to the RRC connected state, for example, based on (e.g., after and/or in response to) determining that the normal RA procedure has successfully completed. The wireless device, in/during the RRC connected state, may receive an uplink grant. The wireless device may transmit the second data, during the RRC connected state, via the uplink grant received during the RRC connected state.

Figure 29:
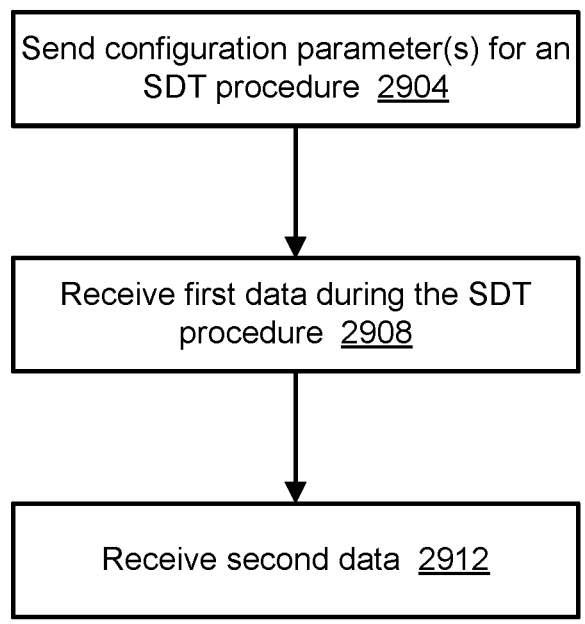
FIG. 29 shows an example procedure for uplink data reception.

FIG. 29 shows an example procedure for uplink data reception. The example procedure 2900 may be performed by a base station. The uplink data may correspond to data transmitted by a wireless device as described with respect to FIGS. 17-28. At step 2904, the base station may send configuration parameters for an SDT procedure. The configuration parameters may comprise an uplink grant indicating radio resources for use by the wireless device in a non-RRC connected state. At step 2908, the base station may receive (e.g., via the uplink grant), from the wireless device, first data during the SDT procedure. At step 2912, the base station may receive, from the wireless device, second data. The base station may receive the second data during the SDT procedure. A transmission type of the second data may be the same as or different from a transmission type of the first data. For example, the first data may be transmitted, by the wireless device, using a CG-based SDT and the second data may be transmitted, by the wireless device, using an RA-based SDT. The base station may receive the second data in an RRC connected state of the wireless device. For example, the wireless device may use an RA procedure and transition to an RRC connected state prior to transmission of the second data.

A wireless device (e.g., an RRC layer of the wireless device) may select/determine a first RA procedure to send/transmit uplink data in an inactive state (e.g., non-RRC connected state). The selecting may be based on one or more first conditions. The one or more first conditions may be based on an RSRP threshold value and/or a data volume size threshold value. The wireless device may initiate an SDT procedure based on the first RA procedure. The wireless device (e.g., a MAC layer of the wireless device) may initiate, during the SDT procedure, a second RA procedure. The wireless device may select a type of the second RA procedure, for example, based on/in response to initiating the second RA procedure and/or based on one or more second conditions (e.g., comprising/based on the RSRP threshold value). The type of the second RA procedure may be selected from a first type (e.g., to transmit the uplink data during the SDT procedure and in the inactive state) and/or a second type (e.g., to transmit the uplink data in a connected state (e.g., RRC connected state)).

The one or more second conditions may comprise/be based on the data volume size threshold. The one or more second conditions may exclude condition(s) the data volume size threshold. The selected type may be the first type, for example, based on/in response to a measured RSRP being higher than the RSRP threshold value. The selected type may be the first type, for example, based on/in response to a measured RSRP being lower than or equal to the RSRP threshold value. The wireless device may send/transmit a C-RNTI MAC CE during the second RA procedure, for example, based on/in response to the selected type being the first type. The wireless device may send/transmit, during the second RA procedure, an RRC message requesting a connection establishment, for example, based on/in response to the selected type being the second type. The wireless device may trigger a buffer status reporting procedure, for example, in response to uplink data available during the SDT procedure. The initiating the second RA procedure may be based on the triggered buffer status reporting procedure and no uplink resource being available during the SDT procedure. The wireless device may cancel the SDT procedure, for example, based on/in response to the selected type being the second type. The wireless device may determine, based on a measured RSRP, whether the second RA procedure is (e.g., whether to use, for the second RA procedure) a two-step RA procedure or a four-step RA procedure.

The wireless device may determine whether the MAC layer or the RRC layer initiates an RA procedure, for example, based on/in response to uplink data being available in an inactive state of the wireless device. The wireless device may, based on the determining, determine/select one of: one or more first conditions (e.g., first RA-based SDT selection condition(s) as described with respect to FIG. 28) comprising a data volume size threshold; and one or more second conditions (e.g., second RA-based SDT selection condition(s) as described with respect to FIG. 28) excluding the data volume size threshold. The wireless device may determine, based on the selected one, a type of the RA procedure among a first type (e.g., to transmit the uplink data during an inactive state); and a second type (e.g., to transmit the uplink data during a connected state).

The wireless device may initiate a data transmission procedure to send/transmit uplink data in an inactive state. The wireless device may trigger, during the data transmission procedure, a buffer status reporting procedure, for example, based on/in response to uplink data being available in an inactive state of the wireless device. The wireless device may, based on/in response to the triggered buffer status reporting procedure, initiate an RA procedure. The wireless device may determine/select a first type of the RA procedure from a plurality of types. The plurality of types may comprise the first type for transmitting the uplink data in a connected state of the wireless device. The plurality of types may comprise a second type for transmitting the uplink data during the data transmission procedure and in an inactive state of the wireless device. The wireless device may cancel the data transmission procedure, for example, based on/in response to the selecting the first type. The wireless device may determine/select the first type based on one or more conditions (e.g., comprising/based on an RSRP threshold value). The one or more conditions may further comprise a data volume size threshold value. The one or more conditions may exclude a data volume size threshold value (e.g., not comprise condition(s) based on the data volume size threshold value).

A wireless device may perform a method comprising multiple operations. The wireless device may transmit first uplink data during a small data transmission (SDT) procedure in a non-connected state of the wireless device. The wireless device may, based on second uplink data being available for transmission during the SDT procedure, transmit the second uplink data using a selected random access (RA) procedure. The selected RA procedure may be one of: a first RA procedure for data transmission during the SDT procedure and in the non-connected state of the wireless device; or a second RA procedure for data transmission in a connected state of the wireless device. The wireless device may also perform one or more additional operations. The wireless device may trigger, based on the second uplink data being available for transmission during the SDT procedure, a buffer status report procedure. The transmitting the second uplink data may be further based on the triggering the buffer status reporting procedure. The selected RA procedure may be the first RA procedure that is selected based on at least one of: a measured reference signal received power (RSRP)

being greater than an RSRP threshold value, or a volume of data for transmission being less than or equal to a data volume threshold. The selected RA procedure may be the second RA procedure that is selected based on at least one of: a measured reference signal received power (RSRP) being less than or equal to an RSRP threshold value, or a volume of data for transmission being greater than a data volume threshold. The transmitting the first uplink data may comprise transmitting the first uplink data using an RA procedure or a configured grant. The transmitting the first uplink data using the RA procedure may comprise transmitting the first uplink data using one of a two-step RA procedure and a four-step RA procedure. The connected state may comprise a radio resource control (RRC) connected state. The non-connected state may comprise one of an RRC inactive state or an RRC idle state. The selected RA procedure may be the second RA procedure, in which the wireless device may transmit a message to request establishment of a radio resource control (RRC) connection. The wireless device may receive a response, to the message, indicating a transition from the non-connected state to the connected state. The wireless device may transition, based on the receiving, from the non-connected state to the connected state. The wireless device may receive, based on the transitioning, an uplink grant in the connected state. The transmitting the second uplink data may comprise transmitting the second uplink data based on the uplink grant. The wireless device may cancel, based on the selected RA procedure being the second RA procedure, the SDT procedure. The wireless device may initiate the selected RA procedure. The wireless device may initiate the selected RA procedure based on a triggered buffer status reporting procedure and no uplink resource being available for transmitting the second uplink data during the SDT procedure. The wireless device may determine, based on a measured reference signal received power (RSRP), a type of the selected RA procedure among a two-step RA procedure or a four-step RA procedure. The two-step RA procedure may comprise: a transmission of first message comprising a preamble and a transport block; and a reception of second message. The four-step RA procedure may comprise: a transmission of a preamble; a reception of a random access response (RAR) to the preamble; a transmission of a transport block based on the RAR; and a reception of a response to the transport block. The wireless device may initiate the SDT procedure. The initiating the SDT procedure may be based on at least one of: a measured reference signal received power (RSRP) being greater than the RSRP threshold value, or a volume of data for transmission being less than or equal to a data volume threshold. The wireless device may select the selected RA procedure, wherein the selecting the selected RA procedure may be based on at least of: whether a measured reference signal received power (RSRP) is greater than an RSRP threshold value; or whether a volume of data for transmission is less than or equal to a data volume threshold. The wireless device may select the selected RA procedure, wherein the selecting the selected RA procedure may not be based on a data volume of the second uplink data. The transmitting the first uplink data may be an initial transmission of the SDT procedure. The transmitting the second uplink data may be a subsequent transmission of the SDT procedure. The transmitting the second uplink data may be subsequent to the transmitting the first uplink data. The selected RA procedure may be the first RA procedure, in which the wireless device may transmit a message comprising a medium access control (MAC) control element (CE), wherein the MAC CE comprises an identifier of the wireless device. The wireless device may request a radio resource for transmitting the second uplink data. The wireless device may receive, based on transmitting, an uplink grant in the non-connected state. The transmitting the second uplink data may comprise transmitting the second uplink data via the uplink grant in the non-connected state. The transmitting the second uplink data may comprise transmitting the second uplink data during the SDT procedure. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to receive the first uplink data. A computer-readable medium may store instructions that, when executed, cause performance of the described method, additional operations and/or include the additional elements.

A wireless device may perform a method comprising multiple operations. The wireless device may transmit first uplink data during a small data transmission (SDT) procedure in a non-connected state of the wireless device. The wireless device may trigger a buffer status reporting procedure based on second uplink data being available for transmission during the SDT procedure. The wireless device may, based on the triggering, transmit the second uplink data during the SDT procedure. A first transmission type for transmission of the first uplink data may be different from a second transmission type for transmission of the second uplink data. The wireless device may also perform one or more additional operations. The first transmission type may be one of a random access (RA)-based SDT or configured grant (CG)-based SDT. The wireless device may determine the second transmission type based on at least one of: a measured reference signal received power (RSRP), or a volume of data in a buffer. The non-connected state may comprise one of an RRC inactive state or an RRC idle state. The transmission of the first uplink data may be based on one of: a two-step RA procedure; a four-step RA procedure; or a configured grant. The wireless device may initiate the SDT procedure. The initiating the SDT procedure may be based on at least one of: a measured reference signal received power (RSRP) being greater than an RSRP threshold value, or a volume of data for transmission being less than or equal to a data volume threshold. The transmitting the first uplink data may comprise transmitting the first uplink data in an initial transmission of the SDT procedure. The transmitting the second uplink data may comprise transmitting the second uplink data in a subsequent transmission of the SDT procedure. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to receive the first uplink data. A computer-readable medium may store instructions that, when executed, cause performance of the described method, additional operations and/or include the additional elements.

A base station may perform a method comprising multiple operations. The base station may send a first radio resource control (RRC) message indicating an uplink grant for a small data transmission (SDT) procedure with a wireless device in a non-connected state. The base station may receive, via the uplink grant, first uplink data during the SDT procedure. The base station may receive second uplink data during the SDT procedure. A first transmission type for transmission of the first uplink data may be different from a second transmission type for transmission of the second uplink data. The base station may also perform one or more additional operations. The first transmission type may be one of a random access (RA)-based SDT or configured grant (CG)-based SDT. The non-connected state may comprise one of an RRC inactive state or an RRC idle state. The transmission of the first uplink data may be based on one of: a two-step RA procedure; a four-step RA procedure; or a configured grant. The receiving the first uplink data may comprise receiving the first uplink data in an initial transmission of the SDT procedure. The receiving the second uplink data may comprise receiving the second uplink data in a subsequent transmission of the SDT procedure after the initial transmission of the SDT procedure. The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to send the first uplink data. A computer-readable medium may store instructions that, when executed, cause performance of the described method, additional operations and/or include the additional elements.

A base station may perform a method comprising multiple operations. The base station may receive, from a wireless device, first uplink data during a small data transmission (SDT) procedure in a non-connected state of the wireless device. The base station may receive second uplink data that is transmitted using a selected random access (RA) procedure. The selected RA procedure may be one of: a first RA procedure for data transmission during the SDT procedure and in the non-connected state of the wireless device; or a second RA procedure for data transmission in a connected state of the wireless device. The base station may also perform one or more additional operations. The selected RA procedure may be the first RA procedure that is selected based on at least one of: a measured reference signal received power (RSRP) being greater than an RSRP threshold value, or a volume of data for transmission being less than or equal to a data volume threshold. The selected RA procedure may be the second RA procedure that is selected based on at least one of: a measured reference signal received power (RSRP) being less than or equal to an RSRP threshold value, or a volume of data for transmission being greater than a data volume threshold. The connected state may comprise a radio resource control (RRC) connected state. The non-connected state may comprise one of an RRC inactive state or an RRC idle state. The base station may comprise one or more processors; and memory storing instructions that, when executed by the one or more processors, cause the base station to perform the described method, additional operations and/or include the additional elements. A system may comprise the base station configured to perform the described method, additional operations and/or include the additional elements; and a wireless device configured to send the first uplink data. A computer-readable medium may store instructions that, when executed, cause performance of the described method, additional operations and/or include the additional elements.

A wireless device may perform a method comprising multiple operations. The wireless device may initiate a small data transmission (SDT) procedure for transmission of a first uplink data in a radio resource control (RRC) inactive state. The transmission of the first uplink data may be based on one of: an RA procedure; or a configured grant. The wireless device may transmit the first uplink data during the SDT procedure and in the RRC inactive state. The wireless device may trigger a buffer status reporting (BSR) based on a second uplink data being available during the SDT procedure. The wireless device may select, based on the triggering, a random access (RA) procedure from a plurality of RA procedures. The plurality of RA procedures may comprise a first RA procedure to transmit the second uplink data during the SDT procedure and in the RRC inactive state; and a second RA procedure to transmit the second uplink data in an RRC connected state. The wireless device may transmit, based on the selected RA procedure, the second uplink data. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to receive the first uplink data. A computer-readable medium may store instructions that, when executed, cause performance of the described method, additional operations and/or include the additional elements.

A wireless device may perform a method comprising multiple operations. The wireless device may transmit a first uplink data during a small data transmission (SDT) procedure in a non-connected state. The wireless device may trigger a buffer status reporting (BSR) based on a second uplink data being available during the SDT procedure. The wireless device may select, based on the triggering and a threshold associated with the SDT procedure, a random access (RA) procedure from a plurality of RA procedures. The plurality of RA procedure may comprise: a first RA procedure to transmit the second uplink data during the SDT procedure and in the non-connected state; and a second RA procedure to transmit the second uplink data in a connected state. The wireless device may transmit, based on the selected RA procedure, the second uplink data. The wireless device may also perform one or more additional operations. The wireless device may comprise one or more processors; and memory storing instructions that, when executed by the one or more processors, cause the wireless device to perform the described method, additional operations and/or include the additional elements. A system may comprise the wireless device configured to perform the described method, additional operations and/or include the additional elements; and a base station configured to receive the first uplink data. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
  transmitting, by a wireless device, first uplink data during a small data transmission (SDT) procedure in a non-connected state of the wireless device;
  triggering, based on second uplink data being available during the SDT procedure, a buffer status reporting (BSR) procedure;
  based on triggering the BSR procedure, selecting a random access (RA) procedure from at least two RA procedures comprising:
    a first RA procedure for data transmission during the SDT procedure and in the non-connected state of the wireless device, and
    a second RA procedure for data transmission in a connected state of the wireless device; and
  transmitting, based on the selected RA procedure, the second uplink data.

2. The method of claim 1, wherein the selected RA procedure is the first RA procedure that is selected based on at least one of:
  a measured reference signal received power (RSRP) being greater than an RSRP threshold value, or
  a volume of data for transmission being less than or equal to a data volume threshold.

3. The method of claim 1, wherein the selected RA procedure is the second RA procedure that is selected based on at least one of:
  a measured reference signal received power (RSRP) being less than or equal to an RSRP threshold value, or
  a volume of data for transmission being greater than a data volume threshold.

4. The method of claim 1, wherein the transmitting the first uplink data comprises transmitting the first uplink data using an RA procedure or a configured grant.

5. The method of claim 1, wherein:
  the connected state comprises a radio resource control (RRC) connected state; and
  the non-connected state comprises one of an RRC inactive state or an RRC idle state.

6. The method of claim 1, wherein the selected RA procedure is the second RA procedure, and wherein the method further comprises:
  transmitting a message to request establishment of a radio resource control (RRC) connection;
  receiving a response, to the message, indicating a transition from the non-connected state to the connected state;
  transitioning, based on the receiving, from the non-connected state to the connected state; and
  receiving, based on the transitioning, an uplink grant in the connected state, wherein the transmitting the second uplink data comprises transmitting the second uplink data based on the uplink grant.

7. The method of claim 1, wherein the selected RA procedure is the second RA procedure, and wherein the method further comprises cancelling, based on the selected RA procedure being the second RA procedure, the SDT procedure.

8. A method comprising:
  transmitting, by a wireless device, first uplink data during a small data transmission (SDT) procedure in a non-connected state of the wireless device;
  triggering a buffer status reporting procedure based on second uplink data being available for transmission during the SDT procedure; and
  based on the triggering, transmitting the second uplink data during the SDT procedure, wherein a first transmission type for transmission of the first uplink data is different from a second transmission type for transmission of the second uplink data.

9. The method of claim 8, wherein the first transmission type is one of a random access (RA)-based SDT or configured grant (CG)-based SDT.

10. The method of claim 8, further comprising determining the second transmission type based on at least one of:
  a measured reference signal received power (RSRP), or
  a volume of data in a buffer.

11. The method of claim 8, wherein the non-connected state comprises one of a radio resource control (RRC) inactive state or an RRC idle state.

12. The method of claim 8, wherein the transmission of the first uplink data is based on one of:
  a two-step random access (RA) procedure;
  a four-step RA procedure; or
  a configured grant.

13. The method of claim 8, further comprising initiating the SDT procedure, wherein the initiating the SDT procedure is based on at least one of:
  a measured reference signal received power (RSRP) being greater than an RSRP threshold value, or
  a volume of data for transmission being less than or equal to a data volume threshold.

14. The method of claim 8, wherein:
  the transmitting the first uplink data comprises transmitting the first uplink data in an initial transmission of the SDT procedure; and
  the transmitting the second uplink data comprises transmitting the second uplink data in a subsequent transmission of the SDT procedure.

15. A method comprising:
  sending, by a base station, a first radio resource control (RRC) message indicating an uplink grant for a small data transmission (SDT) procedure with a wireless device in a non-connected state;
  receiving, via the uplink grant, first uplink data during the SDT procedure; and
  receiving second uplink data during the SDT procedure, wherein a first transmission type for transmission of the first uplink data is different from a second transmission type for transmission of the second uplink data.

16. The method of claim 15, wherein the first transmission type is one of a random access (RA)-based SDT or configured grant (CG)-based SDT.

17. The method of claim 15, wherein the non-connected state comprises one of an RRC inactive state or an RRC idle state.

18. The method of claim 15, wherein the transmission of the first uplink data is based on one of:
  a two-step random access (RA) procedure;
  a four-step RA procedure; or
  a configured grant.

19. The method of claim 15, wherein:
  the receiving the first uplink data comprises receiving the first uplink data in an initial transmission of the SDT procedure; and
  the receiving the second uplink data comprises receiving the second uplink data in a subsequent transmission of the SDT procedure after the initial transmission of the SDT procedure.

* * * * *